(12) United States Patent
Kim et al.

(10) Patent No.: US 12,745,293 B2
(45) Date of Patent: Sep. 22, 2026

(54) WIRELESS COMMUNICATION METHOD USING MULTIPLE LINKS, AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Sanghyun Kim, Seoul (KR); Geonjung Ko, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 689 days.

(21) Appl. No.: 18/018,548

(22) PCT Filed: Jul. 28, 2021

(86) PCT No.: PCT/KR2021/009812
§ 371 (c)(1),
(2) Date: Jan. 28, 2023

(87) PCT Pub. No.: WO2022/025629
PCT Pub. Date: Feb. 3, 2022

(65) Prior Publication Data

US 2023/0309151 A1 Sep. 28, 2023

(30) Foreign Application Priority Data

Jul. 28, 2020 (KR) ........................ 10-2020-0094024
Aug. 26, 2020 (KR) ........................ 10-2020-0108166

(51) Int. Cl.
*H04W 74/08* (2024.01)
*H04W 74/0808* (2024.01)
*H04W 88/06* (2009.01)

(52) U.S. Cl.
CPC ... *H04W 74/0866* (2013.01); *H04W 74/0808* (2013.01); *H04W 88/06* (2013.01)

(58) Field of Classification Search
CPC ......... H04W 74/0866; H04W 74/0808; H04W 88/06; H04W 28/082; H04W 28/0908;
(Continued)

(56) References Cited

U.S. PATENT DOCUMENTS

2018/0020405 A1 1/2018 Huang et al.
2019/0132294 A1 5/2019 Li et al.
(Continued)

FOREIGN PATENT DOCUMENTS

CN 106717100 7/2020
CN 106664604 8/2020
(Continued)

OTHER PUBLICATIONS

Office Action (2nd) dated Jan. 10, 2025 for European Patent Application No. 21 849 684.2.
(Continued)

*Primary Examiner* — Eric Myers
(74) *Attorney, Agent, or Firm* — EIP US LLP

(57) ABSTRACT

Disclosed is a station communicating with a single radio multi-link device, which includes a plurality of stations operating on a plurality of links but does not support simultaneous transmission and reception by the plurality of stations. The station comprises a transmitting/receiving unit and a processor. The processor transmits a control frame to a first station of the single radio multi-link device by using the transmitting/receiving unit, receives a response to the
(Continued)

control frame from the first station of the single radio multi-link device, and starts a null data packet (NDP) sounding sequence for the first station of the single radio multi-link device.

8 Claims, 36 Drawing Sheets

(58) Field of Classification Search
CPC . H04W 74/0816; H04W 76/15; H04W 84/12; H04B 7/0628; H04L 5/0053; H04L 5/0094
See application file for complete search history.

(56) References Cited

U.S. PATENT DOCUMENTS

| | | | |
|---|---|---|---|
| 2021/0084711 A1 | 3/2021 | Park et al. | |
| 2021/0360521 A1* | 11/2021 | Seok | H04W 52/0203 |
| 2022/0029736 A1 | 1/2022 | Chu et al. | |
| 2022/0104070 A1 | 3/2022 | Kojokaro et al. | |
| 2023/0046270 A1* | 2/2023 | Huang | H04L 1/22 |

FOREIGN PATENT DOCUMENTS

| | | |
|---|---|---|
| CN | 107735993 | 7/2021 |
| CN | 115250540 | 10/2022 |
| DE | 10 2020 134 748 | 9/2021 |
| DE | 10 2021 134 341 | 8/2022 |
| ES | 2 745 300 | 2/2020 |
| KR | 10-2017-0030758 | 3/2017 |
| KR | 10-2020-0014427 | 2/2020 |
| TW | 202025848 | 7/2020 |
| WO | 2020/096349 | 5/2020 |
| WO | 2022/033283 | 2/2022 |
| WO | 2022/048548 | 3/2022 |

OTHER PUBLICATIONS

Extended European Search Report dated Nov. 23, 2023 for European Patent Application No. 21849684.2.

International Preliminary Report on Patentability (Chapter I) for PCT/KR2021/009812 issued on Jan. 31, 2023 and its English translation from WIPO (now published as WO 2022/025629).

Office Action dated Jun. 3, 2024 for Japanese Patent Application No. 2023-506306 and its English translation provided by the Applicant's foreign counsel.

Office Action dated Jul. 9, 2024 for European Patent Application No. 21 849 684.2.

International Search Report for PCT/KR2021/009812 mailed on Nov. 8, 2021 and its English translation from WIPO (now published as WO 2022/025629).

Written Opinion of the International Searching Authority for PCT/KR2021/009812 mailed on Nov. 8, 2021 and its English translation by Google Translate (now published as WO 2022/025629).

Park, Minyoung et al.: "Enhanced Multi-Link Single Radio Operation", IEEE 802.11-20/0562r7, Jul. 17, 2020, slides 1-28.

Park, Minyoung et al.: "MAC MLO Enhanced Multi-Link Single-Radio Operation", IEEE 802.11-20/1291r2, Aug. 20, 2020, pp. 1-2.

Office Action dated Feb. 19, 2024 for Japanese Patent Application No. 2023-506306 and its English translation provided by the Applicant's foreign counsel.

Yongho Seok et al.: "Multi-link Spatial Multiplexing", doc.: IEEE 802.11-20/0883r1, Jul. 2, 2020, slides 1-16.

Abhishek Patil et al.: "MLO: Acknowledgement Procedure", doc.: IEEE 802.11-20/0024r0, Jan. 6, 2020, slides 1-16.

Sharan Naribole et al.: "MLD Spatial Multiplexing Considerations", doc.: IEEE 802.11-20/0977r2, Jul. 15, 2020, slides 1-18.

Office Action (1st) dated Apr. 11, 2025 for Chinese Patent Application No. 202180059177.7 and its English translation provided by Applicant's foreign counsel.

Notice of Allowance dated Jun. 2, 2025 for Chinese Patent Application No. 202180059177.7 and its English translation provided by Applicant's foreign counsel/Google Translate.

Office Action dated Aug. 1, 2023 for Indian Patent Application No. 202327004473.

European Extended Search Report received in Application No. 25210849.3, mailed Dec. 10, 2025, 7 pgs.

Korean Office Action in KR Appln. No. 10-2023-7003361, dated Apr. 21, 2026, 7 pages with English Translation.

* cited by examiner

AIFS
AIFS
PIFS
Contention Window Interval
BUSY
Backoff Window
Next Frame (a) EHT SU PPDU L-STF | L-LTF | L-SIG | RL-SIG | U-SIG | EHT-SIG-A | EHT-STF | EHT-LTF | SVC | MPDU | TAIL (b) EHT TB PPDU

L-STF | L-LTF | L-SIG | RL-SIG | U-SIG | EHT-STF | EHT-LTF | SVC | MPDU | TAIL (c) EHT MU PPDU

L-STF | L-LTF | L-SIG | RL-SIG | U-SIG | EHT-SIG-B | EHT-STF | EHT-LTF | SVC | MPDU | TAIL (d) EHT ER SU PPDU

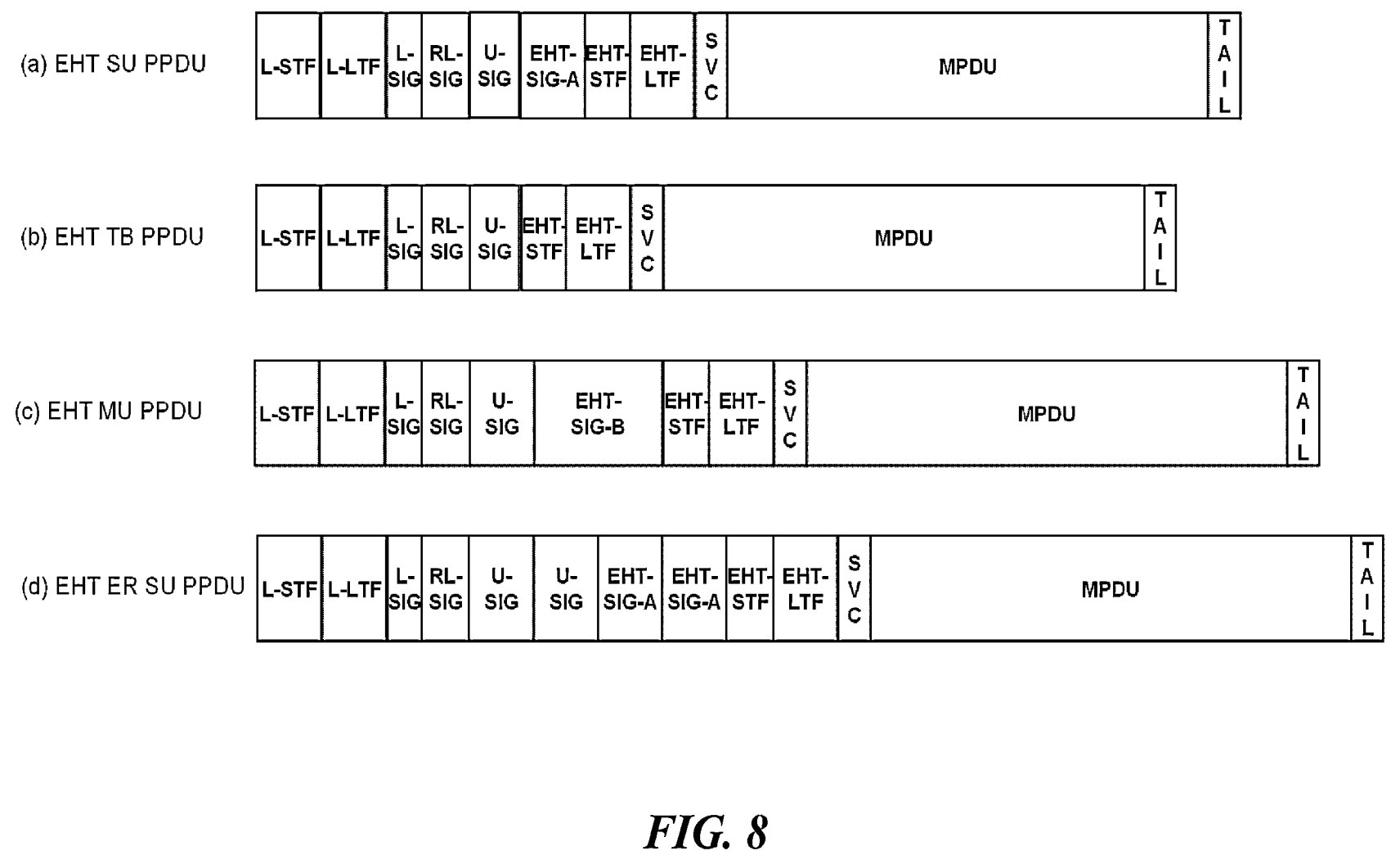

L-STF | L-LTF | L-SIG | RL-SIG | U-SIG | U-SIG | EHT-SIG-A | EHT-SIG-A | EHT-STF | EHT-LTF | SVC | MPDU | TAIL

FIG. 8

Freq. high
Narrow frequency interval
Freq. low
Link 1
Link 2
MLD#1
STA1-1 (Link1)
STR
(week interference)
STA1-2 (Link2)
MLD#2
STA2-1 (Link1)
Non-STR
(strong interference)
STA2-2 (Link2)
STR : Simultaneous Transmission and Reception (a) Continuous backoff counting (b) Continuous backoff counting + Tx deferring (a) Mandatory RTS / CTS exchange (b) Short Tx of initial deferred Tx

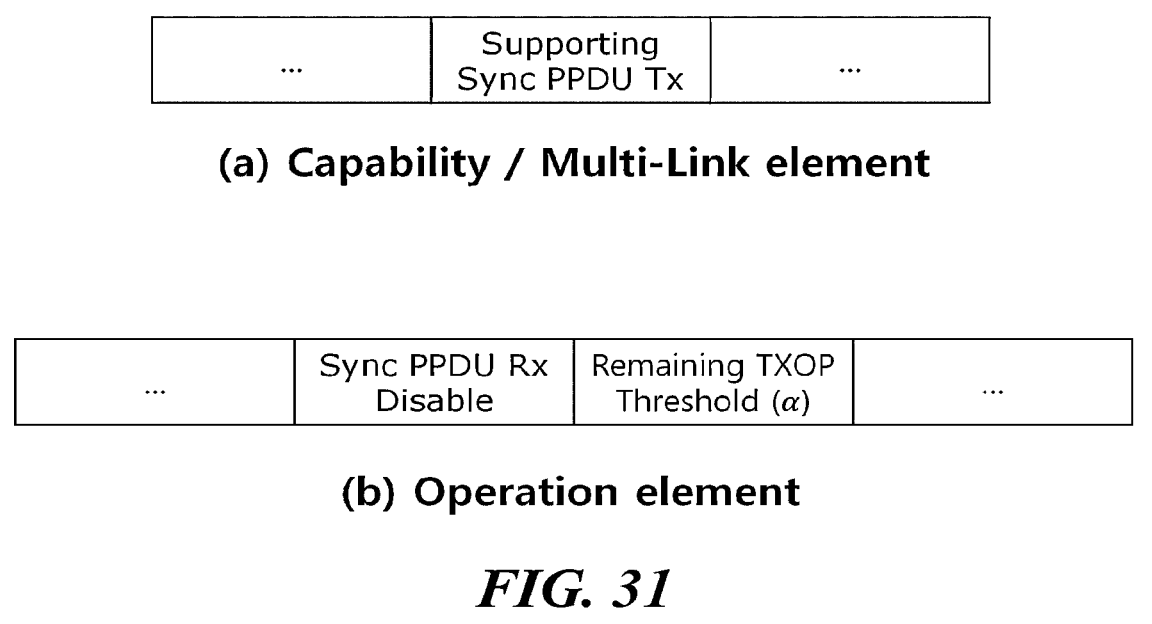

| ... | Supporting Sync PPDU Tx | ... |
|---|---|---|

(a) Capability / Multi-Link element

| ... | Sync PPDU Rx Disable | Remaining TXOP Threshold ($\alpha$) | ... |
|---|---|---|---|

(b) Operation element

*FIG. 31*

PHY layer configuration of Multi-link Single Radio MLD

(a) RF chain switching delay

(b) RTS/CTS exchange to cover RF chain switching delay

| ... | MIMO Rx support | Max Rx spatial stream | ... |
|---|---|---|---|

(a) Operation element

| ... | RF switching latency | ... |
|---|---|---|

(b) Capability element

*FIG. 38*

WIRELESS COMMUNICATION METHOD USING MULTIPLE LINKS, AND WIRELESS COMMUNICATION TERMINAL USING SAME

CROSS-REFERENCE TO RELATED APPLICATIONS

The present application is the U.S. National Phase of PCT Application No. PCT/KR2021/009812 filed on Jul. 28, 2021, which claims the priority to Korean Patent Application No. 10-2020-0094024 filed with the Korean Intellectual Property Office on Jul. 28, 2020, and Korean Patent Application No, 10-2020-0108166 filed with the Korean Intellectual Property Office on Aug. 26, 2020, the entire contents of which are incorporated herein by reference.

TECHNICAL FIELD

The present invention relates to a wireless communication method using a multi-link and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An embodiment of the present invention is for providing a wireless communication method using a multi-link and a wireless communication terminal using the same.

Solution to Problem

According to an embodiment of the present invention, a station communicating with a single radio multi-link device including multiple stations operating on multiple links, respectively, but not supporting simultaneous transmission or reception by the multiple stations, includes a transceiver and a processor. The processor transmits a control frame to a first station of the single radio multi-link device by using the transceiver, receives a response to the control frame from the first station of the single radio multi-link device, and starts a null data packet (NDP) sounding sequence for the first station of the single radio multi-link device.

The control frame may be an MU-RTS frame.

The control frame may be a trigger frame having a different type from that of an MU-RTS frame.

The processor may transmit the control frame in a predetermined physical layer protocol data unit (PPDU) format.

The predetermined PPDU format may be one of a non-HT format and an HT format.

The processor may transmit the control frame at a data rate equal to or lower than a predetermined data rate.

The processor may not perform transmission to a second station of the single radio multi-link device when the first station of the single radio multi-link device is performing transmission or reception.

The processor may not perform transmission to the second station of the single radio multi-link device not only while a frame exchange sequence of the first station is performed but also for a predetermined time interval from completion of the frame exchange sequence of the first station.

While the frame exchange sequence of the first station is performed, use of multiple RF chains may be supported on a link on which the frame exchange sequence of the first station is performed, and the predetermined time interval may be determined based on an RF chain switching time interval of the single radio multi-link device.

When the single radio multi-link device supports use of multiple RF chains on a first link, and does not first support use of an RF chain on a second link and later supports use of the RF chain on the second link, the processor may apply restriction on channel access for a predetermined time interval before channel access on the second link is performed.

The predetermined time interval may correspond to a predetermined time interval applied when the restriction on channel access is required due to a time interval for which channel monitoring is impossible.

The predetermined time interval may correspond to NAVSyncdelay.

When the single radio multi-link device supports use of multiple RF chains on a first link and does not support use of an RF chain on a second link, a last frame exchange in a frame exchange sequence performed on the first link may be performed using single input single output (SISO) (1×1).

According to an embodiment of the present invention, a single radio multi-link device including multiple stations operating on multiple links, respectively, but not supporting simultaneous transmission or reception by the multiple stations includes a transceiver and a processor. The processor delays, when a link on which an RF chain of the single radio multi-link device operates is switched from a first link to a second link and a link on which the RF chain operates is switched again from the second link to the first link, channel access for a predetermined time interval before channel access is performed on the first link.

The predetermined time interval may correspond to a predetermined time interval applied when restriction on channel access is required due to a time interval for which channel monitoring is impossible.

The predetermined time interval may correspond to NAVSyncdelay.

When the single radio multi-link device supports use of multiple RF chains on the first link and does not support use of an RF chain on the second link, the processor may transmit a last frame by using single input single output (SISO) (1×1) in a frame exchange sequence performed on the first link.

A method of operating a station communicating with a single radio multi-link device including multiple stations operating on multiple links, respectively, but not supporting simultaneous transmission or reception by the multiple stations includes transmitting a control frame to a first station of the single radio multi-link device, receiving a response to the control frame from the first station of the single radio multi-link device, and starting a null data packet (NDP) sounding sequence for the first station of the single radio multi-link device.

The control frame may be an MU-RTS frame.

The control frame may be a trigger frame having a different type from that of an MU-RTS frame.

Advantageous Effects of Invention

An embodiment of the present invention is provides a wireless communication method efficiently using a multi-link and a wireless communication terminal using the same.

BRIEF DESCRIPTION OF DRAWINGS

FIG. 8 illustrates an example of various extremely high throughput (EHT) physical protocol data unit (PPDU) formats and a method for indicating the same according to an embodiment of the present invention.

FIG. 31 illustrates an element field indicating information on support of sync PPDU reception or transmission according to an embodiment of the disclosure.

FIG. 38 illustrates a capability element and an operation element used by a single radio multi-link device according to an embodiment of the present invention.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
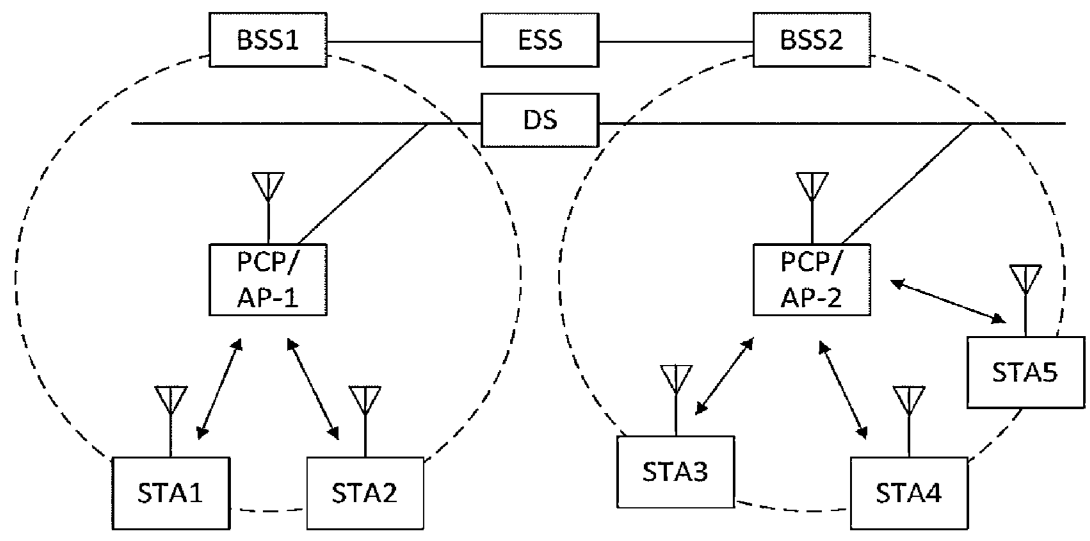
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
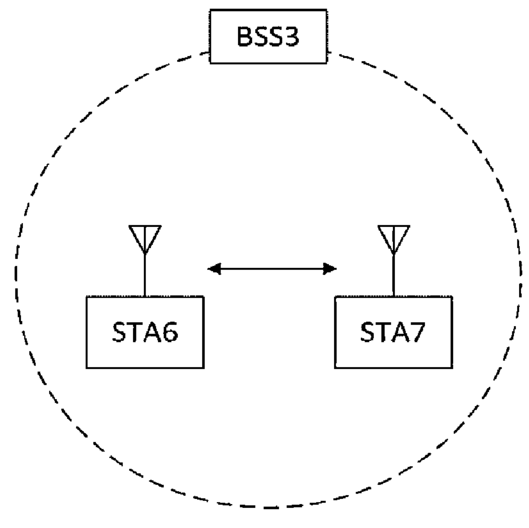
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STAT are not connected with the AP. The independent BSS is not permitted to access the distribution system and forms a self-contained network. In the independent BSS, the respective stations STA6 and STAT may be directly connected with each other.

Figure 3:
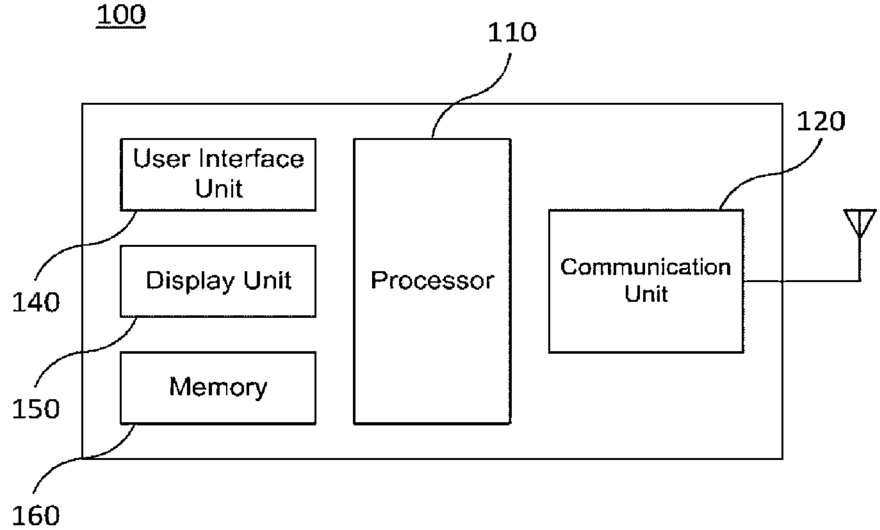
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
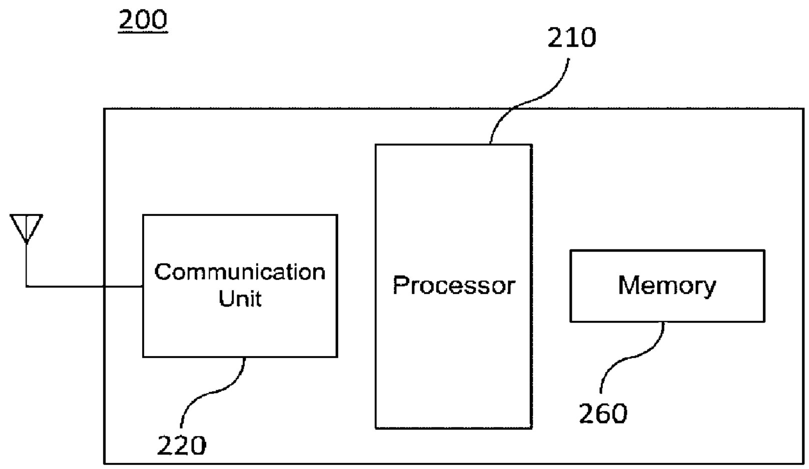
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figures 5, 6:
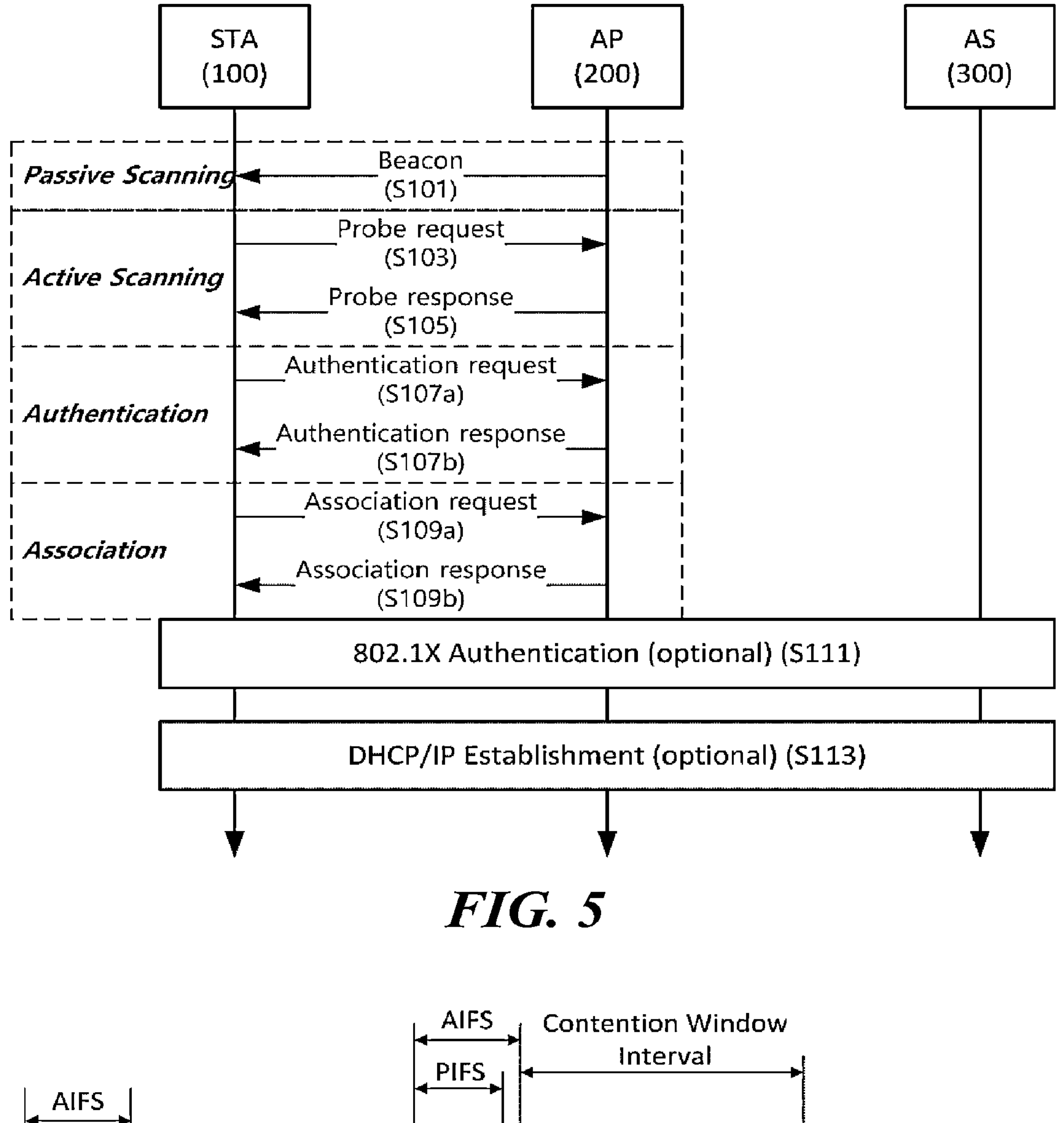
FIG. 5 schematically illustrates a process in which a STA and an AP set a link.
FIG. 6 illustrates a carrier sense multiple access (CSMA)/collision avoidance (CA) method used in wireless LAN communication.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval. In this instance, a random number is referred to as a backoff counter. That is, the initial value of the backoff counter may be set by an integer number which is a random number that a UE obtains. In the case that the UE detects that a channel is idle during a slot time, the UE may decrease the backoff counter by 1.

In addition, in the case that the backoff counter reaches 0, the UE may be allowed to perform channel access in a corresponding channel. Therefore, in the case that a channel is idle during an AIFS time and the slot time of the backoff counter, transmission by the UE may be allowed.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Examples of Various PPDU Formats

Figure 7:
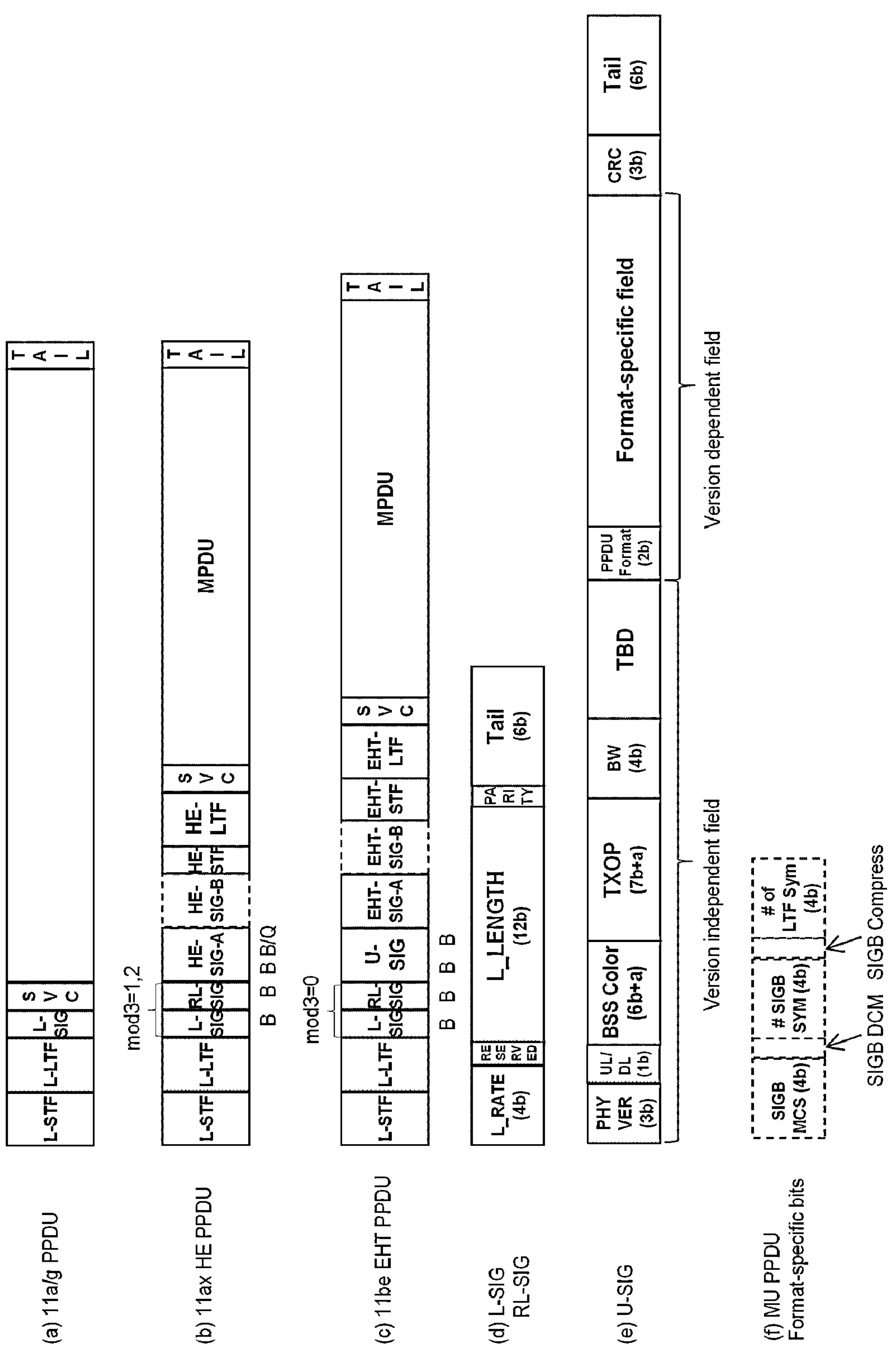
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(*a*) illustrates an embodiment of a legacy PPDU format based on 802.11a/g, FIG. 7(*b*) illustrates an embodiment of an HE PPDU format based on 802.11ax, and FIG. 7(*c*) illustrates an embodiment of a non-legacy PPDU (i.e., EHT PPDU) format based on 802.11be. FIG. 7(*d*) illustrates detailed field configurations of RL-SIG and L-SIG commonly used in the PPDU formats.

Referring to FIG. 7(*a*), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(*b*), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(*c*), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(*d*) illustrates a 24-bit information configuration of L-SIG.

Referring to FIG. 7(*d*), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(us) = \left(\left\lceil \frac{\text{L\_LENGTH} + 3}{3} \right\rceil\right) \times 4 + 20 \quad \text{[Equation 1]}$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$\text{L\_LENGTH}(byte) = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$TXTIME(us) = T_{L-STF} + T_{L-LTF} + T_{L-SIG} + T_{RL-SIG} + T_{U-SIG} + (T_{EHT-SIG-A}) + (T_{EHT-SIG-B}) + T_{EHT-STF} + N_{EHT-LTF} \cdot T_{EHT-LTF} + T_{DATA}$$ [Equation 3]

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(*e*), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHz in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

FIG. 7(*f*) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(*a*) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(*b*) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(*c*) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(*d*) shows an example of an EHT ER SU PPDU format used for single user transmission with an STA in an extended range. An EHT ER SU PPDU may be used for single user transmission with an STA of a wider range compared to the EHT SU PPDU described in FIG. 8(*a*), and a U-SIG field may be repeatedly located on a time axis.

The EHT MU PPDU described in FIG. 8(*c*) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

For convenience of description, in this specification, a frame or a MAC frame may be used interchangeably with an MPDU.

When one wireless communication device communicates by using a plurality of links, the communication efficiency of the wireless communication device may be increased. In this case, the link may be a physical path, and may consist of one wireless medium that may be used to deliver a MAC service data unit (MSDU). For example, in a case where frequency band of one of the links is in use by another wireless communication device, the wireless communication device may continue to perform communication through another link. As such, the wireless communication device may usefully use a plurality of channels. In addition, when the wireless communication device performs communication simultaneously by using a plurality of links, the overall throughput may be increased. However, in the existing wireless LAN, it has been stipulated that one wireless communication device uses one link. Therefore, a WLAN operation method for using a plurality of links is required. A wireless communication method of a wireless communication device using a plurality of links will be described through FIGS. 9 to 26. First, a specific form of a wireless communication device using a plurality of links will be described through FIG. 9.

Figures 9, 10:
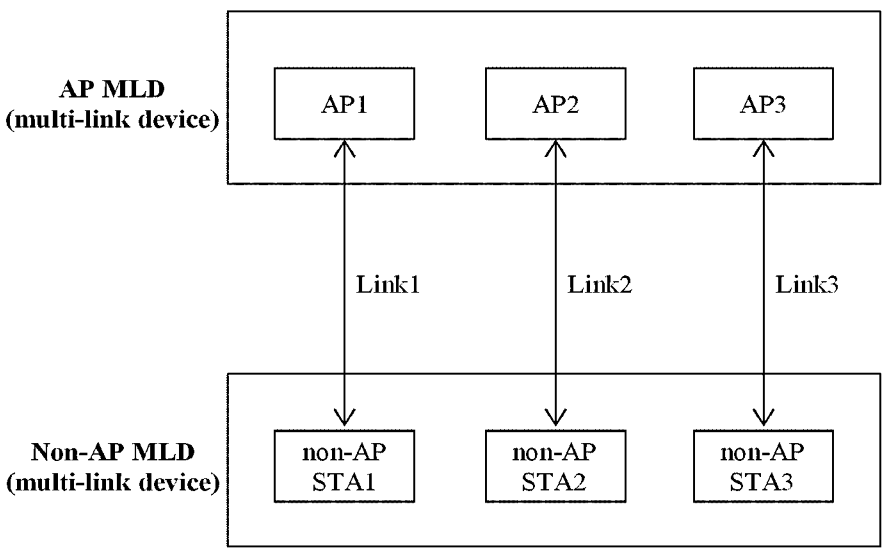
FIG. 9 illustrates a multi-link device according to an embodiment of the disclosure.
FIG. 10 illustrates simultaneous transmissions in different links in a multi-link operation according to an embodiment of the disclosure.

FIG. 9 illustrates a multi-link device according to an embodiment of the disclosure.

A multi-link device (MLD) may be defined for a wireless communication method using the plurality of links described above. The multi-link device may represent a device having one or more affiliated stations. According to a specific embodiment, the multi-link device may represent a device having two or more affiliated stations. In addition, the multi-link device may exchange multi-link elements. The multi-link element includes information on one or more stations or one or more links. The multi-link element may include a multi-link setup element, which will be described later. In this case, the multi-link device may be a logical entity. Specifically, the multi-link device may have a plurality of affiliated stations. The multi-link device may be referred to as a multi-link logical entity (MLLE) or a multi-link entity (MLE). The multi-link device may have one medium access control (MAC) service access point (SAP) up to logical link control (LLC). The MLD may also have one MAC data service.

A plurality of stations included in the multi-link device may operate on a plurality of links. In addition, a plurality of stations included in the multi-link device may operate on a plurality of channels. Specifically, the plurality of stations included in the multi-link device may operate on a plurality of different links or on a plurality of different channels. For example, a plurality of stations included in the multi-link device may operate on a plurality of different channels of 2.4 GHz, 5 GHz, and 6 GHz.

The operation of the multi-link device may be referred to as a multi-link operation, an MLD operation, or a multi-band operation. In addition, when the station affiliated with the multi-link device is an AP, the multi-link device may be referred to as the AP MLD. In addition, when the station affiliated with the multi-link device is a non-AP station, the multi-link device may be referred to as a non-AP MLD.

FIG. 9 illustrates an operation in which a non-AP MLD and an AP-MLD communicate. Specifically, the non-AP MLD and the AP-MLD communicate by using three links, respectively. The AP MLD includes a first AP AP1, a second AP AP2, and a third AP AP3. The non-AP MLD includes a first non-AP STA (non-AP STA1), a second non-AP STA (non-AP STA2), and a third non-AP STA (non-AP STA3). The first AP AP1 and the first non-AP STA (non-AP STA1) communicate through a first link Link1. In addition, the second AP AP2 and the second non-AP STA (non-AP STA2) communicate through a second link Link2. In addition, the third AP AP3 and the third non-AP STA (non-AP STA3) communicate through a third link Link3.

The multi-link operation may include a multi-link setup operation. The multi-link setup may correspond to an association operation of the single link operation described above and may be preceded first for frame exchange in the multi-link. The multi-link device may obtain information necessary for the multi-link setup from a multi-link setup element. Specifically, the multi-link setup element may include capability information associated with the multi-link. In this case, the capability information may include information indicating whether any one of the plurality of devices included in the multi-link device performs the transmission and simultaneously, another device may perform the reception. In addition, the capability information may include information on the links available to each station included in the MLD. In addition, the capability information may include information on the channels available to each station included in the MLD.

The multi-link setup may be set up through negotiation between peer stations. Specifically, the multi-link setup may be performed through communication between stations without communication with the AP. In addition, the multi-link setup may be set up through any one link. For example, even if the first link to the third link are set through the multi-link, the multi-link setup may be performed through the first link.

In addition, a mapping between a traffic identifier (TID) and a link may be set up. Specifically, frames corresponding to a TID of a particular value may only be interchanged through a pre-specified link. The mapping between the TID and the link may be set up with directional-based. For example, when a plurality of links is set up between the first multi-link device and the second multi-link device, the first multi-link device may be set to transmit a frame of the first TID to the plurality of first links, and the second multi-link device may be set to transmit a frame of the second TID to the first link. In addition, there may be a default setting for the mapping between the TID and the link. Specifically, in the absence of additional setup in the multi-link setup, the multi-link device may exchange frames corresponding to the TID at each link according to the default setting. In this case, the default setting may be that all the TIDs are exchanged in any one link.

A TID will be described in detail. The TID is an ID for classifying traffic and data in order to support quality of service (QoS). In addition, the TID may be used or allocated in a higher layer than a MAC layer. In addition, the TID may indicate a traffic category (TC) or a traffic stream (TS). In addition, the TID may be classified as 16 types. For example, the TID may be designated as one of the values in the range of 0 to 15. A TID value to be used may be differently designated according to an access policy and a channel access or medium access method. For example, in the case that enhanced distributed channel access (EDCA) or hybrid coordination function contention based channel access (HCAF) is used, the TID may be assigned with a value in the range of 0 to 7. In the case that the EDCA is used, the TID may indicate a user priority (UP). In this instance, the UP may be designated based on a TC or a TS. The UP may be allocated in a higher layer than MAC. In addition, in the case that HCF controlled channel access (HCCA) or SPCA is used, the TID may be assigned with a value in the range of 8 to 15. In the case that the HCCA or SPCA is used, the TID may indicate a TSID. In addition, in the case that the HEMM or the SEMM is used, the TID may be assigned with a value in the range of 8 to 15. In the case that the HEMM or SEMM is used, the TID may indicate a TSID.

A UP and an AC may be mapped. The AC may be a label for providing a QoS in EDCA. The AC may be a label for indicating an EDCA parameter set. An EDCA parameter or an EDCA parameter set may be a parameter used for EDCA channel contention. A QoS station may guarantee a QoS using the AC. In addition, the AC may include AC_BK, AC_BE, AC_VI, and AC_VO. The AC_BK, AC_BE, AC_VI, and AC_VO may indicate a background, a best effort, a video, and a voice, respectively. In addition, each of the AC_BK, AC_BE, AC_VI, and AC_VO may be classified into subordinate ACs. For example, the AC_VI may be subdivided into AC_VI primary and AC_VI alternate. In addition, the AC_VO may be subdivided into AC_VO primary and AC_VO alternate. In addition, a UP or a TID may be mapped to an AC. For example, a UP or TID having a value of 1, 2, 0, 3, 4, 5, 6, and 7 may be mapped to AC_BK, AC_BK, AC_BE, AC_BE, AC_VI, AC_VI, AC_VO, and AC_VO, respectively. In addition, a UP or TID having a value of 1, 2, 0, 3, 4, 5, 6, and 7 may be mapped to AC_BK, AC_BK, AC_BE, AC_BE, AC_VI alternate, AC_VI primary, AC_VO primary, and AC_VO alternate, respectively. In addition, a UP or TID having a value of 1, 2, 0, 3, 4, 5, 6, and 7 may sequentially have a high priority. That is, 1 denotes a low priority and 7 denotes a high priority. Therefore, AC_BK, AC_BE, AC_VI, and AC_VO may have high priorities, sequentially. In addition, AC_BK, AC_BE, AC_VI, and AC_VO may correspond to an AC index (ACI) 0, 1, 2, and 3, respectively. Due to such features of a TID, a mapping between a TID and a link may indicate a mapping between an AC and a link. In addition, a mapping between a link and an AC may indicate a mapping between a TID and a link.

As described above, a TID may be mapped to each of a plurality of links. Mapping may be designating a link in which traffic corresponding to a predetermined TID or AC is capable of being exchanged. In addition, a TID or AC that is transmittable for each transmission direction in a link may be designated. As described above, there may be a default configuration for a mapping between a TID and a link. Specifically, in the case that an additional configuration does not exist for a multi-link configuration, a multi-link device may exchange a frame corresponding to a TID in each link according to the default configuration. In this instance, the default configuration may be exchanging all TIDs in any one link. Any TID or AC at any point in time may be always mapped to at least any one link. A management frame and a control frame may be transmitted in all links.

In the case that a link is mapped to a TID or an AC, only a data frame corresponding to the TID or AC mapped to the corresponding link may be transmitted in the corresponding link. Therefore, in the case that a link is mapped to a TID or an AC, a frame that does not correspond to the TID or AC mapped to the corresponding link may not be transmitted in the corresponding link. In the case that a link is mapped to a TID or an AC, an ACK may also be transmitted based on the link to which the TID or the AC is mapped. For example, a block ACK agreement may be determined based on a mapping between a TID and a link. According to another embodiment, a mapping between a TID and a link may be determined based on a block ACK agreement. Particularly, a block ACK agreement may be set for a TID mapped to a predetermined link.

A QoS may be guaranteed via the above-described mapping between a TID and a link. Specifically, an AC or TID having a high priority may be mapped to a link in which a relatively small number of stations operate or a link having a good channel condition. In addition, via the above-described mapping between a TID and a link, a station may be enabled to maintain a power-saving state during a long period of time.

FIG. 10 illustrates the simultaneous performance of transmission of different links in a multi-link operation according to an embodiment of the disclosure.

According to implementation of a multi-link device, the simultaneous operation may not be supported in the multi-link. For example, simultaneous transmission in a plurality of links, simultaneous reception in a plurality of links, or transmission in one link and reception of another link by the multi-link device may be not supported. This is because reception or transmission performed in one link may influence reception or transmission performed in another link. Specifically, transmission in one link may act as interference to another link. Interference applied from one link to another link by one multi-link device may be referred to as internal leakage. As a frequency interval between links is smaller, internal leakage may become larger. When internal leakage is not very large, transmission may be performed in another link while transmission is performed in one link. When internal leakage is large, transmission cannot be performed in another link while transmission is performed in one link.

As described above, simultaneously performing the operations in a plurality of links by the multi-link device may be referred to as simultaneous transmit and receive or simultaneous transmission and reception (STR). For example, simultaneous transmission in a plurality of links, transmission in one link and reception in another link at the same time, or simultaneous reception in a plurality of links by the multi-link device may be referred to as STR.

As mentioned above, the multi-link device may support STR or support the same only restrictively. Specifically, the multi-link device may support STR in a specific condition. For example, when the multi-link device operates as a single radio device, the multi-link device may not perform STR. Further, when the multi-link device operates as a single antenna, STR of the multi-link device may not be performed. When internal leakage having the size larger than or equal to a predetermined size is detected, the multi-link device may not perform STR.

A station may exchange information on an STR capability of the station with another station. Specifically, the station may exchange information on whether a capability of simultaneously performing transmission in a plurality of links or simultaneously performing reception in a plurality of links by the station is restricted with another station. Specifically, the information on whether the capability of performing transmission or reception in a plurality of links is restricted may indicate whether simultaneous transmission, simultaneous reception, or simultaneous transmission and reception can be performed in a plurality of links. The information on whether the capability of performing transmission or reception in a plurality of links is restricted may be information indicated for each step. Specifically, the information on whether the capability of performing transmission or reception in a plurality of links is restricted may be information indicating a step of representing the size of internal leakage. In a detailed embodiment, the information indicating the step of representing the size of internal leakage may be information indicating a step of representing the size of interference generated due to internal leakage. In another detailed embodiment, the information may be information indicating a step of representing a frequency interval between links that may influence internal leakage. The information indicating the step of representing the size of internal leakage may be information indicating the relation between the frequency interval between links and the size of internal leakage.

In FIG. 10, a first station (STA1) and a second station (STA2) is affiliated with one non-AP multi-link device. A first AP (AP1) and a second AP (AP2) may be affiliated with one non-AP multi-link device. A first link (link 1) is configured between the first AP (AP1) and the first station (STA1), and a second link (link 2) is configured between the second AP (AP2) and the second station (STA2). In FIG. 10, the non-AP multi-link device may restrictively perform STR. When the second station (STA2) performs transmission in the second link (link2), reception of the first station (STA1) in the first link (link1) may be disturbed by transmission performed in the second link (link2). For example, in the following case, reception of the first station (STA1) in the first link (link1) may be interrupted by transmission performed in the second link (link2). The second station (STA2) transmits first data (data 1) in the second link (link 2), and the first AP (AP1) transmits a response (ack for data1) to the first data (data1) to the first station (STA1). The second station (STA2) transmits second data (data2) in the second link (link2). At this time, a transmission time point of the second data (data2) may overlap a transmission time point of the response (ack for data1) to the first data (data1). The first link (link1) may be interfered by transmission to the second station (STA2) in the second link (link 2). Accordingly, the first station (STA1) may not receive the response (ack for data1) to the first data (data1).

An operation in which the multi-link device performs channel access is described. The operation of the multi-link without detailed description may follow the channel access described with reference to FIG. 6.

The multi-link device may independently perform channel access in a plurality of links. At this time, the channel access may be backoff-based channel access. When the multi-link device independently performs the channel access in a plurality of links and a backoff counter reaches 0 in the plurality of links, the multi-link device may simultaneously perform transmission in the plurality of links. In a detailed embodiment, when one of the backoff counters of the multi-link reach 0 and a predetermined condition is satisfied, the multi-link device may perform channel access not only in the link in which the backoff counter reaches 0 but also in another link in which the backoff counter does not reach 0. Specifically, when one of the backoff counters of the multi-link reaches 0, the multi-link device may detect energy in another link in which the backoff counter does not reach 0. At this time, when energy having a predetermined size or larger is not detected, the multi-link device may perform channel access not only in the link in which the backoff counter reaches 0 but also in the link in which energy is detected. Accordingly, the multi-link device may simultaneously perform transmission in the plurality of links. The size of a threshold value used for energy detection may be smaller than the size of a threshold value used for determining whether to reduce the backoff counter. Further, when it is determined whether to reduce the backoff counter, the multi-link device may detect any type of signal as well as a WLAN signal. In the energy detection, the multi-link device may detect any type of signal as well as the WLAN signal. Internal leakage may not be detected by the WLAN signal. In this case, the multi-link device may sense a signal detected due to internal leakage by energy detection. Further, as described above, the size of a threshold value used for energy detection may be smaller than the size of a threshold value used for determining whether to reduce the backoff counter. Accordingly, the multi-link device may reduce the backoff counter in another link even while transmission is performed in one link.

According to a degree of interference between links used by the multi-link device, the multi-link device may determine whether the station operating in each link may independently operate. At this time, the degree of interference between links may be the size of interference detected by, when one station performs transmission in one link, another station of the multi-link device. When transmission by the first station of the multi-link device in the first link gives interference having a predetermined size or larger to the second station of the multi-link device operating in the second link, the operation of the second station may be restricted. Specifically, reception or channel access of the second station may be restricted. This is because, when interference is generated, the second station may fail in decoding of the received signal due to interference. Further, this is because, when interference is generated, the second station may determine that the channel is being used when the second station performs channel access using the backoff.

When transmission by the first station of the multi-link device in the first link gives interference having a size smaller than a predetermined size to the second station of the multi-link device operating in the second link, the first station and the second station may independently operate. Specifically, when transmission by the first station of the multi-link device in the first link gives interference having a size smaller than a predetermined size to the second station of the multi-link device operating in the second link, the first station and the second station may independently perform channel access. Further, when transmission by the first station of the multi-link device gives interference having a size smaller than a predetermined size to the second station of the multi-link device operating in the second link, the first station and the second station may independently perform transmission or reception. This is because, when interference having the size smaller than the predetermined size is generated, the second station may succeed in decoding the received signal even when the interference exists. Further, this is because, when interference having the size smaller than the predetermined size is generated, the second station may determine that the channel is idle when the second station performs channel access using the backoff.

The degree of interference generated between stations of the multi-link device may vary depending on a hardware characteristic of the multi-link device as well as the interval between frequency bands of the links in which the stations operate. For example, internal interference generated in the multi-link device including an expensive radio frequency (RF) device may be smaller than internal interference generated in the multi-link device including a cheap RF device. Accordingly, the degree of interference generated between the stations of the multi-link device may be determined based on a characteristic of the multi-link device.

FIG. 10 illustrates that the size of generated interference varies depending on the interval between frequency bands of the links and the characteristic of the multi-link device. In the embodiment of FIG. 10, a first multi-link device (MLD #1) includes a first station (STAT-1) operating in a first link (link1) and a second station (STAT-2) operating in a second link (link2). A second multi-link device (MLD #2) includes a first station (STA2-1) operating in a first link (link1) and a second station (STA2-2) operating in a second link (link2). A frequency interval between the first link (link1) and the second link (link2) in which the first multi-link device (MLD #1) operates is the same as a frequency interval between the first link (link1) and the second link (link2) in which the second multi-link device (MLD #2) operates. However, the size of generated interference may be different due to difference between a characteristic of the first multi-link device (MLD #1) and a characteristic of the second multi-link device (MLD #2). Specifically, the size of interference generated in the first multi-link device (MLD #1) may be larger than the size of interference generated in the second multi-link device (MLD #2). As described above, the size of generated interference may vary depending on the characteristic of the multi-link device, and it may be required to exchange information on whether STR is supported when it is considered that whether STR is supported is different according to each multi-link device.

The multi-link device may signal information on whether STR is supported by the station included in the multi-link device. Specifically, an AP multi-link device and a non-AP multi-link device may exchange information on whether STR is supported by the AP included in the AP multi-link device and whether STR is supported by the STA included in the non-AP multi-link device. In such embodiments, an element indicating whether STR is supported may be used. The element indicating whether STR is supported may be referred to as an STR support element. The STR support element may indicate whether STR is supported by the station of the multi-link device transmitting the STR support element through 1 bit. Specifically, the STR support element may indicate whether STR is supported by each station included in the multi-link device transmitting the STR support element by 1 bit. At this time, a value of the bit may be 1 when the station supports STR, and the value of the bit may be 0 when the station does not support STR. When the multi-link device transmitting the STR support element includes a first station (STA1), a second station (STA2), and a third station (STA3), the first station (STA1) and the third station (STA3) support STR, and the second station (STA2) does not support STR, the STR support element may include a field having 1011b. It is assumed that stations operating in different frequency bands support STR, and the STR support element may omit signaling indicating whether STR is supported between the stations operating in different frequency bands. For example, the first station (STA1) operates in a first link of 2.4 GHz, and the second station (STA2) and the third station (STA3) operate in a second link and a third link of 5 GHz, respectively. The STR support element may indicate that STR is supported between the second station (STA2) and the third station (STA3) by using 1 bit. Further, the STR support element may include only 1 bit when the number of stations signaled by the STR support element is 2.

In a detailed embodiment, the relation between the link located in 2.4 GHz and the link located in 5 GHz or 6 GHz among the links of the multi-link device may be always determined to STR. Accordingly, signaling for STR of the link located in 2.4 GHz and the link located in 5 GHz or 6 GHz may be omitted.

Figure 11:
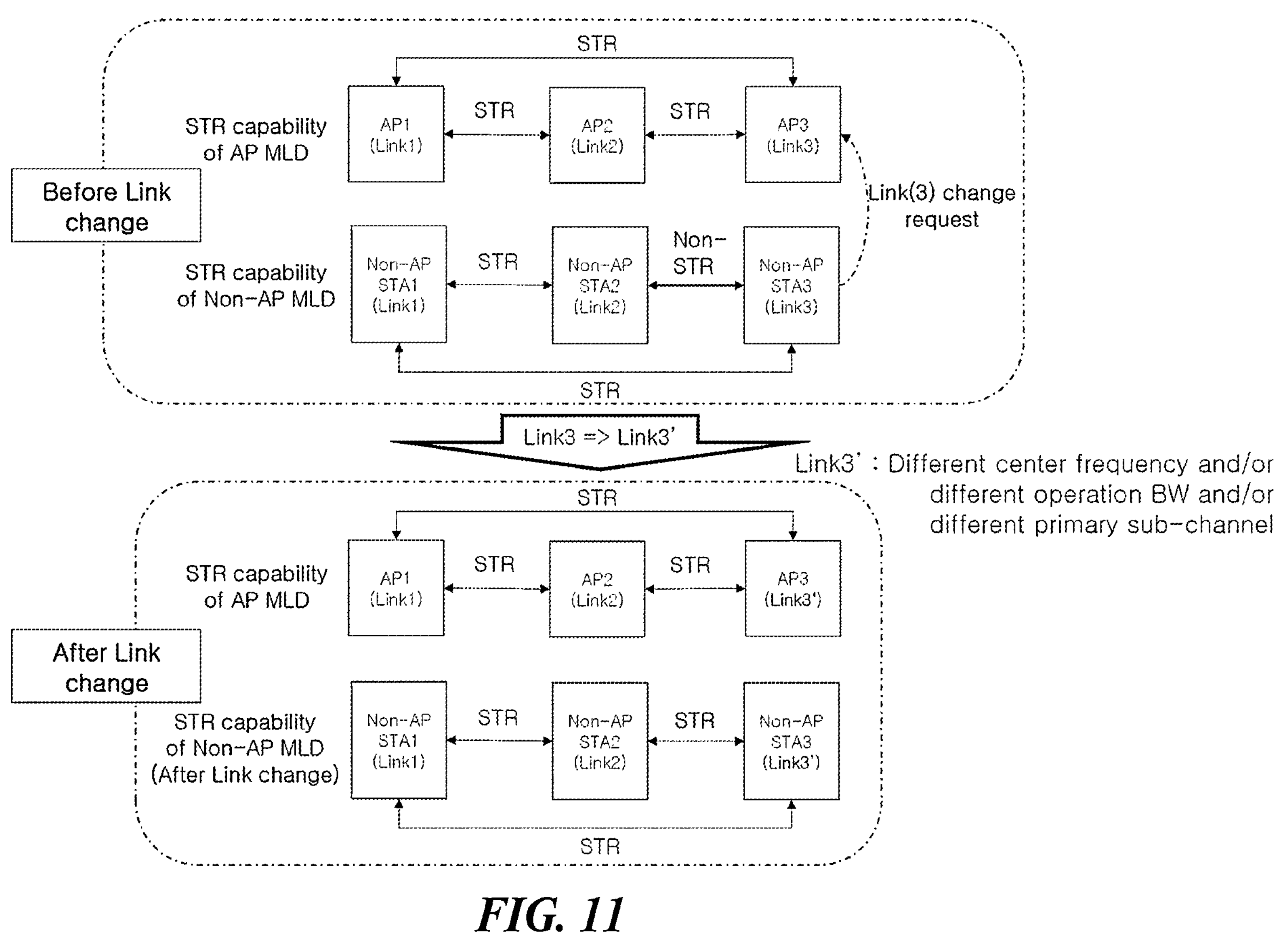
FIG. 11 illustrates an operation of a multi-link device when a link is changed according to an embodiment of the disclosure.

FIG. 11 illustrates an operation of the multi-link device when a link is changed according to an embodiment of the disclosure.

When a frequency band of a link is changed, the STR support element may be changed. As described above, this is because whether STR is supported by the station may vary depending on the distance between frequency bands of the links, and when the frequency band of the link is changed, whether STR is supported by the station may be changed. The change in the frequency band of the link may include at least one of a change in the central frequency, a change in a bandwidth of the frequency band, and a main channel of 200 MHz. The AP and the station may exchange the STR support element through a request and a response. In another detailed embodiment, when the frequency band of the link is changed, the STR support element may be exchanged without any separate request. Further, in the above-described embodiments, the change in the frequency band of the link may include a change in an operating channel of the station.

When the station of the non-AP multi-link device cannot perform STR, the station of the non-AP multi-link device may make a request for changing the link to the AP. Specifically, the station of the non-AP multi-link device may make a request for changing at least one of the central frequency, the bandwidth of the frequency band, and the main channel of 20 MHz. The link change request may be transmitted to the AP through the link requested to be changed. In another detailed embodiment, the link change request may be transmitted to the AP through a link which is not requested to be changed. At this time, the link change request may include information indicating the link requested to be changed. The information indicating the link may be a number for identifying the link. In such embodiments, the change in the link may be a change in an operating channel within one frequency band. Further, the change in the link may include information on a method of changing the link. Specifically, the link change request may indicate whether to move the central frequency of the link to a frequency higher than the current central frequency or move the central frequency of the link to a frequency lower than the current central frequency. In another detailed embodiment, the link change request may implicitly indicate a change to a frequency band farther from an adjacent link. Further, the link change request may indicate a decrease in the bandwidth. The link change request may be a request for changing the location of the main channel. Specifically, the link change request may indicate a change in the location of the main channel to a channel of a frequency band lower than the location of the main channel or a channel of a frequency band higher than the location of the main channel. The AP receiving the link change request may change the link according to the link change request. Further, in a detailed embodiment, the AP receiving the link change request may ignore the link change request.

In the embodiment of FIG. 11, the second station (STA2) and the third station (STA3) of the non-AP multi-link device cannot support STR. The non-AP multi-link device makes a request for changing a third link (link3) to the AP multi-link device. The AP multi-link device receiving the link change request changes the operating link of the third AP (AP3). At this time, the third station (STA3) operating in the third link (link3) to be changed may transmit a change request to the third AP (AP3). In another detailed embodiment, the station which does not operate in the third link (link3) may transmit a change request to the AP which does not operate in the third link (link3).

When the AP changes the link, the AP may broadcast information on the link change through a beacon frame. At this time, the information on the link change may include information on the frequency of the link. The information on the frequency of the link may include at least one of changes in the operating bandwidth and the main channel. Further, the information on the link change may include information on a link change time point. In addition, the link change may be completed when a beacon including the information on the link change is transmitted.

In FIG. 11, the link in which the third station (STA3) operates is changed and thus the third station (STA3) and the second station (STA2) may support STR. As described above, the non-AP multi-link device may transmit the STR support element to the AP multi-link device and signal information indicating a change in supporting of STR.

The link change may not be allowed, or STR may not be supported through the link change. As illustrated in the embodiment of FIG. 11, the AP multi-link device may support STR but the non-AP multi-link device may not support STR. This is because it is common to use a relatively expensive device for the AP multi-link device and use a relatively cheap device for the non-AP multi-link device. Accordingly, in communication between multi-link devices, a method of, even when one multi-link device does not support STR, performing efficient communication is needed. At this time, STR may indicate the simultaneously performance of transmission and reception. This will be described with reference to FIG. 12.

Figure 12:
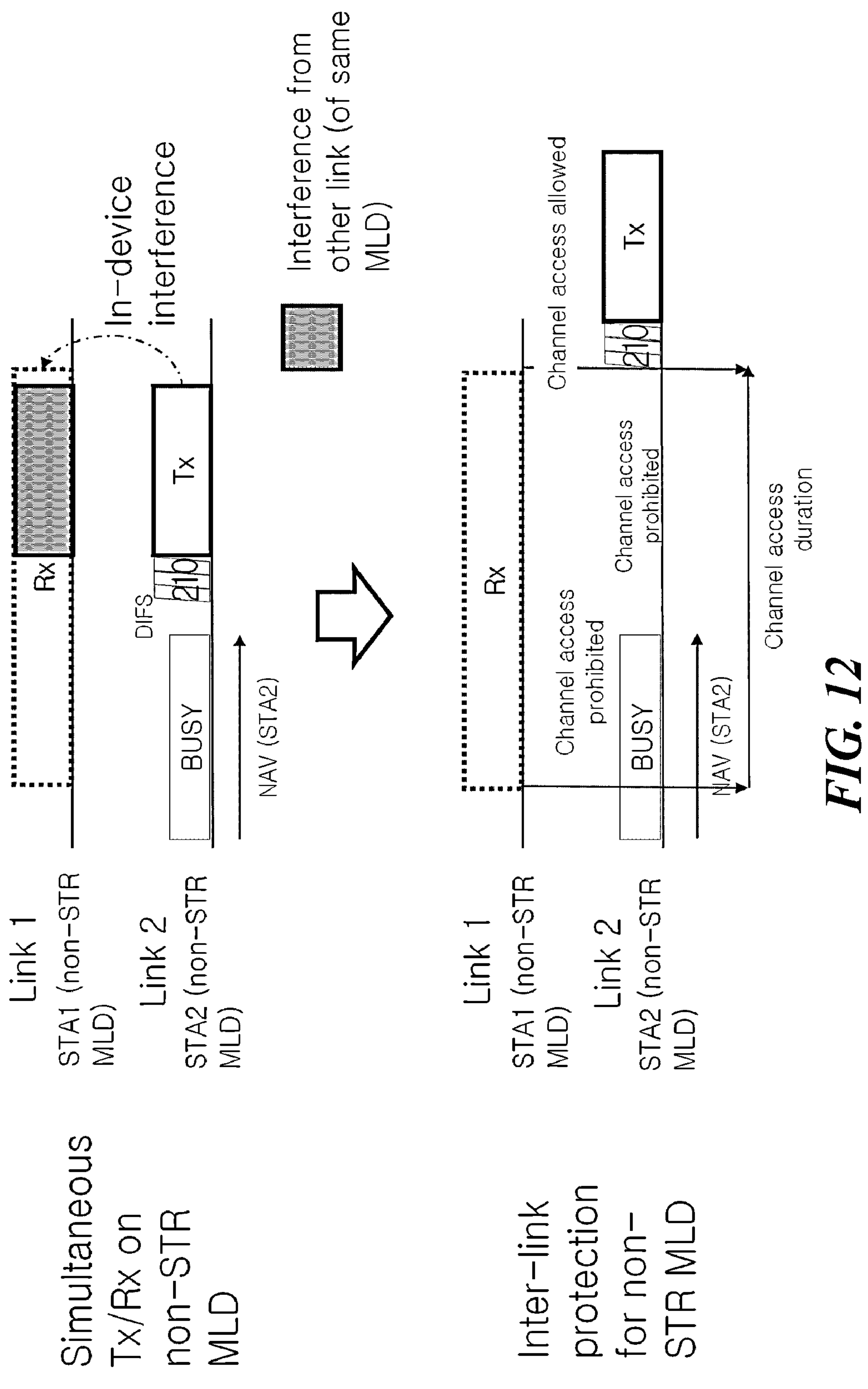
FIG. 12 illustrates prohibition of channel access of another station of a non-STR multi-link device when one station of the non-STR multi-link device performs reception according to an embodiment of the disclosure.

FIG. 12 illustrates that, when reception of one station of the non-STR multi-link device is performed, channel access of another station of the non-STR multi-link device is restricted according to an embodiment of the disclosure.

When transmission by the non-STR multi-link device is performed in one link and reception by the non-STR multi-link device is performed in another link, the reception and the transmission of the non-STR multi-link device may fail. In order to solve the problem, when reception by the non-STR multi-link device is performed in one link, channel access by the non-STR multi-link device in another link may be restricted. Specifically, when reception by the non-STR multi-link device is performed in one link, the backoff of channel access by the non-STR multi-link device in another link may be restricted. Accordingly, when reception by the non-STR multi-link device is performed in one link, the start of transmission by the non-STR multi-link device in another link may be prevented. In a detailed embodiment, when reception by the non-STR multi-link device starts in one link, the backoff of channel access by the non-STR multi-link device in another link may be restricted. It may be configured through a specific bit of the memory such as a channel access restriction flag. Whether to restrict channel access may be shared through the memory within the multi-link device. Through such an embodiment, channel access restriction may be implemented without separate frame exchange. For convenience of description, channel access restriction used in the specification indicates restriction of channel access or transmission in order to protect transmission or reception by the non-STR multi-link device unless there is a separate description.

When channel access is restricted, the station operating in the link in which the channel access is restricted cannot perform a backoff procedure regardless of the NAV and CCA result. Further, when the channel access is restricted, the station operating in the link in which the channel access is restricted cannot perform transmission regardless of the NAV and CCA result. However, even though the channel access is restricted, the station operating in the link in which the channel access is restricted can perform reception. Further, channel access restriction in the second link due to reception performed in the first link may be released based on a time point at which the reception in the first link is completed. Specifically, channel access restriction in the second link due to reception performed in the first link may be released when the reception in the first link is completed. In another detailed embodiment, channel access restriction in the second link due to reception performed in the first link may be released based on a time point at which ACK is transmitted after the reception in the first link is completed. Specifically, channel access restriction in the second link due to reception performed in the first link may be released at the time point at which ACK is transmitted after the reception in the first link is completed. In another detailed embodiment, channel access restriction in the second link due to reception performed in the first link may be released at a time point at which ACK transmission is completed after the reception in the first link is completed. Further, after the channel access restriction is released, the station may immediately reduce the backoff counter without additional sensing. At this time, the additional sensing may indicate sensing performed during a DCF interframe space (DIFS). In another detailed embodiment, when the channel is idle for a predetermined time right before the channel access restriction is released, the station may immediately reduce the backoff counter without additional sensing. At this time, the predetermined time may be one of a PCF interframe space (PIFS), a short interframe space (SIFS), and an arbitration interframe space (AIFS).

In the embodiment of FIG. 12, the non-STR multi-link device includes the first station (STAT) operating in the first link (link1) and the second station (STA2) operating in the second link (link2). When the second station (STA2) performs transmission in the second link (link2) while the first station (STAT) performs reception, intra-device interference is generated. As described above, channel access by the second station (STA2) performed in the second link (link2) is restricted while the first station (STAT) operating in the first link (link1) performs reception. After reception by the first station (STAT) in the first link (link1) is completed, channel access restriction is released. Right after the channel access restriction is released, the second station (STA2) may reduce a value of the previous backoff counter by 1 from 3 to 2 without additional sensing.

For convenience of expression, a single block (Tx solid line, Rx dotted line) is used to express Rx and Tx in the drawing used by FIG. 12, and it may be understood that the single block expresses an operation including Tx/Ack reception and Rx/Ack transmission even though a separate Ack block is not illustrated. This may be equally applied to the following drawings.

When the station identifies that a received PPDU is not a receiver intended by the station, the station may stop reception of the PPDU. In this case, the operation of releasing channel access prohibition by the multi-link device is a problem. The intended receiver in the specification is used to have the same meaning as a destination station.

Figure 13:
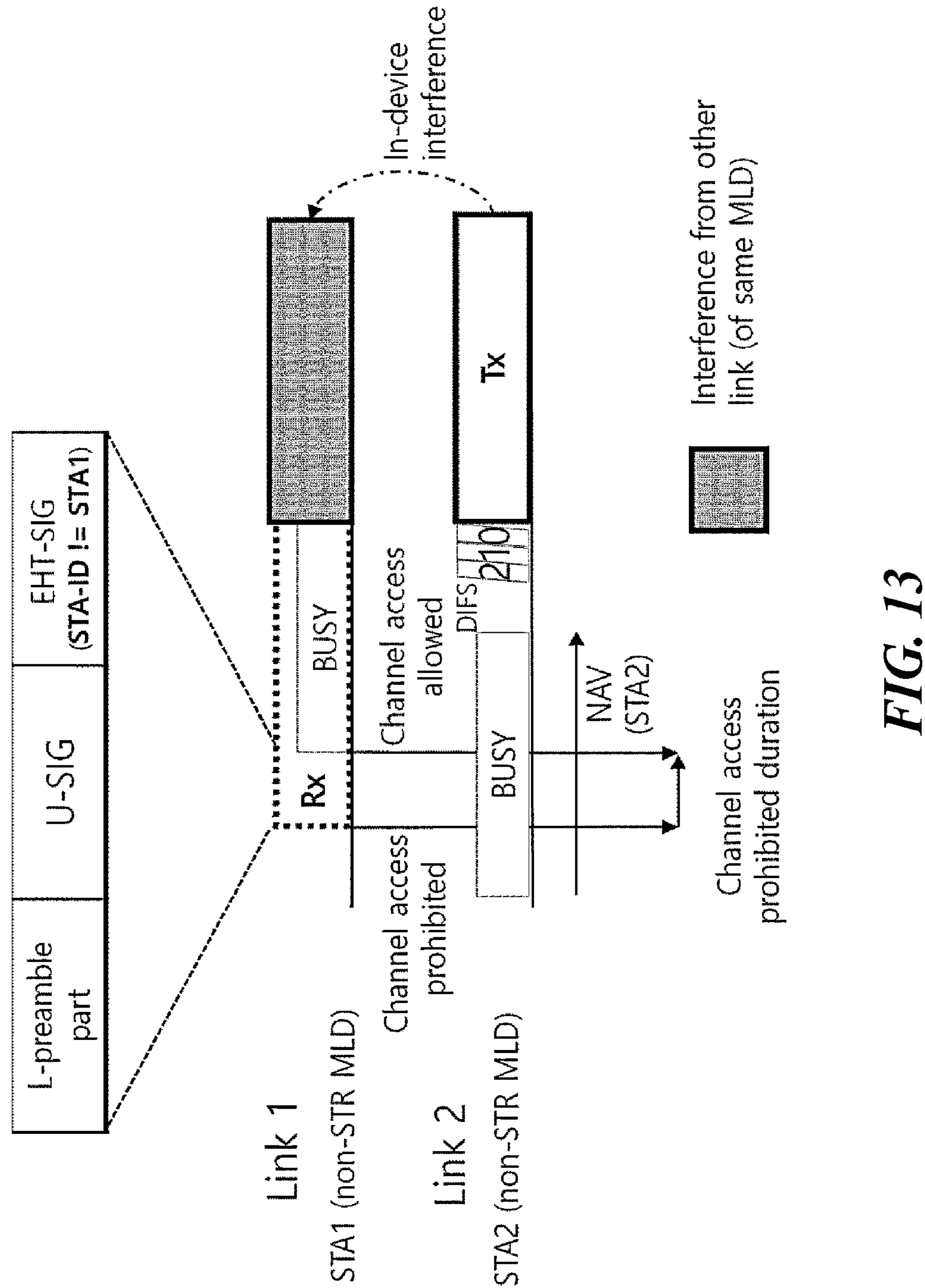
FIG. 13 illustrates an operation of releasing channel access prohibition when it is identified that an intended receiver of a PPDU received by the station of the non-STR multi-link device is not the station.

FIG. 13 illustrates the operation of releasing the channel access prohibition when it is identified that an intended receiver of a PPDU received by the station of the non-STR multi-link device is not the station according to an embodiment of the disclosure.

When the station identifies that the received PPDU is not the receiver intended by the station, the station may release channel access prohibition. The station may determine whether the station is the intended receiver of the PPDU based on information indicating a receiver address of a signaling field of the PPDU. At this time, the information indicating the receiver address of the signaling field of the PPDU may be a value of the STA-ID field of the EHT-SIG field. Specifically, the station may determine whether the STA-ID field of the EHT-SIG field indicates the station. Further, the station may determine whether the station is the intended receiver of the PPDU based on a value of an RA field of a MAC frame included in the PPDU. Specifically, the station may determine whether the RA field of the MAC frame included in the PPDU indicates the station. In FIG. 13, the non-STR multi-link device includes the first station (STA1) operating in the first link (link1) and the second station (STA2) operating in the second link (link2). The first station (STA1) receives the PPDU. The first station (STA1) determines that the intended receiver of the received PPDU is not the first station (STA1) and stops receiving the PPDU. At this time, the first station (STA1) may release channel access prohibition of the second station (STA2). Even though the channel access prohibition of the second station (STA2) is released, channel access of the second station (STA2) may be delayed according to NAV configured in the second station (STA2).

As illustrated in FIG. 13, even though the channel access prohibition is released, the station included in the non-STR multi-link device may not have the channel access opportunities more frequently than the station which is not included in the multi-link device or the station included in the STR multi-link device. Accordingly, for fair competition with other stations, a method of guaranteeing the channel access opportunities of the station included in the non-STR multi-link device may be needed. For example, after releasing the channel access prohibition, the station of which channel access is prohibited may be allowed to reduce the backoff counter by 2 or more. This will be described with reference to FIG. 14.

Figure 14:
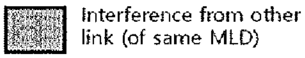
FIG. 14 illustrates the performance of channel access by the station after channel access prohibition is released according to an embodiment of the disclosure.
Figure 14:
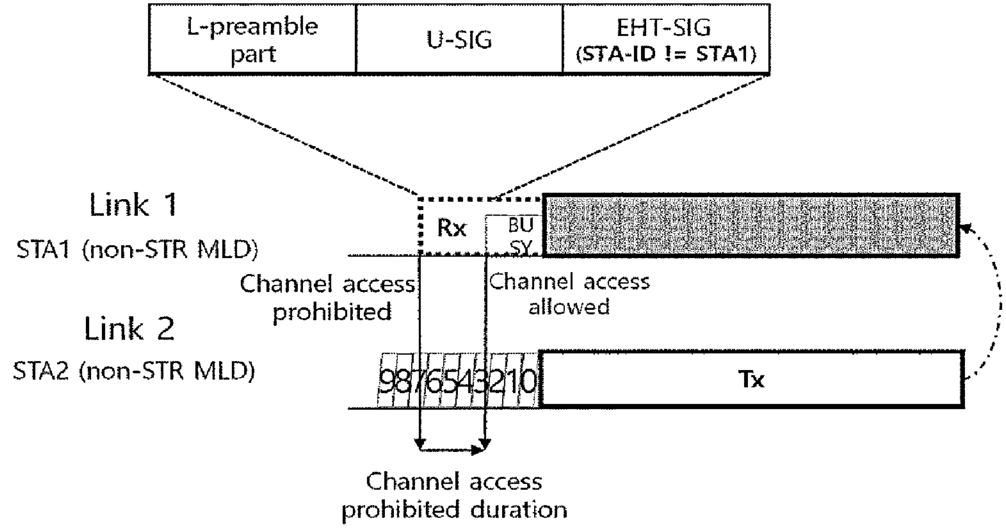
Figure 14:
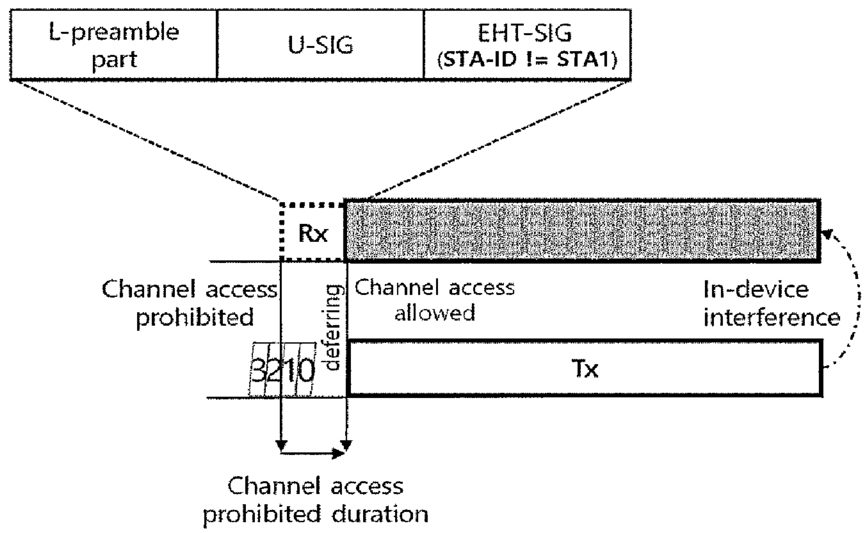

FIG. 14 illustrates the performance of channel access by the station after channel access prohibition is released according to an embodiment of the disclosure.

The station of which channel access prohibition is released may reduce the backoff counter by 2 or more after the channel access prohibition is released. This is to have balance of channel access opportunities with other stations since other stations perform the backoff procedure while the channel access of the station is prohibited.

In another detailed embodiment, the station of which channel access is prohibited may perform a channel access procedure of reducing CCA (CSMA) and the backoff counter while the channel access is prohibited. In FIG. 14, the non-STR multi-link device includes the first station (STA1) operating in the first link (link1) and the second station (STA2) operating in the second link (link2). In FIG. 14, channel access of the second station (STA2) is prohibited while the first station (STA1) performs reception. In FIG. 14(*a*), the second station (STA2) may perform a channel access procedure of reducing CCA (CSMA) and the backoff counter while the channel access of the second station (STA2) is prohibited. In FIG. 14(*a*), since the channel of the second link (link2) is idle while the channel access of the second station (STA2) is prohibited, the second station (STA2) reduces the backoff counter.

Further, the station of which channel access is prohibited may delay transmission without starting transmission even though the backoff counter reaches 0 while the channel access is prohibited. At this time, the station may maintain the value of the backoff counter as 0. Further, although the station delays transmission, the station may maintain the value of CW. Accordingly, it is differentiated from doubling of the value of the CW by the station since the channel accessed by the station is busy. This is because the reason of delayed transmission is not the case in which it is determined that the channel is being used. In FIG. 14(*b*), the second station (STA2) may perform a channel access procedure of reducing CCA (CSMA) and the backoff counter while the channel access of the second station (STA2) is prohibited. In FIG. 14(*b*), since the channel of the second link (link2) is idle while the channel access of the second station (STA2) is prohibited, the second station (STA2) reduces the backoff counter. The backoff counter of the second station (STA2) reaches 0 while the channel access of the second station (STA2) is prohibited. The second station (STA2) delays transmission and starts transmission after the channel access prohibition is released.

As described above, the channel access prohibition may include prohibition of transmission of the second station when the first station of the non-STR multi-link device performs transmission. Further, the channel access prohibition may include prohibition of transmission of the second station when the first station of the non-STR multi-link device performs reception.

When the number of stations of which channel access is prohibited is plural in embodiments of FIG. 14(*b*), the probability of attempt of simultaneous release of channel access prohibition of the plurality of stations and simultaneous transmission of the plurality of stations is high. Accordingly, a method of reducing a transmission collision probability is needed. This will be described with reference to FIG. 15.

Figure 15:
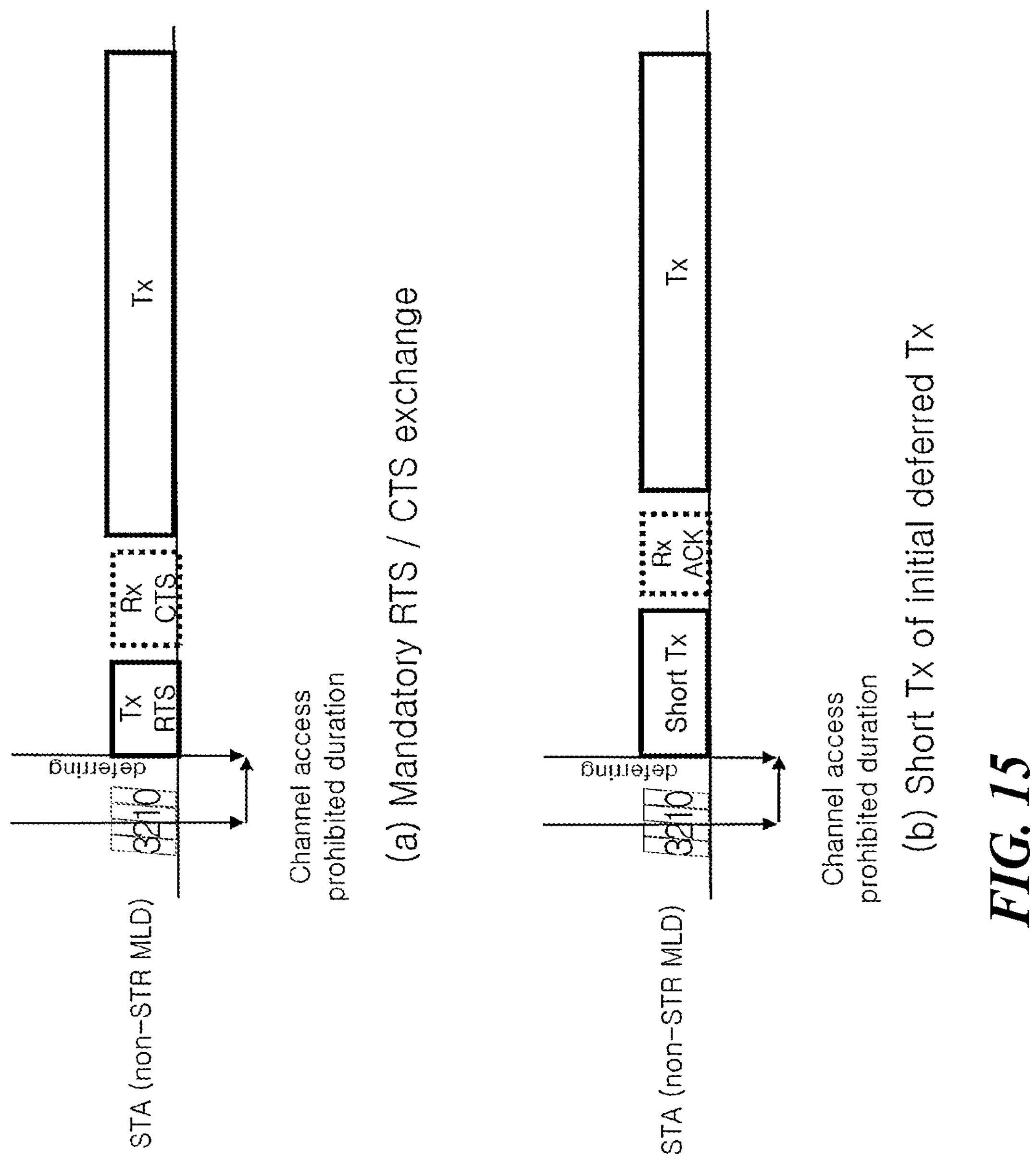
FIG. 15 illustrates an operation in which the station performs transmission after channel access prohibition is released according to an embodiment of the disclosure.

FIG. 15 illustrates an operation in which the station performs transmission after the release of channel access prohibition according to an embodiment of the disclosure.

As described above, transmission is performed in the first link among the plurality of links in which the non-STR multi-link device operates, and thus transmission may be prohibited in the second link. When the corresponding transmission is completed in the first link, transmission in the second link may start by RTS/CTS frame exchange. Accordingly, when transmission is performed in the first link among the plurality of link in which the non-STR multi-link device operates, the non-STR multi-link device may start the RTS/CTS frame exchange in the second link. After the release of channel access prohibition of the station of which transmission is delayed due to channel access prohibition, the station may start request to send (RTS)/clear to send (CTS) frame exchange before starting delayed transmission. At this time, when the station does not receive the CTS frame, the delayed transmission may not start. In the embodiment of FIG. 15(*a*), the station of which transmission is delayed due to channel access prohibition transmits the RTS frame before starting delayed transmission. The station starts delayed transmission after receiving the CTS frame in response to the RTS frame.

In another detailed embodiment, after channel access prohibition of the station of which transmission is delayed due to channel access prohibition is released, the station may transmit a frame including only some of the delayed transmission. At this time, after receiving a response to the frame including only some of the delayed transmission, for example, ACK, the station may transmit the part of the delayed transmission which has not been transmitted. When the station does not receive the response to the frame including only some of the delayed transmission, the station may not transmit the part of the delayed transmission which has not be transmitted. As described above, the station starts the RTS/CTS exchange or transmits only some of the delayed transmission by the station after the channel access prohibition is released because a collision probability of transmission after the channel access prohibition may be higher than that of general transmission. Accordingly, the above-described embodiment may be mandatorily applied to transmission performed after the release of channel access prohibition. In the conventional WLAN operation, the RTS/CTS frame was used to solve the hidden node problem and could be used based on the size of transmission data. In the above-described embodiments, the RTS/CTS frame is to prevent transmission collision with the station to perform delayed transmission in order to protect transmission or reception of the non-STR multi-link device.

As described above, when one station of the non-STR multi-link device performs reception, transmission of another station of the non-STR multi-link device may be restricted. Further, when one station of the non-STR multi-link device performs transmission, it may be difficult to accurately sense a channel state of a link in which another station of the non-STR multi-link device operates. Specifically, when the first station of the non-STR multi-link device performs transmission, the second station of the non-STR multi-link device may determine that a channel state of a link in which the second station operates is always busy. Accordingly, even though the channel of the link in which the second station operates is idle, the second station may determine that the channel is busy due to intra-device interference. As described above, when the station of which the channel state cannot be determined due to intra-device interference or when one station of the non-STR multi-link device continuously performs transmission, another station of the non-STR multi-link device is in a blind state. Due to the above-described situations, the station in the blind state may have difficulty in attempting transmission through the backoff procedure. Further, due to the above-described situations, the station in the blind state may have difficulty in starting reception of the PPDU or succeeding in decoding. Accordingly, a method of performing transmission in consideration of the station in the blind state is needed. This will be described with reference to FIG. 16.

Figure 16:
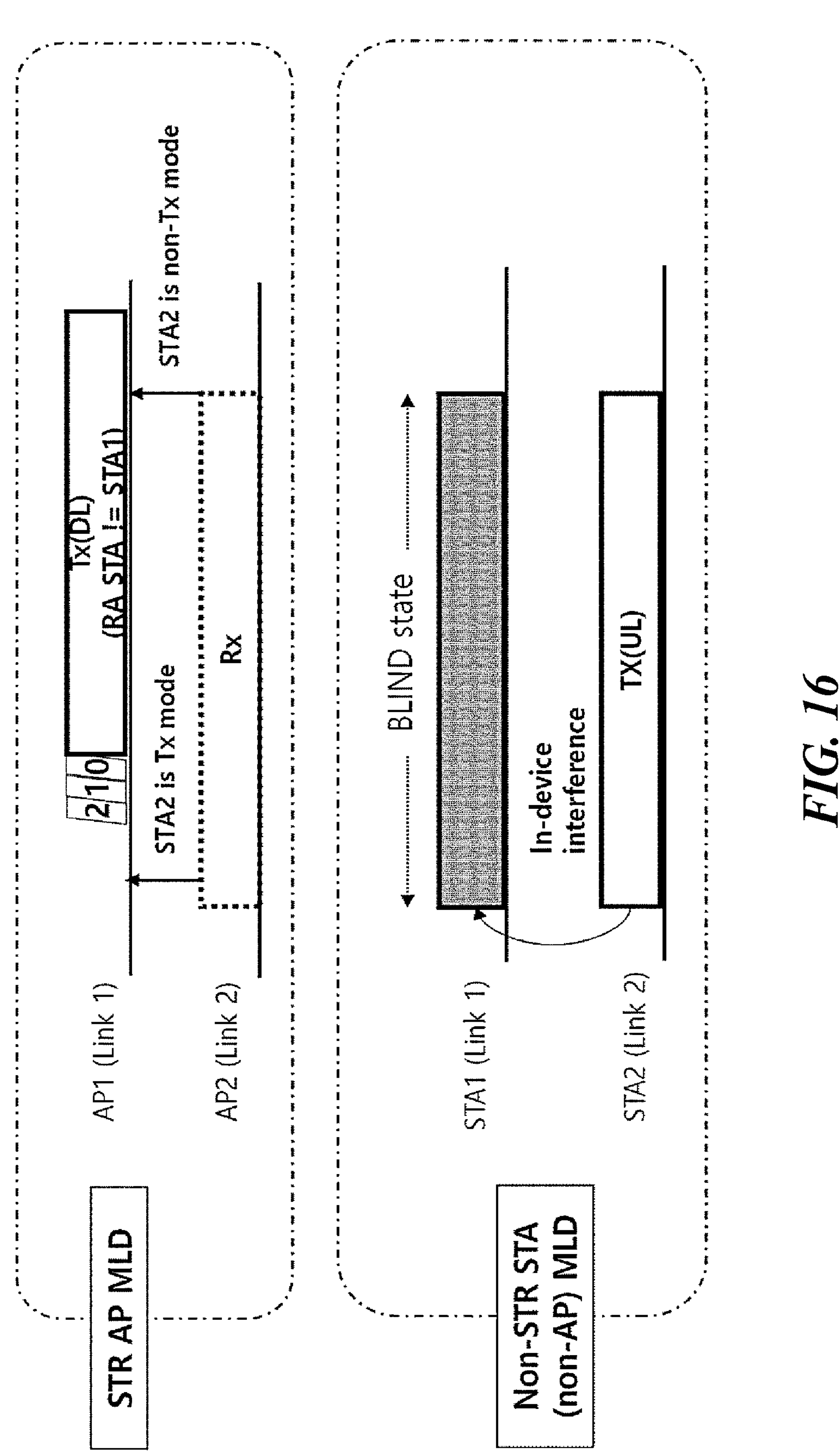
FIG. 16 illustrates transmission performed based on a state of the station within the non-STR multi-link device according to an embodiment of the disclosure.

FIG. 16 illustrates transmission performed based on a state of a station within the non-STR multi-link device according to an embodiment of the disclosure.

The station to perform transmission to the station of the non-STR multi-link device may determine whether to perform transmission according to whether the station of the non-STR multi-link device is in the blind state. At this time, the station to perform transmission to the station of the non-STR multi-link device may be a station included in the STR multi-link device. Further, the station to perform transmission to the station of the non-STR multi-link device may be an AP included in the AP multi-link device, and the non-STR multi-link device may be a non-AP multi-link device The station to perform transmission to the station of the non-STR multi-link device may determine whether the station of the non-STR multi-link device is in the blind state based on the following description. The station to perform transmission may determine whether another station of the multi-link device including the station is performing transmission to the corresponding non-STR multi-link device. When another station of the multi-link device including the station is performing reception from the corresponding non-STR multi-link device, the station may determine that the station of the non-STR multi-link device to receive transmission of the station is in the blind state. In the embodiment of FIG. 16, the STR AP multi-link device includes a first AP (AP1) operating in a first link (link1) and a second AP (AP2) operating in a second link (link2). The non-STR multi-link device includes the first station (STAT) operating in the first link (link1) and the second station (STA2) operating in the second link (link2). The second station (STA2) is performing transmission to the second AP (AP2). Accordingly, the second AP (AP2) may inform the first AP (AP1) that reception is being performed from the second station (STA2). Specifically, the second AP (AP2) may inform the first AP (AP1) that the entity of transmission to the second AP (AP2) is the second station (STA2). In another detailed embodiment, the second AP (AP2) may inform the first AP (AP1) that the second station (STA2) currently performs transmission. At this time, the first AP (AP1) may determine that the first station (STAT) is in the blind state based on the notification.

That station may not perform transmission to the station in the blind state. This is because there is high probability that the station in the blind state cannot start reception or the station in the blind state cannot decode the PPDU even though transmission is performed to the station in the blind state. At this time, the station may cancel transmission to the station in the blind state and may perform transmission to another station.

When the STR multi-link device performs transmission to the non-STR multi-link device, the STR multi-link device may perform transmission to the non-STR multi-link device in a plurality of links. Specifically, when the STR multi-link device performs transmission to the non-STR multi-link device in the first link, the STR multi-link device may start transmission to the non-STR multi-link device in the second link. At this time, the STR multi-link device may determine the length of transmission performed in the second link based on the transmission corresponding to transmission to the non-STR multi-link device. Specifically, the STR multi-link device may determine the length of transmission to the non-STR multi-link device in the second link based on the length of the transmission to the non-STR multi-link device in the first link. In a detailed embodiment, the STR multi-link device may simultaneously end the transmission in the first link and the transmission in the second link. This is to prevent transmission to another station of the non-STR multi-link device while one of the stations of the non-STR multi-link device transmits a response, for example, ACK after transmission to one of the stations of the non-STR multi-link device first ends. Through the above-described embodiment, a plurality of stations of the non-STR multi-link device may simultaneously transmit responses to transmission to the plurality of stations.

The STR multi-link device cannot determine states of the stations included in the non-STR multi-link device in real time. Accordingly, even though the STR multi-link device operates according to the embodiments described with reference to FIG. 16, interference or transmission collision may be generated between links in which the non-STR multi-link device operates. For example, in the embodiment of FIG. 16, the first AP (AP1) may start transmission to the first station (STAT) before recognizing that the second station (STA2) is performing transmission to the second AP (AP2). As described above, a probability of inter-link interference or collision may be higher than a probability of intra-link interference or transmission collision. This will be described in more detail with reference to FIG. 17.

Figure 17:
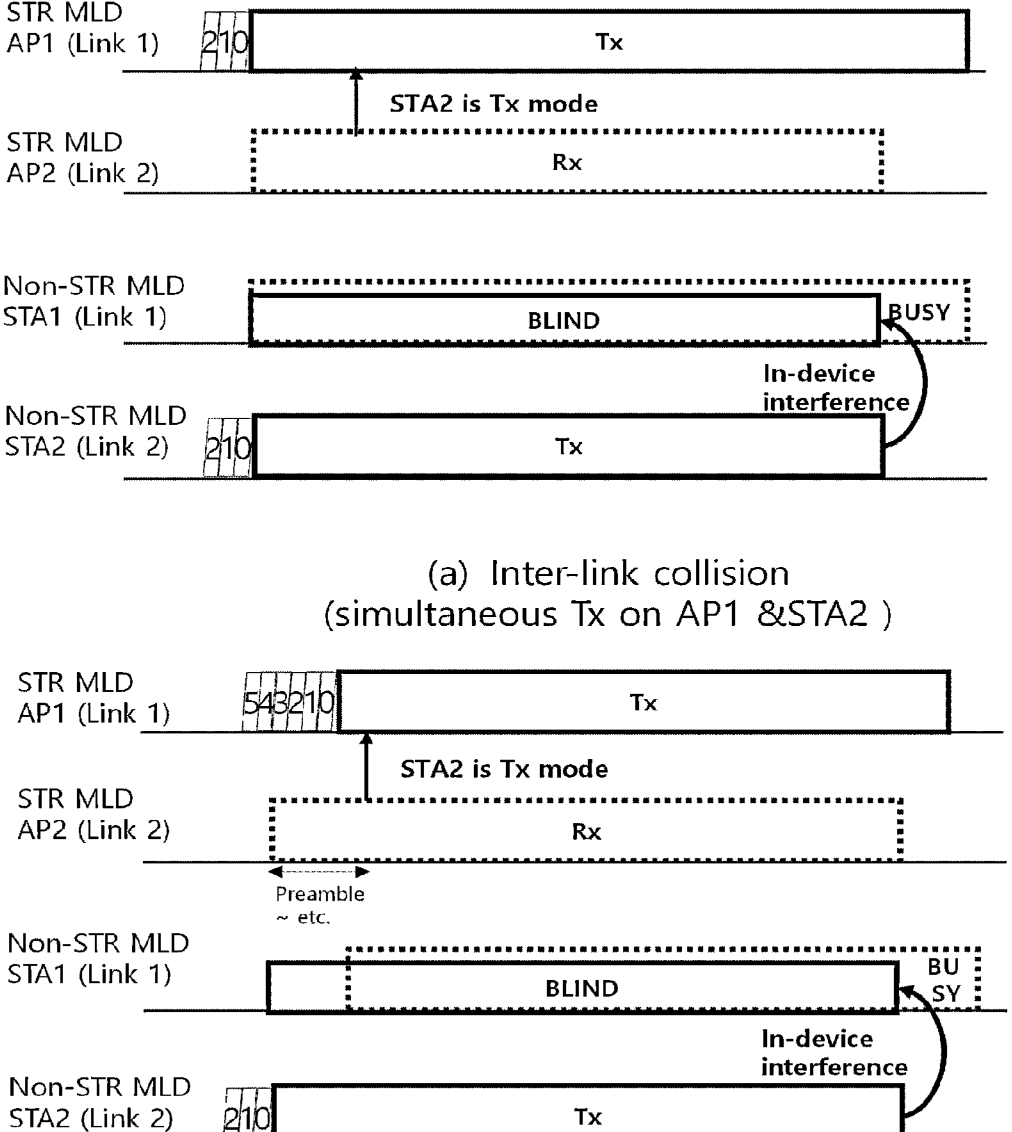
FIG. 17 illustrates a situation in which interference or collision between links may be generated.

FIG. 17 illustrates a situation in which inter-link interference or collision is generated.

When transmission to the second AP of the STR AP multi-link device by the second station of the non-STR station multi-link device and transmission to the first station of the non-STR multi-link device by the first AP of the STR AP multi-link device simultaneously start, transmission collision may be generated between links. FIG. 17(*a*) illustrates the same. This is because, as described above, the STR multi-link device cannot determine the states of the stations included in the non-STR multi-link device in real time.

Further, even when transmission to the second AP of the STR AP multi-link device by the second station of the non-STR multi-link device starts earlier than transmission to the first station of the non-STR multi-link device by the first AP of the STR-AP multi-link device, transmission collision may be generated between links. FIG. 17(*b*) illustrates the same. This is because it takes time for the second AP (AP2) to inform the first AP (AP1) that the second station (STA2) is performing transmission. As described above, since transmission collision is generated between stations starting transmission at different time points, the probability of inter-link interference or transmission collision may be higher than the probability of intra-link interference or collision. Further, as the time spent for identifying a transmitter of the PPDU received by the AP of the STR multi-link device is delayed, the probability of interference or transmission collision between links may be higher. Accordingly, a method of solving the problem is needed. When one of the stations of the STR multi-link device performs reception, another station of the STR multi-link device may not perform channel access. However, when the channel access is prohibited, the meaning of implementation of the STR function may disappear. Accordingly, an operation method other than the channel access prohibition of the STR multi-link device is required. This will be described with reference to FIG. 18.

As described above, it may be important for a multi-link device to promptly determine a station performing transmission to the multi-link device. A user field of EHT-SIG of an EHT UL PPDU may indicate an identifier (STA-ID) of a station transmitting the EHT UL PPDU. Specifically, when a DL/UL field of a signaling field of an EHT PPDU indicates that the EHT PPDU is a UL PPDU, the user field of EHT-SIG of the EHT PPDU may indicate an identifier of a station transmitting the EHT UL PPDU. A multi-link device receiving the EHT PPDU may identify a station transmitting the EHT PPDU, based on the user field of EHT-SIG of the EHT UL PPDU. Through this, an AP multi-link device may determine the station transmitting the EHT UL PPDU, and the AP multi-link device may determine a transmission destination device. Specifically, the AP multi-link device may determine whether there is high possibility that transmission to be performed fails due to an inter-link conflict. In addition, if there is high possibility that transmission to be performed by the AP multi-link device fails, the AP multi-link device may delay the transmission to be performed, and perform another transmission.

Figure 18:
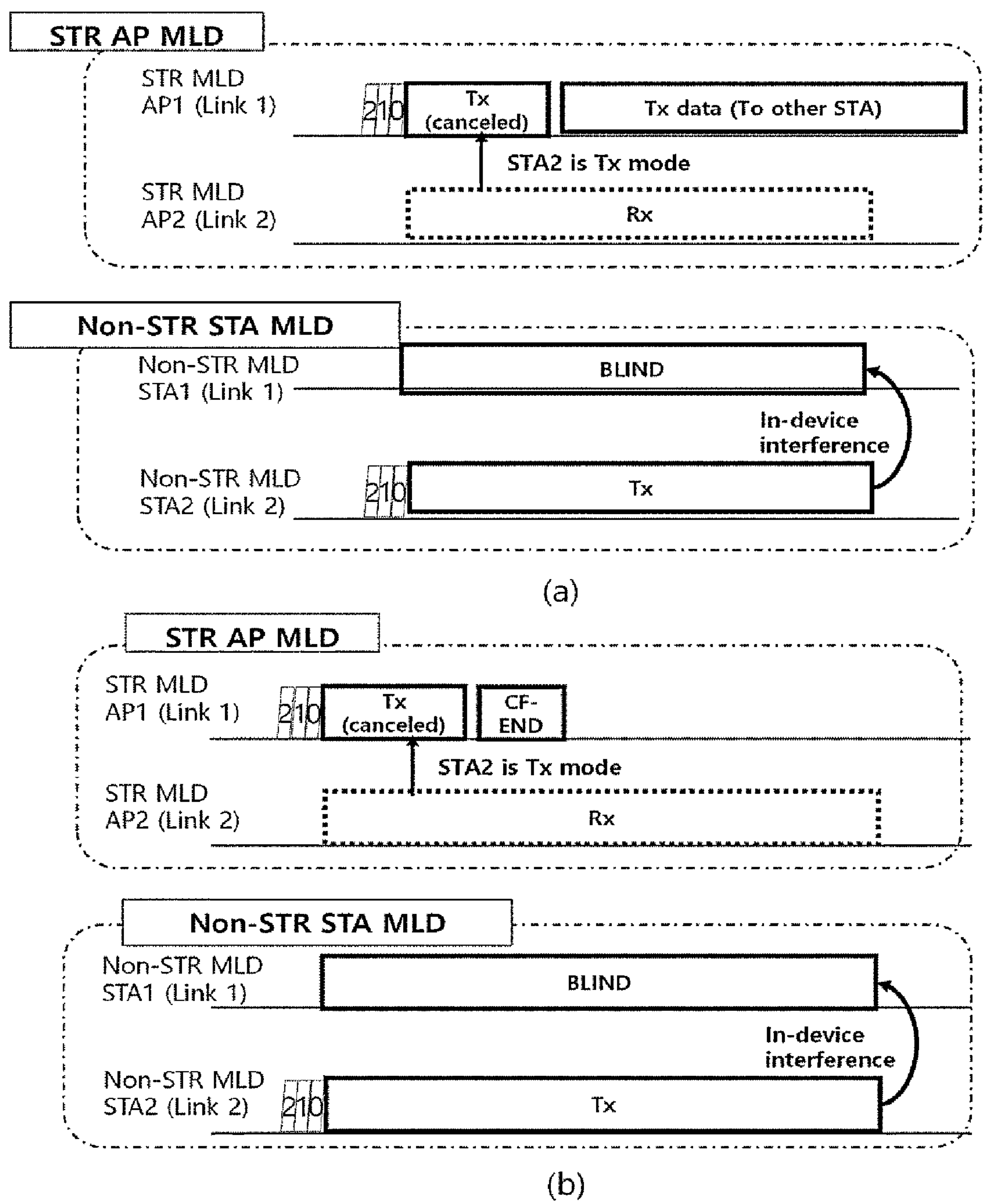
FIG. 18 illustrates an operation in which the STR multi-link device stops transmission to the non-STR multi-link device according to an embodiment of the disclosure.

FIG. 18 illustrates an operation in which the STR multi-link device stops transmission to the non-STR multi-link device according to an embodiment of the disclosure.

When the station of the STR multi-link device determines that the station of the non-STR multi-link device is in the blind state during transmission to the station of the non-STR multi-link device, the STR multi-link device may stop transmission to the station of the non-STR multi-link device in the blind state. Specifically, the STR multi-link device may determine whether the station of the non-STR multi-link device is in the blind state based on a value indicated by an STA (AID)-ID in a signaling field of the received PPDU or a transmitting address (TA) field of a MAC frame included in the received PPDU. At this time, the STA-ID may be a value indicating the station transmitting a UL PPDU. In a detailed embodiment, when the value indicated by the STA(AID)-ID in the signaling field of the received PPDU indicates the first station included in the non-STR multi-link device, the STR multi-link device may determine that the second station included in the non-STR multi-link device is in the blind state. Further, when the TA field of the MAC frame included in the received PPDU indicates the first station included in the non-STR multi-link device, the STR multi-link device may determine that the second station included in the non-STR multi-link device is in the blind state. Specifically, when a station having transmitted the PPDU, indicated by the signaling field of the PPDU, is the first station, or a TA field of the MAC frame included in the PPDU is the first station, the STR multi-link device may determine that the second station included in the non-STR multi-link device is in a blind state. Accordingly, the STR multi-link device may identify that a station of the non-STR multi-link device performs transmission, and determine that another station of the non-STR multi-link device is in a blind state. An operation of the station after cancelling of transmission is first described.

When a TXOP configured in the station of the non-STR multi-link device is left, the station cancelling the transmission to the station of the non-STR multi-link device may attempt transmission to a station different from the station of the non-STR multi-link device. At this time, the station cancelling the transmission to the station of the non-STR multi-link device may perform transmission to the station different from the station of the non-STR multi-link device without a separate backoff procedure. In a detailed embodiment, when it is detected that a channel is idle during a predetermined time interval without a separate backoff procedure after transmission to the station of the non-STR multi-link device is cancelled, the station cancelling the transmission to the station of the non-STR multi-link device may perform transmission to the station different from the station of the non-STR multi-link device. At this time, the predetermined time interval may be one of SIFS, PDIF, and DIFS.

When performing transmission to the station different from the station of the non-STR multi-link device, the station cancelling the transmission to the station of the non-STR multi-link device may transmit traffic having a priority equal to or higher than that of traffic of the cancelled transmission. This is because, transmission of traffic having the priority lower than that of traffic used for channel access for the cancelled transmission is not fair. In the above-described embodiments, the station of the STR multi-link device may be an AP.

The station cancelling transmission to the station of the non-STR multi-link device may initialize the configured TXOP. Specifically, the station cancelling the transmission to the station of the non-STR multi-link device may transmit a CF-End frame after cancelling the transmission. It may allow another station operating in the link in which transmission is scheduled to use the link.

In FIG. 18, the STR AP multi-link device includes the first AP (AP1) operating in the first link (link1) and the second AP (AP2) operating in the second link (link2). The non-STR non-AP multi-link device includes the first station (STA1) operating in the first link (link1) and the second station (STA2) operating in the second link (link2). The second station (STA2) is performing transmission to the second AP (AP2). The first AP (AP1) determines that the first station (STA1) is in the blind state during transmission to the first station (STA1). Accordingly, the first AP (AP1) stops transmission to the first station (STA1). In FIG. 18(*a*), after stopping transmission to the first station (STA1), the first AP (AP1) performs transmission to a station different from the first station (STA1) as mentioned in the first described embodiment. In FIG. 18(*b*), after stopping transmission to the first station (STA1), the first AP (AP1) transmits a CF-END frame as mentioned in the later described embodiment.

When the station stops transmission, the station may transmit a fragment, which is being transmitted, and then may not transmit the following fragment. In a detailed embodiment, the station may immediately stop transmission of a packet which is being transmitted.

In the above-described embodiments, when stopping transmission to the station of the non-STR multi-link device in the blind state and performing transmission to the station different from the station of the non-STR multi-link device, the STR multi-link device is required to inform another station that transmission to another station can be performed for stable reception thereof. A method therefor is described. For convenience of description, a station different from the station of the non-STR multi-link device in the blind state is referred to as a different station.

The station of the STR multi-link device may insert an address of the different station into the MAC frame. Specifically, the station of the STR multi-link device may insert an address of an intended receiver of the MAC frame into a receiving address (RA) of the MAC frame and insert an address of the different station into a separate field. In a detailed embodiment, the station of the device may insert the address of the different station into EHT-SIG. Specifically, the station of the STR multi-link device may insert the address of the intended receiver of the PPDU and the address of the different station into a user field of the signaling field of the PPDU. At this time, the address of the different station may be inserted after the address of the intended receiver of the PPDU in the user field of the signaling field of the PPDU.

In another detailed embodiment, the station may monitor reception of the PPDU during a predetermined time after recognizing that the intended receiver of the PPDU is not the station. Specifically, the station may monitor whether PPDU reception continues for a predetermined time after recognizing that the intended receiver of the received PPDU is not the station. Accordingly, the station may determine whether to stop transmission of the PPDU and start transmission to the station. In the embodiments, when it is determined that PPDU transmission continues for a predetermined time, the station may enter a doze state. When it is determined that the PPDU transmission does not continue for the predetermined time, the station may maintain a wake-up state. At this time, when the station receives a new PPDU, the station may decode the PPDU.

In another detailed embodiment, the station transmitting the PPDU may insert information signaling that PPDU transmission can be stopped into the PPDU. The information signaling that the PPDU transmission can be stopped may be a sub field of 1 bit. For example, when a value of the sub field signaling that PPDU transmission can be stopped is 1, the station receiving the PPDU may determine that the PPDU transmission can be stopped before a time point indicated by a length field of the signaling field of the PPDU and a duration field of the MAC frame. When the station determines that the PPDU transmission can be stopped before a time point indicated by a length field of the signaling field of the PPDU and a duration field of the MAC frame, the station may postpone entering into the doze state. Further, the station transmitting the PPDU may insert the information signaling that the transmission can be stopped into a reserved field of the PPDU.

As described above, it is possible to prevent unnecessary channel occupation through transmission cancel or transmission stop.

When transmission is stopped or delayed due to transmission collision between links, a value of CW used for channel access may be doubled like general transmission failure. When transmission is stopped or delayed due to transmission collision between links, a value of CW used for channel access may not be doubled unlike general transmission failure. That is, the station may maintain the value of CW used for channel access. Doubling the value of CW is to reduce the probability of transmission collision by increasing a range of numbers which can be the value of backoff counter. When the station can be clearly recognize transmission collision between links, such a need may be low. Further, when transmission is stopped or delayed due to transmission collision between links, doubling of a value of CW by the station may delay the transmission. However, when inter-link transmission collision and intra-link collision are simultaneously generated, the station needs to double the value of CW. This will be described with reference to FIG. 19.

Figure 19:
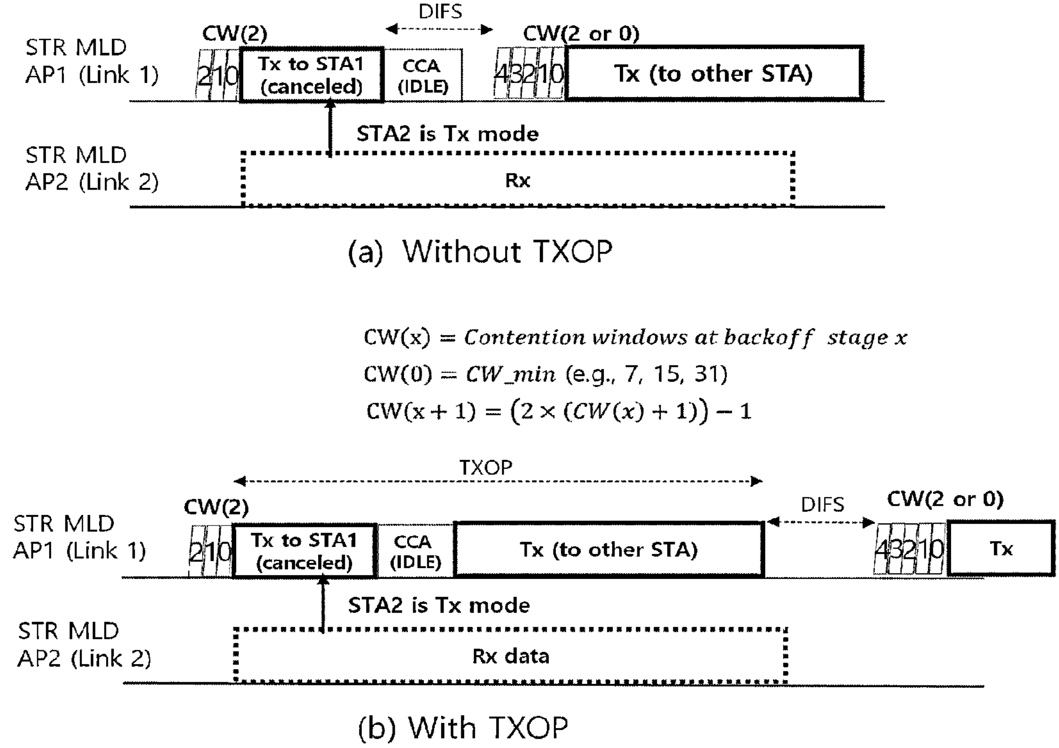
FIG. 19 illustrates processing of a value of a CW when the STR multi-link device recognize transmission collision between links according to an embodiment of the disclosure.

FIG. 19 illustrates processing of the value of CW when the STR multi-link device recognizes transmission collision between links according to an embodiment of the disclosure.

As described in the embodiments, when the station cancels transmission due to transmission performed by the non-STR multi-link device, the station may sense the channel state after cancelling the transmission. When it is sensed that the channel is not idle, the station may double the value of CW. At this time, doubling may follow the embodiment described with reference to FIG. 6. Further, when it is sensed that the channel is idle, the station may maintain the value of CW. The embodiment is to, since the possibility of transmission collision within the link is low even though it is sensed that the channel is idle, handle the case to be different from transmission success. Specifically, when an AP of an AP multi-link device fails to perform transmission to a station of the non-STR multi-link device, the AP of the AP multi-link device may not increase a CW and acquire a backoff counter within the CW. In this case, the non-STR multi-link device of the AP multi-link device fails to perform transmission for a first station and a second station of the non-STR multi-link device performs transmission, the AP of the AP multi-link device may not increase a CW and acquire a backoff counter within the CW. As described above, the AP multi-link device may determine whether the second station of the non-STR multi-link device performs transmission, based on a PPDU transmission station indicated by a signaling field of a PPDU or a station indicated by a TA field of a MAC frame included in the PPDU. In the above-described embodiments, when EDA is applied, procedures of CW adaptation and backoff counter generation may be performed for each AC.

In another specific embodiment, the STR multi-link device may determine whether PPDU transmission has failed, based on whether a response to a PPDU has been received. In this case, the STR multi-link device may not consider whether a station receiving a PPDU is included in the non-STR multi-link device. For example, even in a case where a first station receiving a PPDU is included in a non-STR multi-link device and the first station cannot transmit a response to the PPDU because a second station of the corresponding non-STR multi-link device performs transmission, the STR multi-link device may determine that PPDU transmission has failed. In addition, when the PPDU transmission of the STR multi-link device has failed, the STR multi-link device may increase a value of the CW to the next largest value among values of the CW. When the value of the CW is a maximum value, the STR multi-link device may maintain the value of the CW as the same value.

In another detailed embodiment, when it is sensed that the channel is idle, the station may configure the value of CW as a minimum value (CW min) of CW. The embodiment is to, since the possibility of transmission collision within the link is low when it is sensed that the channel is idle, handle the case to be the same as transmission success. The station may apply the above-described embodiments to CW of the AC of traffic included in the cancelled transmission.

Further, when the transmission is cancelled according to the above-described embodiments, the station may not increase a retry counter. At this time, the retry counter may include at least one of a long retry counter and a short try counter.

In the embodiment, cancelling transmission may include at least one of stopping transmission or delaying transmission before starting the transmission.

When the station cancels transmission after transmitting a CTS-to-Self frame before attempting the transmission, the station may not start RTS/CTS frame exchange before attempting the transmission after cancelling the transmission. This is because NAV is configured through the CTS-to-Self frame. Further, when a TXOP is left when the station attempts transmission again after cancelling the transmission, the station may attempt the transmission without any backoff procedure.

In FIG. 19, the STR AP multi-link device includes the first AP (AP1) operating in the first link (link1) and the second AP (AP2) operating in the second link (link2). The non-STR multi-link device includes the first station (STAT) operating in the first link (link1) and the second station (STA2) operating in the second link (link2). The second station (STA2) is performing transmission to the second AP (AP2). The first AP (AP1) determines that the first station (STAT) is in the blind state during transmission to the first station (STAT). Accordingly, the first AP (AP1) stops transmission to the first station (STAT). In FIG. 19(*a*), the first AP (AP1) determines that the channel of the first link (link1) is idle. At this time, since the TXOP is not left, the first AP (AP1) accesses the channel through the backoff procedure. In FIG. 19(*b*), the first AP (AP1) determines that the channel of the first link (link1) is not idle. At this time, since the TXOP is left, the first AP (AP1) attempts transmission without the backoff procedure.

In the above-described embodiments, when it is detected that a channel is idle during a predetermined time interval without a separate backoff procedure after transmission to the station of the non-STR multi-link device is cancelled, the station cancelling the transmission to the station of the non-STR multi-link device may perform transmission to the station different from the station of the non-STR multi-link device. At this time, duration of the predetermined time interval may be a problem. The station receiving the PPDU of which transmission is cancelled may fail in decoding the PPDU. At this time, when it is sensed that the channel is idle by an extended interframe space (EIFS), the station failing in decoding the PPDU may start the backoff procedure. Accordingly, it is a problem whether to configure the predetermined time interval to be longer than or equal to the EIFS. This will be described with reference to FIG. 20.

Figure 20:
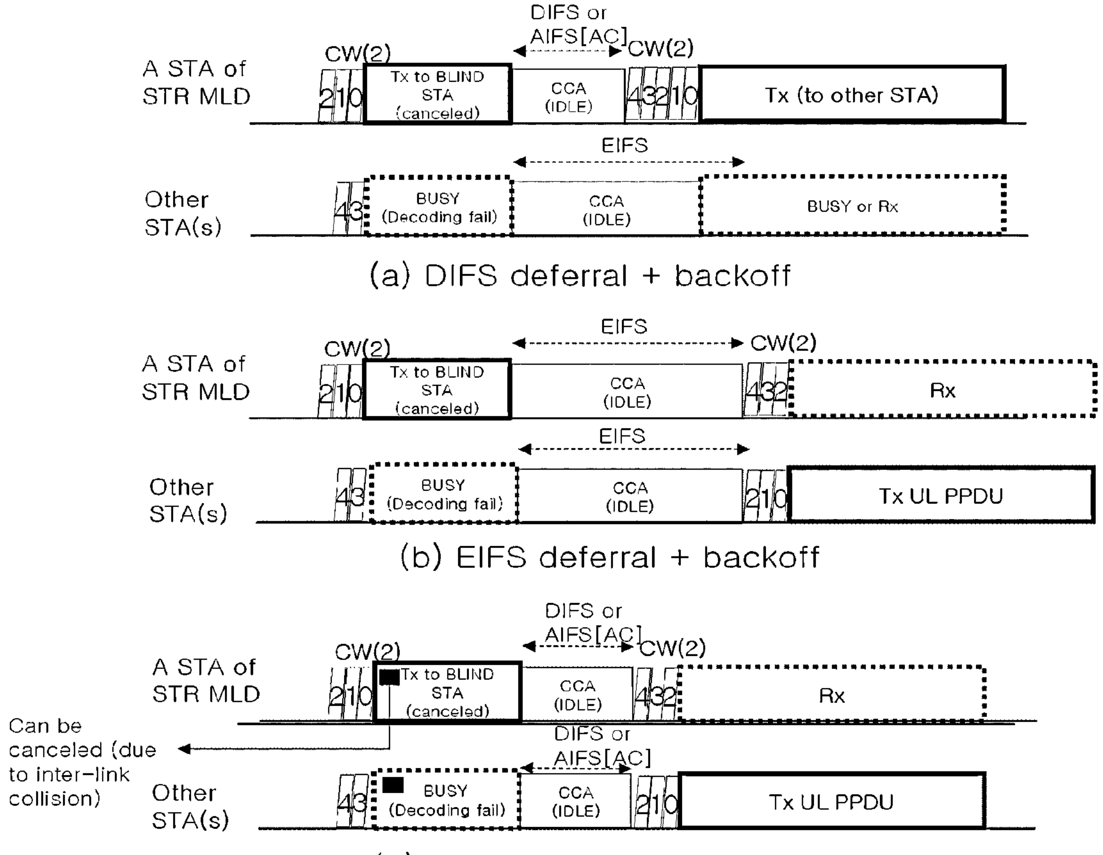
FIG. 20 illustrates an operation in which the STR multi-link device stops transmission to the non-STR multi-link device and then performs channel access again according to an embodiment of the disclosure.

FIG. 20 illustrates an operation in which the STR multi-link device performs channel access again after stopping transmission to the non-STR multi-link device according to an embodiment of the disclosure.

As illustrated in FIG. 20(*a*), the predetermined time interval may be DIFS. This considers that the station of the STR multi-link device acquires a channel access opportunity through a competition procedure and loses the acquired channel access opportunity due to transmission collision between links. That is, since the station of the STR multi-link device acquires the channel access opportunity through the competition procedure, a higher priority to perform channel access is provided to the station than other stations. When EDCA is applied, DIFS may be replaced with AIFS [AC].

In another detailed embodiment, the predetermined time interval may be EIFS as illustrated in FIG. 20(*b*). This considers that the STR multi-link device can be considered to already exhaust the transmission opportunities and considers fairness with other stations.

In another detailed embodiment, as illustrated in FIG. 20(*c*), when information in the signaling field of the PPDU indicating that transmission can be stopped is signaled, the predetermined time interval may be DIFS. Further, when the station receiving the PPDU detects the stop of PPDU transmission, the station may sense whether the channel is idle during DIFS rather than EIFS. At this time, it is sensed that the channel is idle during DIFS, the corresponding station may start the backoff procedure. Through the embodiment, it is possible to improve the performance of overall networks and guarantee fairness between stations. When EDCA is applied, DIFS may be replaced with AIFS [AC].

As described above, the STR multi-link device may recognize that transmission collision between links may be generated. Specifically, when the first station of the STR multi-link device completes the backoff procedure, the second station of the STR multi-link device may be receiving the PPDU. At this time, when the second station has not completed decoding of the signaling field of the PPDU, the first station may determine that the transmission collision between links cannot be recognized but there is a possibility thereof. At this time, the first station may insert information indicating that transmission can be stopped into the transmitted PPDU as described above. Further, for stable and efficient transmission, the NSTR multi-link device may transmit the CTS-to-Self frame before transmission to the non-STR multi-link device. This will be described with reference to FIG. 21.

Figure 21:
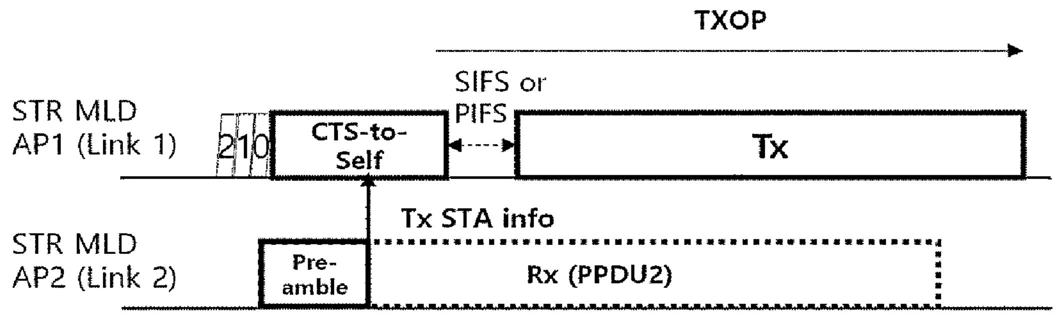
FIG. 21 illustrates an operation in which the STR multi-link device transmits a CTS-to-Self frame before transmission to the non-STR multi-link device according to an embodiment of the disclosure.

FIG. 21 illustrates an operation in which the STR multi-link device transmits the CTS-to-Self frame before transmission to the non-STR multi-link device according to an embodiment of the disclosure.

The station of the STR multi-link device may transmit the CTS-to-Self frame before transmission to the non-STR multi-link device. Specifically, when the second station of the STR multi-link device attempts transmission to the non-STR multi-link device while the first station of the STR multi-link device performs reception, the second station of the STR multi-link device may transmit the CTS-to-Self frame before transmission to the non-STR multi-link device. Accordingly, the second station may secure the TXOP for transmission to the non-STR multi-link device. Further, before performing transmission to the non-STR multi-link device, the second station may determine whether transmission to the first station is performed from the corresponding non-STR multi-link device. The second station may determine a destination station of the transmission according to whether the transmission to the first station is performed from the corresponding non-STR multi-link device. Specifically, when the transmission to the first station is not performed from the corresponding non-STR multi-link device, the second station may perform transmission to the corresponding non-STR multi-link device. When the transmission to the first station is performed from the corresponding non-STR multi-link device, the second station may perform transmission to the station which is not included in the corresponding non-STR multi-link device. For example, when the first station plans transmission of an SU-PPDU for the station of the non-STR multi-link device, an MU-PPDU including data for the station of the non-STR multi-link device, or a PPDU including a trigger frame for triggering transmission of the station of the non-STR multi-link device, the first station may cancel the planned transmission. At this time, the first station may attempt transmission of an SU-PPDU for a station which is not the station of the non-STR multi-link device, an MU-PPDU that does not include the data for the station of the non-STR multi-link device, or a PPDU including a trigger frame that does not trigger transmission of the station of the non-STR multi-link device. At this time, the first station may start transmission after a time longer than SIFS from the transmission of the CTS-to-Self frame. Specifically, the first station may start transmission after PIFS from the transmission of the CTS-to-Self frame. The station transmitting the CTS-to-Self frame should start transmission after SIFS from the transmission of the CTS-to-Self frame. When the planned transmission is cancelled and new transmission is attempted as described in the embodiments, a processing time of the STR multi-link device for generating the MPDU to be newly transmitted is needed. Accordingly, exception may be applied to rules for the time interval between the CTS-to-Self frame and the transmission. In the embodiments, the second station exceeds the TXOP acquired by CTS-to-Self and thus cannot perform transmission in principle.

In FIG. 21, the STR multi-link device includes the first AP (AP1) operating in the first link (link1) and the second AP (AP2) operating in the second link (link2). Since the second AP (AP2) performs reception and the first AP (AP1) plans transmission to the station of the non-STR multi-link device, the first AP (AP1) transmits the CTS-to-Self frame before the planed transmission. As described above, the first AP (AP1) determines the destination station of the transmission based on the determination for the station transmitting the PPDU received by the second AP (AP2). Further, the first AP (AP1) performs transmission after SIFS or PIFS from the transmission of the CTS-to-Self frame.

The second station may start the RTS/CTS frame exchange procedure by transmitting the RTS frame instead of transmitting the CTS-to-Self frame. Accordingly, the second station may acquire an effect similar to the transmission of the CTS-to-Self frame. In the case of the RTS/CTS frame exchange, the second station may acquire the TXOP only when the destination station of transmission is not in the blind state.

Figure 22:
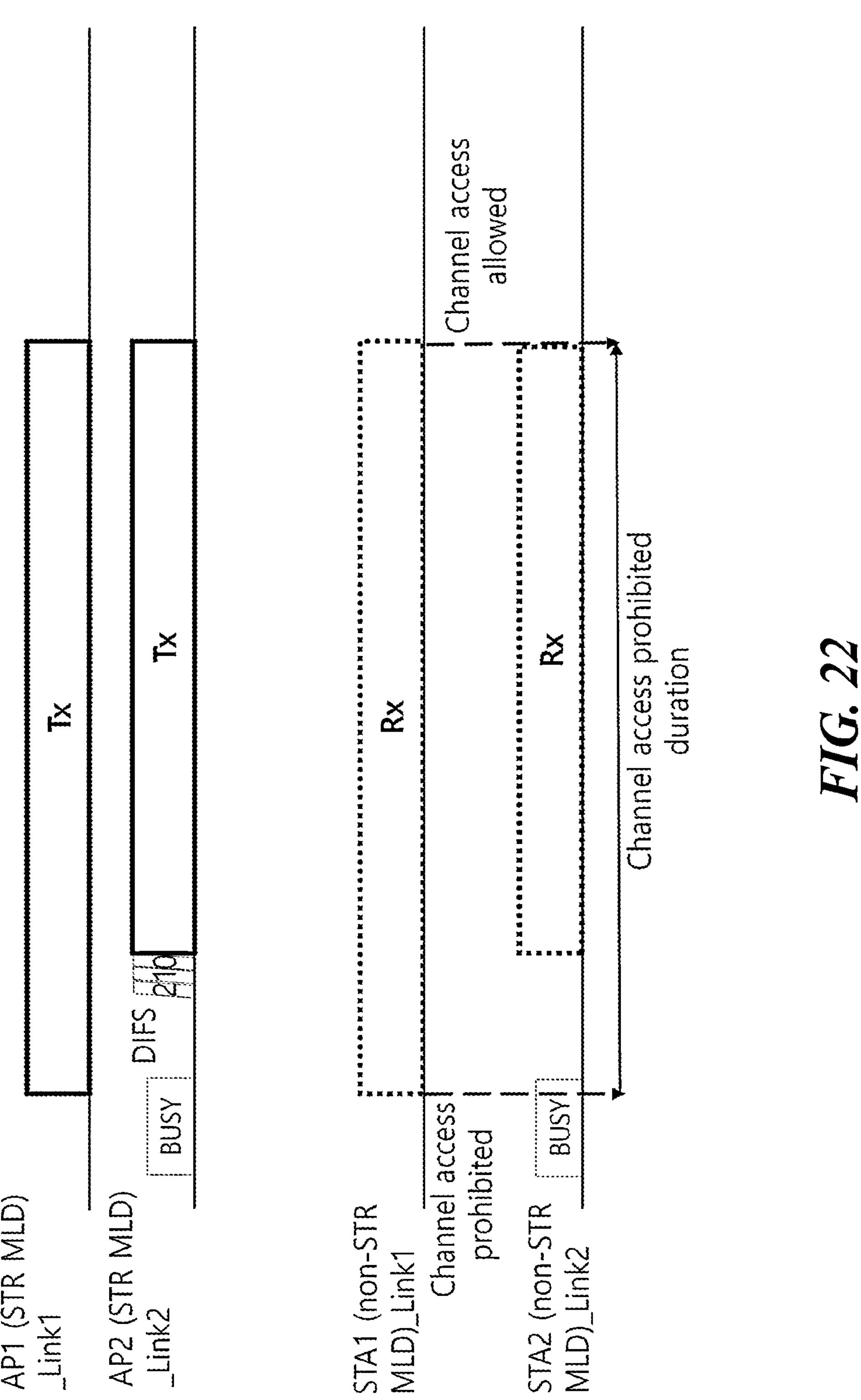
FIG. 22 illustrates the performance of transmission to a plurality of stations included in one non-STR multi-link device by a plurality of APs included in the STR multi-link device according to an embodiment of the disclosure.

FIG. 22 illustrates the performance of transmission to a plurality of stations included in one non-STR multi-link device b a plurality of APs included in the STR multi-link device according to an embodiment of the disclosure.

The plurality of stations included in one non-STR multi-link device may simultaneously perform reception. This is because simultaneous reception by a plurality of stations may cause only small interference. FIG. 22 illustrates the performance of simultaneous reception by a plurality of stations included in one non-STR multi-link device. At this time, for the stable operation of the non-STR multi-link device, a plurality of APs included in the STR multi-link device may perform a plurality of transmissions of which the transmission ends are synchronized to a plurality of stations included in one non-STR multi-link device. This will be described with reference to FIG. 23.

Figure 23:
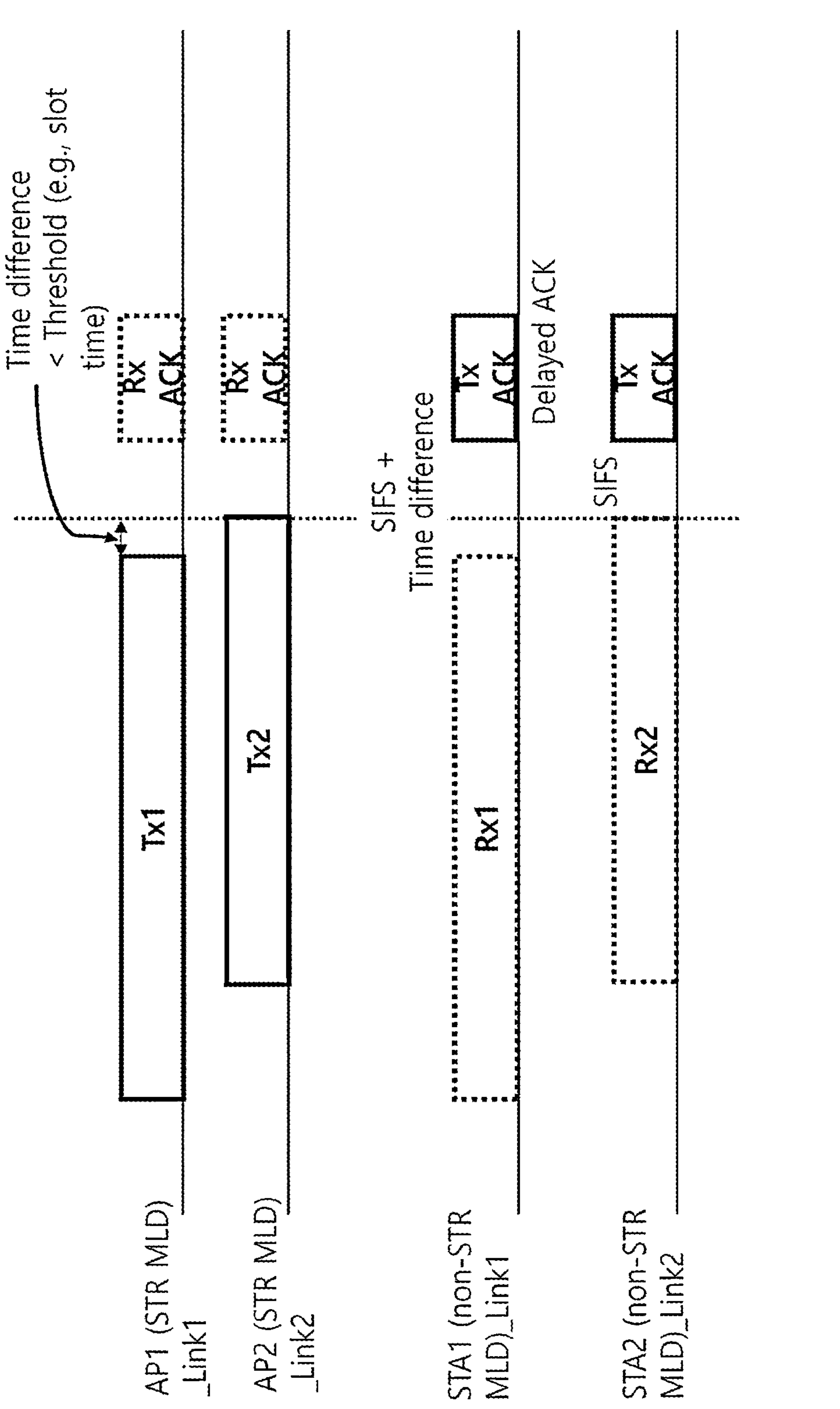
FIG. 23 illustrates the performance of a plurality of transmissions of which transmission ends are synchronized to a plurality of stations included in one non-STR multi-link device by a plurality of APs included in the STR multi-link device according to an embodiment of the disclosure.

FIG. 23 illustrates the performance of a plurality of transmissions of which the transmission ends are synchronized to a plurality of stations included in one non-STRU multi-link device by a plurality of APs included in the STR multi-link device according to an embodiment of the disclosure.

When the multi-link device performs transmission in one of the non-STR links, the multi-link device may simplify the channel access procedure for transmission performed in another link. Specifically, when the first station of the multi-link device completes the backoff channel access procedure in the first link, if the channel is idle during a predetermined time interval within the link of the second station of the STR multi-link device, the second station of the STR multi-link device may start transmission in the second link.

In a detailed embodiment, when one station of the STR multi-link device performs transmission to one station of the non-STR multi-link device, the channel access procedure of another station of the STR multi-link device may be simplified. Specifically, when the first station of the STR multi-link device completes the backoff channel access procedure of transmission to the first station of the non-STR multi-link device, if the channel is idle during a predetermined time interval within the link of the second station of the STR multi-link device, the second station of the STR multi-link device may start transmission to the second station of the non-STR multi-link device. At this time, the predetermined time interval may be PIFS. Such an operation may be applied when the first station and the second station of the STR multi-link device perform transmission to stations included in one non-STR multi-link device. In the embodiments, the first station and the second station may start transmission with a difference within a predetermined time interval. The predetermined time interval may be a slot time.

Further, when the first station and the second station of the STR multi-link device perform transmission to stations included in one non-STR multi-link device, transmission ends of the first station and the second station may be synchronized. At this time, synchronization of the transmission ends of the first station and the second station may indicate the end of the first station and the end of the second station with a difference within a first predetermined time interval. The first predetermined time interval may indicate the inside of a slot boundary or a symbol boundary.

The plurality of stations of the non-STR multi-link device receiving the synchronized transmission ends may simultaneously perform the following transmission, for example, responses. At this time, the responses may include ACK. In the conventional WLAN, the transmission following reception is performed after SIFS from the reception. However, with respect to a plurality of transmissions having ended with a slight time difference, performing the following transmissions with a slight time difference may make implementation more complicated compared to performing the following transmissions at the same time. Accordingly, as described above, the plurality of stations of the non-STR multi-link device receiving the synchronized transmission ends may simultaneously perform the following transmissions. At this time, an interval between transmissions following at least one of the plurality of transmissions of which the transmission ends are synchronized may be a sum of SIFS and time within a predetermined time interval. Specifically, transmission following the transmission that first ends among the plurality of transmissions of which the transmission ends are synchronized may be performed at an interval obtained by adding the SIFS and the time within the predetermined time interval from the transmission. At this time, the predetermined time interval may be one of a slot time or a symbol length. Further, a difference within the predetermined time interval may be a difference between the end of transmission that last ends among the plurality of transmissions of which the transmission ends are synchronized and transmission that first ends among the plurality of transmissions of which the transmission ends are synchronized.

In another detailed embodiment, when the plurality of transmissions end with a time difference within the first predetermined time interval, a plurality of stations receiving the transmissions may perform the synchronized following transmissions. The plurality of following transmissions of which the transmission ends are synchronized may indicate a plurality of following transmissions performed with a time difference within a second predetermined time interval. Further, a difference within the second predetermined time interval may be a difference between the end of transmission that last ends among the plurality of synchronized transmissions and transmission that first ends among the plurality of transmissions of which the transmission ends are synchronized. At this time, the second predetermined time interval may be smaller than the first predetermined time interval. PPDUs of which transmission ends are synchronized may be referred to as sync PPDUs.

In FIG. 23, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). Each of the first AP (AP1) and the second AP (AP2) synchronize ends of transmission to the first station (STA1) and the second station (STA2). That is, after the first station (STA1) ends transmission, the second station (STA2) ends transmission within a predetermined time interval from the first station (STA1). The first station (STA1) and the second station (STA2) simultaneously transmit ACK. At this time, the first station (STA1) transmits ACK after SIFS and difference between the end of transmission of the first station and the end of transmission to the second station (STA2) from the end of transmission to the first station (STA1).

The embodiments may be applied to transmission in which an ACK policy is not configured as No ACK. Specifically, the ACK policy may be applied to the case other than an immediate response. In a detailed embodiment, when a plurality of stations of the multi-link device receive transmissions of which transmission ends are synchronized, the plurality of stations of the multi-link device may simultaneously receive an ACK request and transmit ACK according to the ACK request. The plurality of stations of the multi-link device receiving transmission in which the ACK policy is configured as a value other than No ACK within a predetermined time may simultaneously start ACK.

When there is a non-STR multi-link device, the non-STR multi-link device should be considered during an operation of configuring the TXOP by transmitting the RTS/CTS frame and the CTS-to-Self frame. This will be described with reference to FIGS. 24 to 29.

Figure 24:
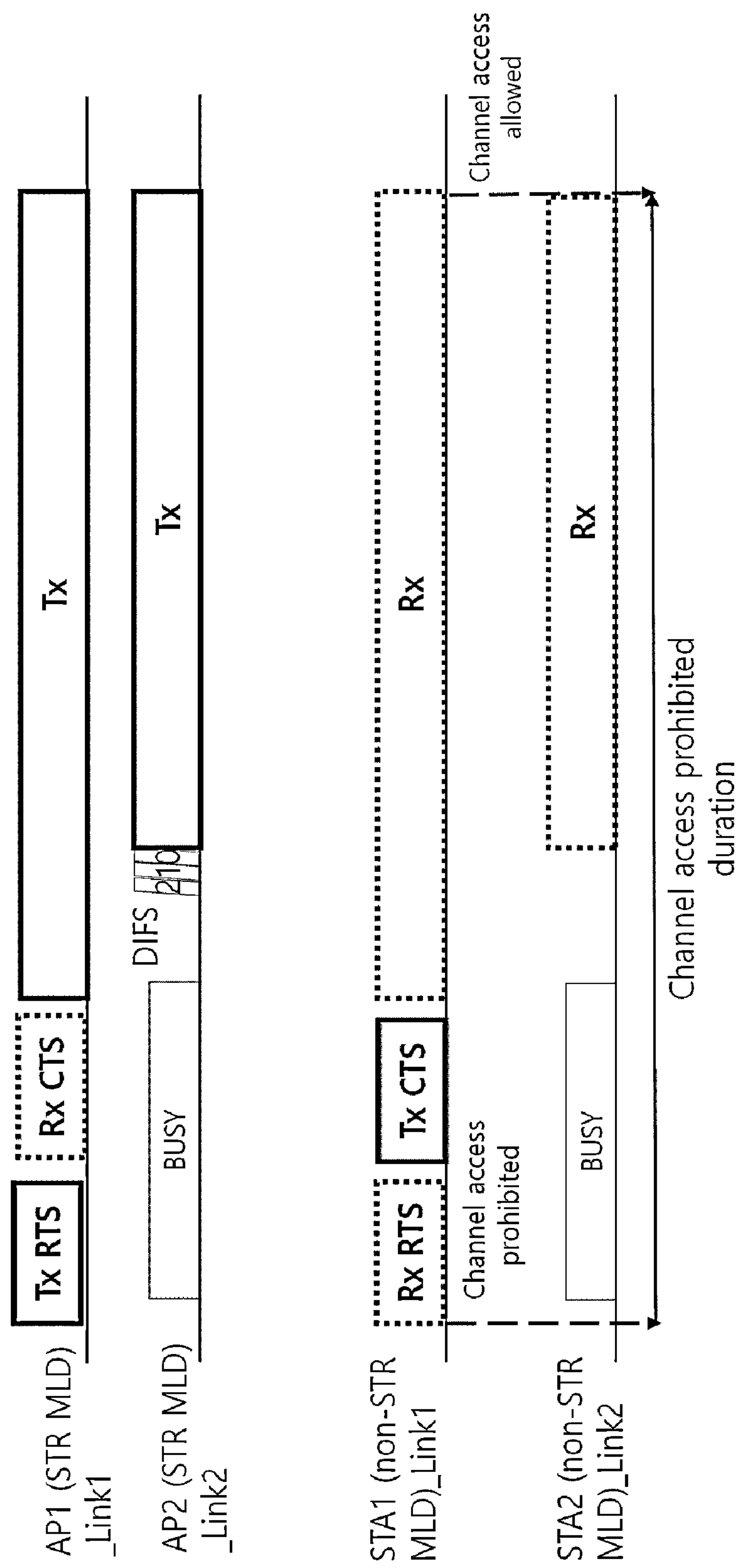
FIG. 24 illustrates an exchange of an RTS/CTS frame by the multi-link device according to an embodiment of the disclosure.

FIG. 24 illustrates an exchange of RTS/CTS frames by the multi-link device according to an embodiment of the disclosure.

Even when there is the non-STR multi-link device, the RTS/CTS frame exchange procedure may follow the procedure defined in the conventional WLAN. The RTS/CTS frames may be used to configure NAV of the station operating in another link. Specifically, the station receiving the RTS/CTS frames may operate in a link different from the link in which the corresponding station operates and transfer the RTS/CTS frames to another station included in the multi-link device including the corresponding station.

However, as described in the above embodiments, when there is the non-STR multi-link device, channel access or transmission may be restricted. Accordingly, as illustrated in FIG. 24, RTS/CTS may not be transmitted. That is, the station planning transmission to the first station of the non-STR multi-link device may not attempt the RTS/CTS frame exchange if the second station of the non-STR multi-link device is performing reception.

In FIG. 24, the STR AP multi-link device includes the first AP (AP1) operating in the first link (link1) and the second AP (AP2) operating in the second link (link2). The non-STR multi-link device includes the first station (STAT) operating in the first link (link1) and the second station (STA2) operating in the second link (link2). When the first AP (AP1) transmits the RTS frame to the first station (STAT), channel access of the second station (STA2) is prohibited. The second AP (AP2) may determine that channel access of the second station (STA2) is prohibited. Accordingly, the second AP (AP2) does not attempt the RTX/CTS frame exchange with the second station (STA2). In the embodiment, a hidden node problem may occur. This will be described with reference to FIG. 25.

Figure 25:
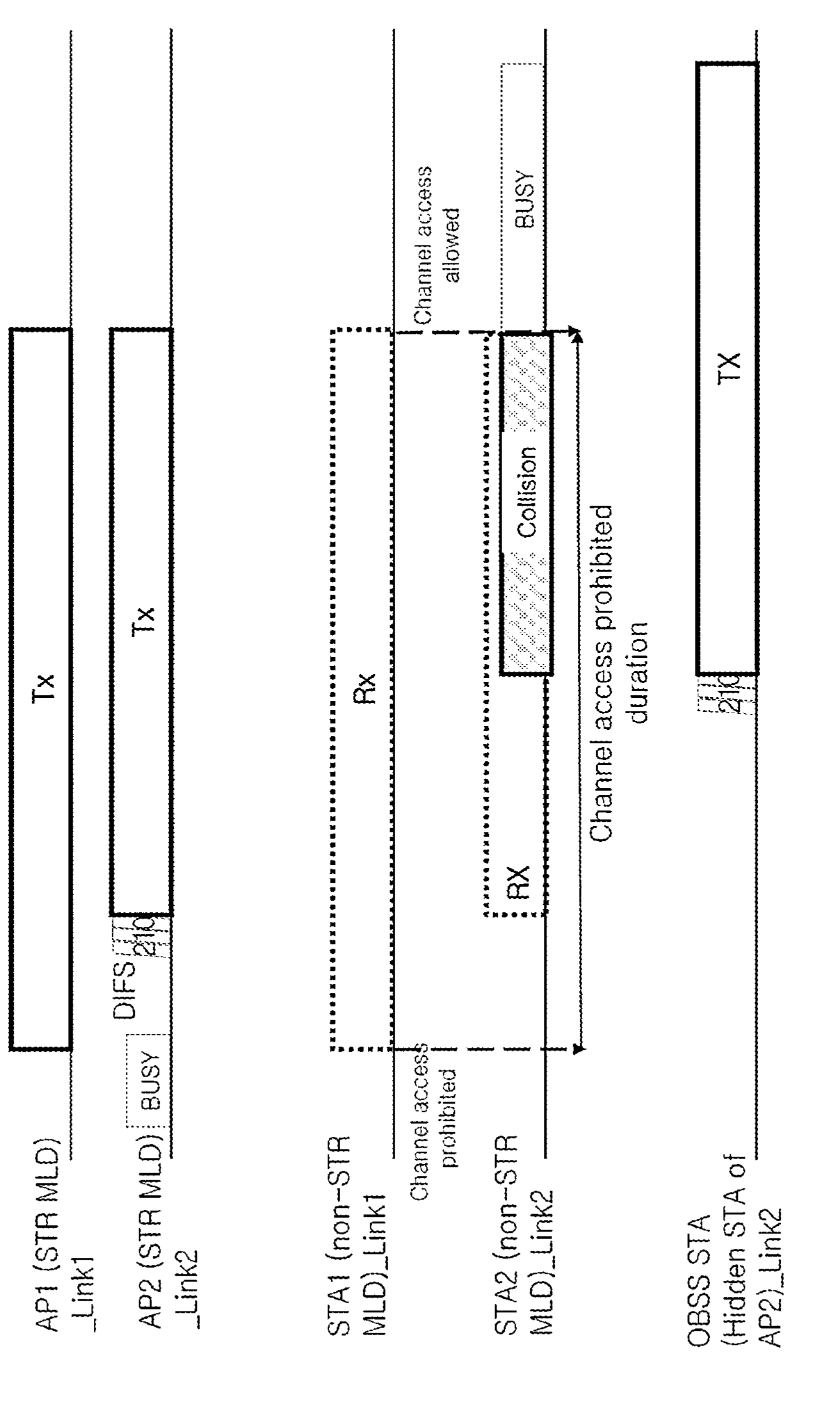
FIG. 25 illustrates a hidden node problem occurring in an RTS/CTS frame exchange procedure according to an embodiment of the disclosure described with reference to FIG. 24.

FIG. 25 illustrates the hidden node problem occurring in the RTS/CTS frame exchange procedure according to the embodiment described with reference to FIG. 24.

The station performing transmission to the station of the non-STR multi-link device may perform transmission without the CTS/RTS exchange as described above. At this time, since the TXOP is not configured in another station, another station may attempt transmission and thus the station of the non-STR multi-link device may fail in receiving transmission. In the embodiment of FIG. 25, the STR AP multi-link device includes a first AP (AP1) operating in a first link (link1) and a second AP (AP2) operating in a second link (link2). The non-STR multi-link device includes the first station (STAT) operating in the first link (link1) and the second station (STA2) operating in the second link (link2). Due to transmission to the first station (STAT) of the first AP (AP1), the second AP (AP2) could not transmit the RTS frame before transmission. Accordingly, the TXOP for transmission of the second AP (AP2) is not configured in the station operating in the second link (link2). Therefore, when the second AP (AP2) performs transmission to the second station (STA2), a station of another BSS (OBSS STA) performs transmission in the second link (link2). According thereto, the second station (STA2) fails in receiving transmission of the second AP (AP2). In order to solve the hidden node problem, the following embodiments may be applied.

In a detailed embodiment, when one station of the non-STR multi-link device performs reception, the station is not allowed to perform transmission to any station of the non-STR multi-link device. In another detailed embodiment, when the second station of the non-STR multi-link device performs reception while the station performs transmission to the first station of the non-STR multi-link device, the station may simultaneously perform the transmission and the transmission to the second station. When the second station of the non-STR multi-link device performs reception while the station performs transmission to the first station of the non-STR multi-link device, the station may synchronize the end of transmission to the first station and the end of transmission to the second station. Specifically, when the second station of the non-STR multi-link device performs reception while the station performs transmission to the first station of the non-STR multi-link device, the station may simultaneously end the transmission to the first station and the transmission to the second station. In the embodiments, transmission to the second station may be performed by another station of the multi-link device including the station.

Figure 26:
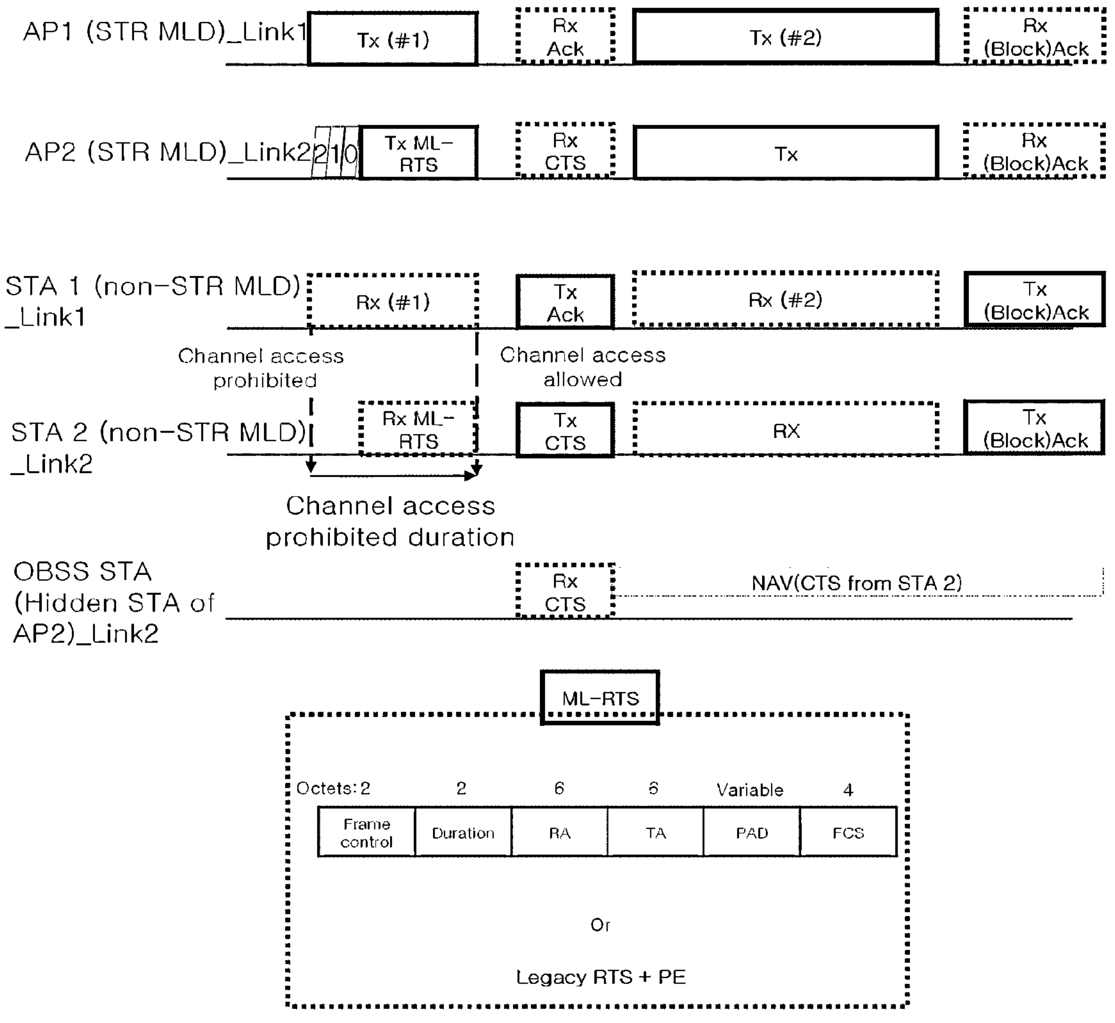
FIG. 26 illustrates the RTS/CTS frame exchange by the multi-link device according to an embodiment of the disclosure.

FIG. 26 illustrates an RTS/CTS frame exchange by the multi-link device according to an embodiment of the disclosure.

In another embodiment of the disclosure, when the second station of the multi-link device transmits an RTS frame to a fourth station of the non-STR multi-link device while the first station of the multi-link device continues to perform transmission to a third station of the non-STR multi-link device, the first station may end the transmission to the third station before a time point at which the fourth station transmits the RTS frame. Accordingly, the fourth station may transmit a CTS frame to the second station. Therefore, a TXOP for the frame exchange between the second station and the fourth station may be configured. However, it may be difficult to implement the end of transmission before the time point at which the first station transmits the RTS frame to the fourth station.

In another embodiment of the disclosure, when the second station of the multi-link device transmits an RTS frame to a fourth station of the non-STR multi-link device while the first station of the multi-link device continues to perform transmission to a third station of the non-STR multi-link device, the second station may transmit the RTS frame to the fourth station in time for the end of transmission to the third station by the first station. To this end, the second station may insert padding into the RTS frame. At this time, the RTS frame may be an RTS frame format for flexibly controlling the transmission length. For convenience of description, the RTS frame format is referred to as a multilink (ML)-RTS frame. The ML-RTS frame may include a pad field for padding. For example, the ML-RTS frame format may be the same as the RTS frame format illustrated in FIG. 26. Further, the first station may insert padding into transmission to the third station in time to comply with the transmission end with the RTS frame.

In the embodiment of FIG. 26, the STR AP multi-link device includes a first AP (AP1) operating in a first link (link1) and a second AP (AP2) operating in a second link (link2). The non-STR multi-link device includes the first station (STA1) operating in the first link (link1) and the second station (STA2) operating in the second link (link2). The second AP (AP2) transmits the ML-RTS frame to the second STA (STA2) in time for the end of transmission to the first station (STA1) of the first AP (AP1). Thereafter, when the first station (STA1) transmits ACK to the first AP (AP1), the second station (STA2) transmits ACK to the second AP (AP2). Accordingly, a TXOP for the frame exchange between the second AP (AP2) and the second station (STA2) is configured in stations operating in the channel of the second link.

In another detailed embodiment, another frame for configuring NAV may be exchanged instead of the RTS/CTS frame. In the above-described embodiments, an ACK request frame may be transmitted instead of the RTS frame. The ACK request frame may include duration information related to the transmission end time point. Further, a frame including ACK transmitted in response to the ACK request may also include duration information. At this time, duration information of the frame including ACK may be configured according to duration information of the ACK request frame.

The above-described embodiments have been described for the RTS/CTS frame exchange, but may be used for a control frame exchange as well as the RTS/CTS frame. At this time, the control frame exchange may include an exchange between a PS-Poll frame and a response frame of the PS-Poll.

Figure 27:
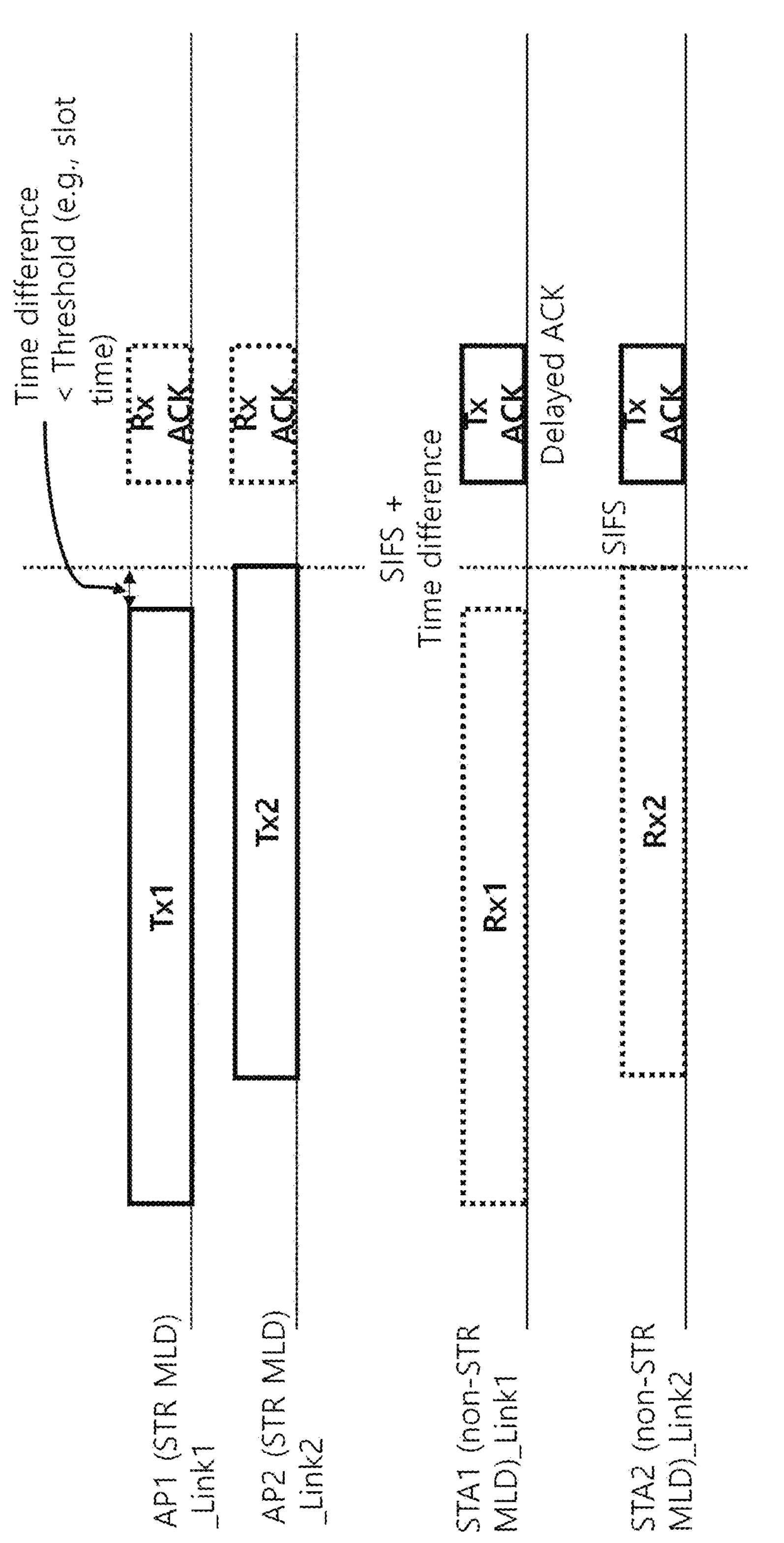
FIG. 27 illustrates transmission of a response to a control frame by the multi-link device exceptionally even in the case in which channel access is prohibited according to an embodiment of the disclosure.

FIG. 27 illustrates exceptional transmission of a response to a control frame by the multi-link device in the case in which channel access is prohibited according to an embodiment of the disclosure.

As described in the above embodiments, when the non-STR multi-link device exists, channel access of some stations may be prohibited. Even though channel access of the station is prohibited, the station may transmit a response to the control frame. Specifically, even though channel access of the station is prohibited, the station may transmit a CTS frame in response to the RTS frame.

As described above, when the response to the control frame is transmitted as the exception of channel access prohibition, the following embodiment may be applied. The first station transmits the response to the control frame as the exception of channel access prohibition. When the first station transmits the response to the control frame, the third station performs transmission to the second station included in the multi-link device including the first station. In this case, the third station may perform retransmission to the first station. This is because the third station can expect failure of transmission to the second station.

In the embodiment of FIG. 27, the STR AP multi-link device includes a first AP (AP1) operating in a first link (link1) and a second AP (AP2) operating in a second link (link2). The non-STR multi-link device includes the first station (STA1) operating in the first link (link1) and the second station (STA2) operating in the second link (link2). The first AP (AP) performs transmission to the first station (STA1). The second AP (AP2) transmits the RTS frame to the second station (STA2). Since the first station (STA1) performs reception, channel access of the second station (STA2) is prohibited. However, the second station (STA2) transmits the CTS frame to the second AP (AP2) as the exception of channel access prohibition. The first AP (AP1) may determine that a possibility of failure of transmission of the first AP (AP1) is high due to transmission of the CTS frame by the second station (STA2). Accordingly, the first AP (AP1) performs retransmission to the first station (STAT). A retransmission method will be described in more detail with reference to FIG. 28.

Figure 28:
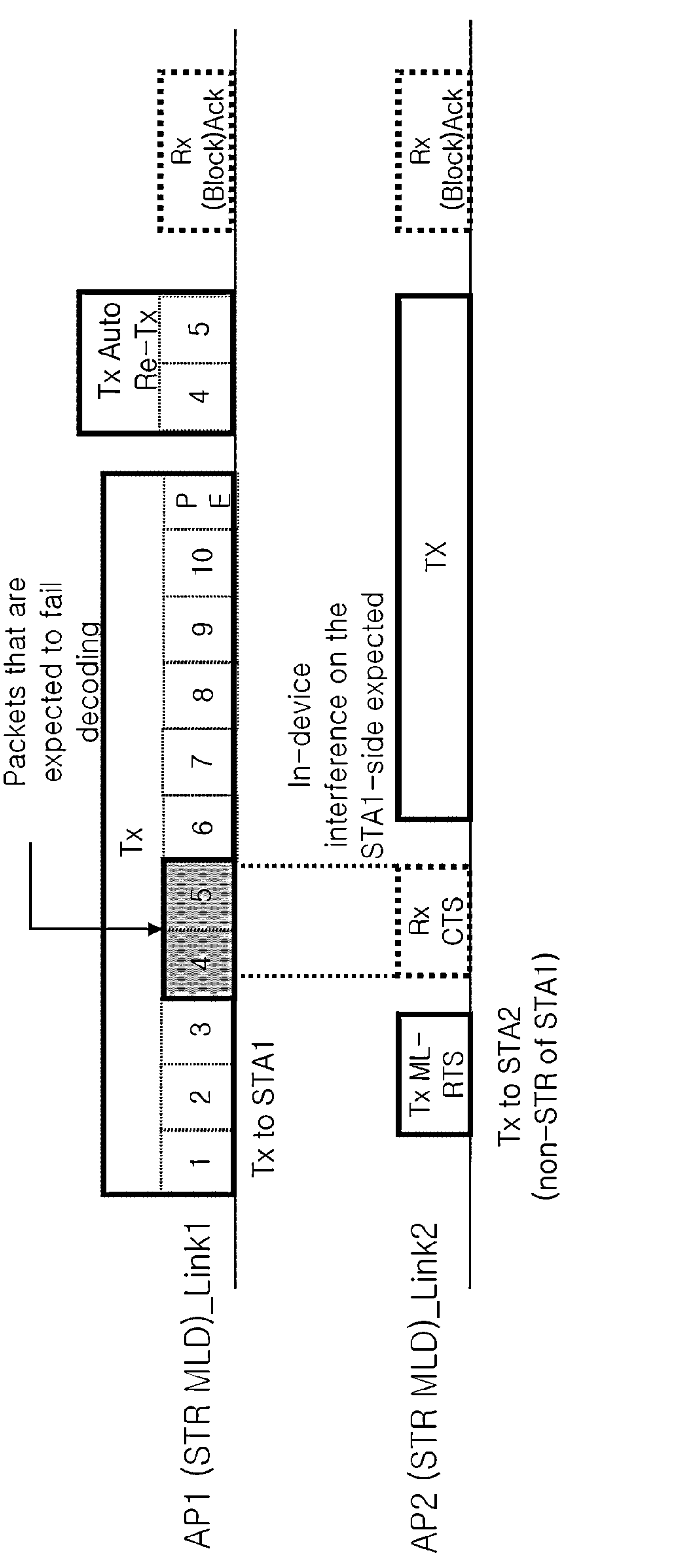
FIG. 28 illustrates retransmission of the transmission to the station of the non-STR multi-link device.

FIG. 28 illustrates retransmission of the transmission to the station of the non-STR multi-link device.

In the retransmission described with reference to FIG. 27, only some of the packets included in the initial transmission may be retransmitted. Specifically, the station performing retransmission may retransmit only some of the packets included in the initial transmission. The station performing retransmission may determine some of the packets included in the initial transmission as packets to be retransmitted based on a time interval in which the station performing retransmission receives the CTS frame. Specifically, the station performing retransmission may determine packets transmitted in a time interval including the time interval in which the station performing retransmission receives the CTS frame among the packets included in the initial transmission as the packets to be retransmitted. At this time, the station performing retransmission may retransmit the packets transmitted in the time interval including the time interval in which the station performing retransmission receives the CTS frame based on a propagation delay. In another detailed embodiment, the station performing retransmission may retransmit all packets included in the initial transmission.

Further, the station performing retransmission may perform retransmission before receiving ACK for the transmission. At this time, the station performing retransmission may receive Block ACK indicating whether initial transmission and retransmission are received after the retransmission. To this end, the station performing retransmission may perform retransmission before SIFS after the initial transmission. In another detailed embodiment, the station failing in reception due to the control frame transmitted as the exception of channel access prohibition may wait for receiving retransmission without transmitting ACK.

In the embodiment of FIG. 28, the first AP (AP1) retransmits a fourth packet and a fifth packet in consideration of the interval in which the second AP (AP2) receives the CTS frame and a transmission delay. The first AP (AP1) receives ACK including whether retransmission is received after the retransmission.

Figure 29:
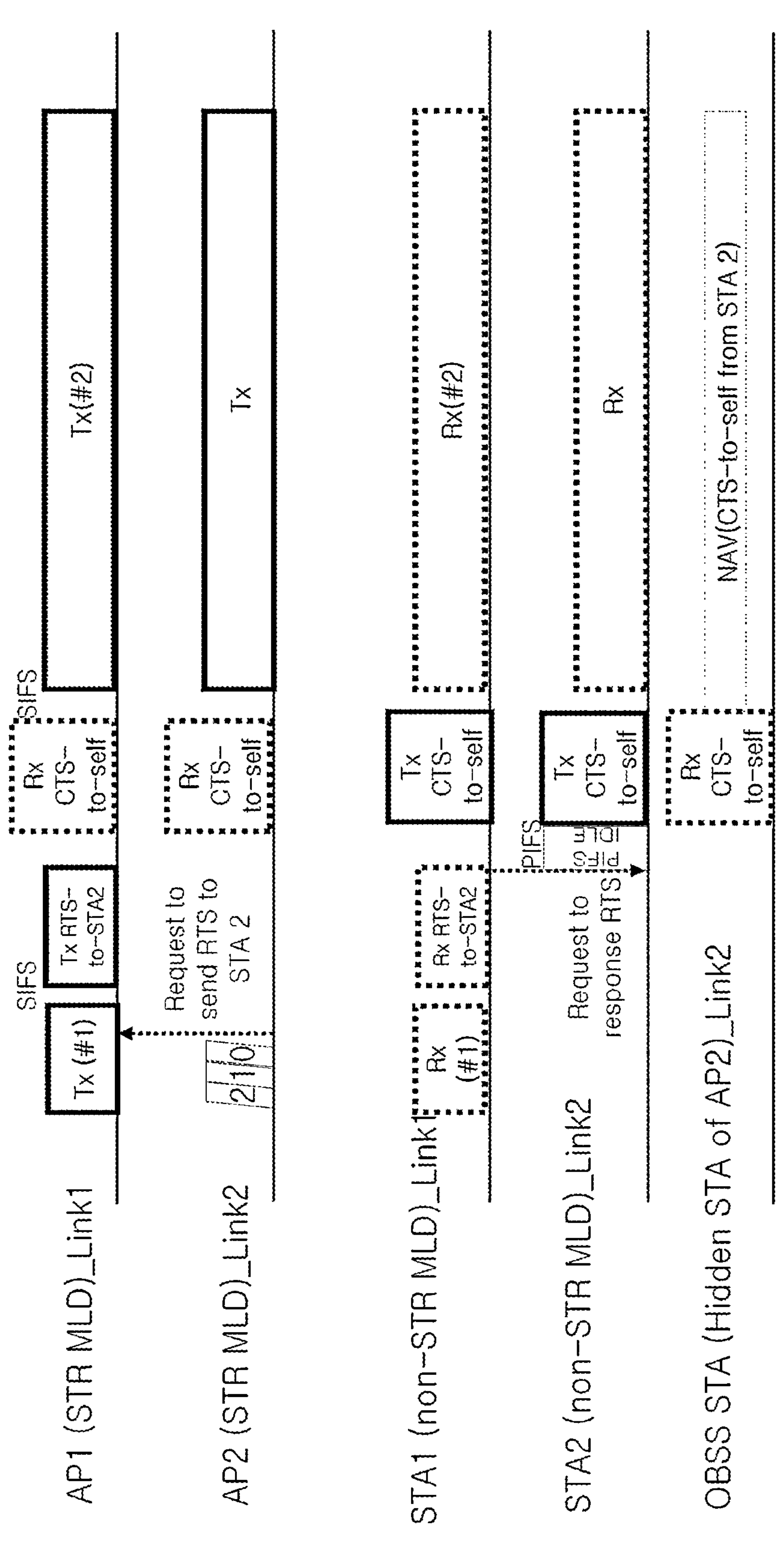
FIG. 29 illustrates transmission of the control frame through the link in which the station of which channel access is not prohibited operates rather than the link in which the station of which channel access is prohibited operates according to an embodiment of the disclosure.

FIG. 29 illustrates transmission of the control frame through a link in which the station of which channel access is not prohibited operates rather than a link in which the station of which channel access is prohibited operates according to an embodiment of the disclosure.

As described in the embodiment illustrated in FIG. 26, ends of transmission to the plurality of stations of the non-STR multi-link device may be synchronized. However, this needs to control of the already generated MPDU or to generate the MPDU again, and thus may cause implementation to be difficult. Accordingly, the multi-link device may transmit the control frame through the link in which the station of which channel access is not prohibited operates rather than the link in which the station of which channel access is prohibited operates. Specifically, the multi-link device may transmit the control frame through the link in which reception from the multi-link device is currently performed among stations of the non-STR multi-link device. At this time, the control frame may be the RTS frame.

In the embodiment of FIG. 29, the STR AP multi-link device includes the first AP (AP1) operating in the first link (link1) and the second AP (AP2) operating in the second link (link2). The non-STR multi-link device includes the first station (STAT) operating in the first link (link1) and the second station (STA2) operating in the second link (link2). The first AP (AP1) performs transmission to the first station (STA1). Even though the second AP (AP2) succeeds the backoff procedure, the first station (STA1) is receiving the transmission from the first AP (AP1) and thus the second AP (AP2) cannot perform transmission to the second station (STA2). At this time, the second AP (AP2) makes a request for transmitting the RTS frame with the second station (STA2) as a receiver to the first AP (AP1). The first AP (AP1) may insert the RTS frame with the second station (STA2) as the receiver into transmission being performed by the first AP (AP1). In another detailed embodiment, after the first AP (AP1) ends transmission being performed by the first AP (AP1), the first AP (AP1) may transmit the RTS frame with the second station (STA2) as the receiver in the first link (link1) after SIFS from the corresponding transmission. The first station (STA1) receives the RTS frame with the second station (STA2) as the receiver and transfers the received RTS frame to the second station (STA2). The second station (STA2) performs CCA during PIFS. When the channel is idle during PIFS, the second station (STA2) transmits the CTS-to-Self frame. The first AP (AP1) may stop transmission to the first station (STA1) during a time interval in which it is expected for the second station (STA2) to transmit a response to the RTS frame. Further, the first station (STA1) may transmit ACK for the received transmission while the second station (STA2) transmits a response to the RTS frame. In another detailed embodiment, the first station STA1) may also transmit the response to the RTS frame while the second station (STA2) transmits the response to the RTS frame. FIG. 29 is to help for understanding of description and may be used for transmission of the control frame as well as the RTS frame and the CTS-to-Self frame. Further, another time interval other than PIFS may be used.

Figure 30:
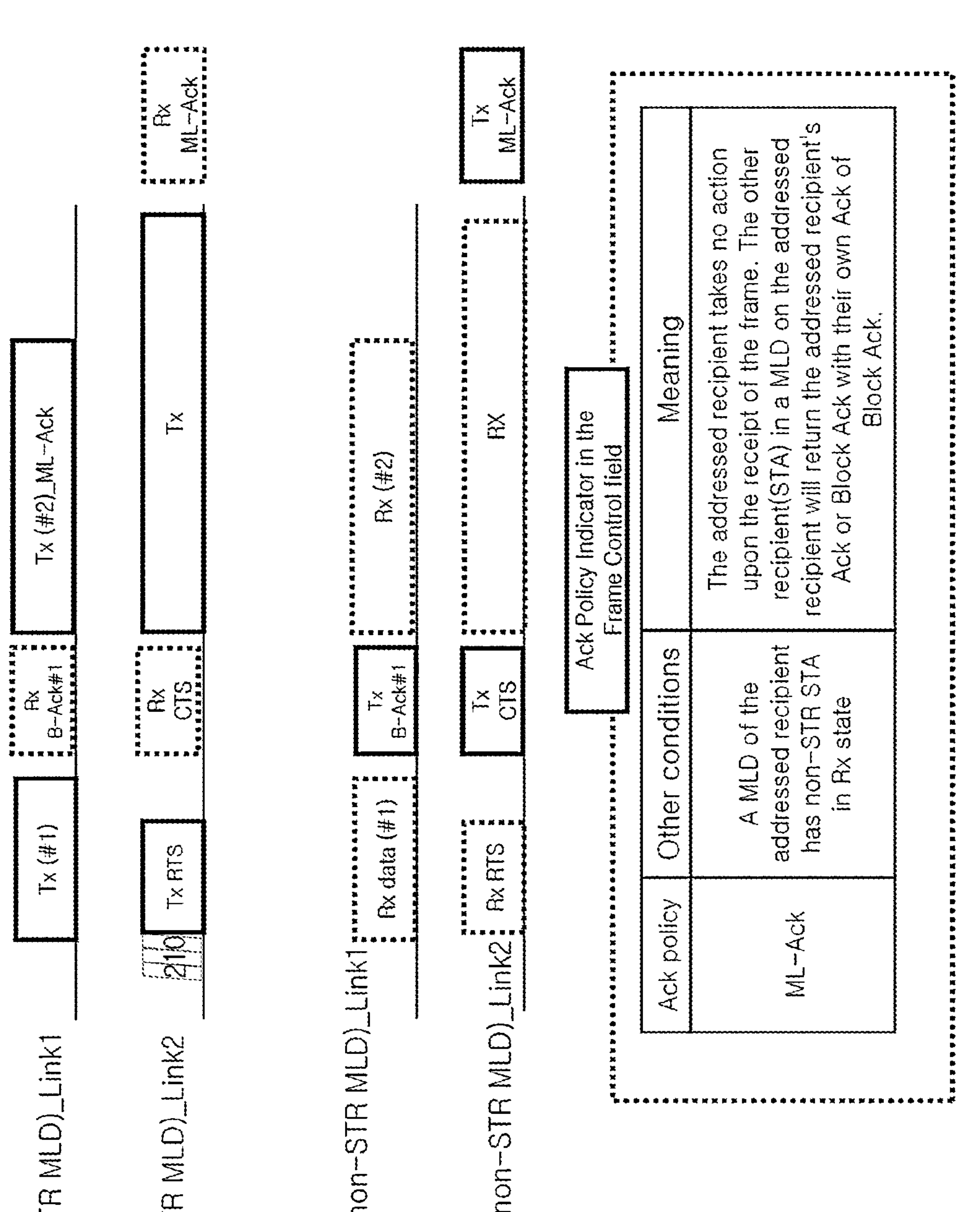
FIG. 30 illustrates transmission of ACK by the multi-link device according to an embodiment of the disclosure.

FIG. 30 illustrates transmission of ACK by the multi-link device according to an embodiment of the disclosure.

The station of the multi-link device may make a request for a link to transmit ACK to the station of the no-STR multi-link device. Specifically, the station of the multi-link device may make a request for transmitting ACK in a link different from the link in which transmission has been performed. In the embodiment of FIG. 28, the first AP (AP1) of the STR multi-link device performs transmission (Tx(#2)) to the first station (STA1) of the non-STR multi-link device. At this time, the first AP (AP1) makes a request for transmitting ACK for transmission (Tx(#2)) through the second link (link2). This is because it is determined that transmission of ACK for the transmission (Tx(#2)) of the first AP(AP1) is difficulty since the transmission (Tx(#2)) of the first AP(AP1) ends earlier than transmission to the second station (STA2) by the second AP (AP2).

Further, for the ACK transmission, the station may configure an ACK policy as an implicit BAR in order not to transmit an immediate response to transmission. In another detailed embodiment, the station may configure the ACK policy for transmission as BlockAckReq. However, in order to transmit Block ACK, BlockAckReq should be transmitted, and thus channel access burden and a transmission delay may be generated. Accordingly, a new ACK policy for the multi-link device may be needed.

One station of the multi-link device may also transmit ACK for transmission received by another station included in the multi-link device, which is the same as ACK for transmission received by the station. The ACK transmission may be referred to as multilink (ML)-ACK. Further, ML-ACK may be configured as the ACK policy. In the embodiment of FIG. 30, the first AP (AP1) configures ML-ACK as the ACK policy of transmission (Tx(#2)). The first station (STAT) does not transmit ACK to the first AP (AP1) after receiving transmission (Tx(#2)). The second station (STA2) completes reception of the transmission from the second AP (AP2) and transmits ACK for transmission from the first AP (AP1) and transmission from the second AP (AP2) together. The non-STR multi-link device may include not only the first station (STA1) and the second station (STA2) but also a third station (STA3), and the STR multi-link device may include not only the first AP (AP1) and the second AP (AP2) but also a third AP (AP3). At this time, ML-ACK may be configured as the ACK policy of transmission to the second station (STA2) from the second AP (AP2). When transmission from the third AP (AP3) to the third station (STA3) is completed later than transmission from the second AP (AP2) to the second station (STA3), the third station (STA3) may transmit ACK for transmission from the first AP (AP1) to the first station (STA1), ACK from the second AP (AP2) to the second station (STA2), and ACK for transmission from the third AP (AP3) to the third station (STA3) to the third AP (AP3).

Through the embodiments, even though transmissions to the stations of the non-STR multi-link device are not simultaneously completed, it is possible to prevent interference between links that may be generated due to ACK transmission. In the above-described embodiment, the ACK policy may be configured as BlockAck instead of ML-ACK. In another detailed embodiment, the ACK policy may be configured as No Ack instead of ML-ACK.

The number of links acquiring transmission opportunities may increase while the multi-link device performs traffic transmission. At this time, through the link acquiring the transmission opportunity later, the multi-link device may transmit traffic, which the multi-link device is scheduled to transmit through the link acquiring the transmission opportunity first. At this time, NAV configured in the link acquiring the transmission opportunity first by the multi-link device may be configured to be larger than NAV required for transmitting traffic. When the NAV is configured to be larger than NAV required for transmitting traffic in the link acquiring the transmission opportunity first by the multi-link device, the multi-link device may transmit a CF-END frame after completing transmission in the link acquiring the transmission opportunity first, so as to reset NAV.

Reception of the sync PPDU and signaling related to the reception of the sync PPDU are described with reference to FIGS. 31 to 34.

In order to receive the sync PPDU, the first station of the non-STR multi-link device should determine whether the second station having the non-STR relation with the first station starts receiving the sync PPDU. Further, the first station should continuously perform preamble detection (PD). When it is considered that channel access of the first station receiving the sync PPDU is prohibited by reception of another station of the non-STR multi-link device, such an operation of the first station may be irrational. Accordingly, the first station may enter a doze state in a predetermined condition. The sync PPDU may be transmitted within the conventionally configured TXOP. Accordingly, a performance gain that can be obtained by reception of the sync PPDU may be determined according to the length of the remaining TXOP. Therefore, the first station may determine whether to give up reception of the sync PPDU based on the length of the sync PPDU. When the first station gives up reception of the sync PPDU, the first station may enter the doze state. Such a power-saving operation may be referred to as inter-link TXOP power save (PS). In the inter-link TXOP PS, the station entering the doze state may wake up from the doze state in order to receive frames periodically transmitted from the AP, for example, a beacon frame, a TIM frame, and a DTIM frame. Further, when the TXOP ends, for example, when a CF-END frame is transmitted, the station entering the doze state in the inter-link TXOP PS may wake up from the doze state.

The TXOP may be changed to a period indicated through a length field of the signaling field of the PPDU or a duration field of the MAC frame. Specifically, in the above-described embodiment, the station may determine a time of occupation of the PPDU based on the period indicated through the length field or the duration field of the MAC frame.

The non-AP multi-link device may signal information on whether the sync PPDU is received and sync PPDU support conditions to the AP multi-link device. Further, the AP multi-link device may signal information on whether the AP multi-link device supports PPDU transmission to the non-AP multi-link device. At this time, the multi-link device may signal information on whether the sync PPDU is supported for each multi-link device. For example, the AP multi-link device may signal information on whether sync PPDU transmission is supported for each AP multi-link device. In another detailed embodiment, the multi-link device may signal information on whether the sync PPDU is supported for each station. Specifically, the AP multi-link device may signal information on whether sync PPDU transmission is supported for each AP included in the AP multi-link device. For example, the AP multi-link device including the first AP, the second AP, and the third AP may indicate that the first AP supports sync PPDU transmission, and the second AP and the third AP do not support sync PPDU transmission.

When information indicating that the AP multi-link device associated with the non-AP multi-link device does not support sync PPDU transmission, the station of the non-AP multi-link device may enter the doze state of the inter-link PS while another station of the non-AP multi-link device performs reception. This is because, the AP multi-link device associated with the non-AP multi-link device cannot transmit the sync PPDU. At this time, the station of the non-AP multi-link device may determine the length of time to maintain the doze state based on the length of the PPDU received by another station of the non-AP multi-link device.

Whether the sync PPDU transmission or reception is supported may be determined according to an operation policy as well as the hardware performance. Accordingly, whether the sync PPDU transmission or reception is supported may be signaled not only through information on the performance but also through information on an operating mode. A method of signaling the support of sync PPDU transmission or reception will be described in detail with reference to FIG. 31.

FIG. 31 illustrates an element field indicating information on support of sync PPDU reception or transmission according to an embodiment of the disclosure.

As described above, the information indicating whether the sync PPDU transmission is supported may be included in an element indicating a capability of the station. For convenience of description, the element indicating the capability of the station is referred to as a capability element. Further, in the capability element, a field of information indicating whether sync PPDU transmission is supported is referred to as a Supporting Sync PPDU Tx sub field. At this time, the capability element may be a multi-link element which is an element indicating a capability of a multi-link. Further, the capability element may be an EHT capability element indicating a capability related to EHT. FIG. 31(*a*) illustrates an example of the capability element.

When a value of the Supporting Sync PPDU Tx sub field is 1, Supporting Sync PPDU Tx may indicate that the station or the multi-link device indicated by the Supporting Sync PPDU Tx sub field supports sync PPDU transmission. When a value of the Supporting Sync PPDU Tx sub field is 0, Supporting Sync PPDU Tx may indicate that the station or the multi-link device indicated by the Supporting Sync PPDU Tx sub field does not support sync PPDU transmission. Further, when a station which is not included in the multi-link device transmits the capability element, Supporting Sync PPDU Tx sub field may signal information that is not information irrelevant to whether sync PPDU transmission is supported or may be used as a reserved field.

As described above, the information indicating whether sync PPDU reception is supported may be included in an element indicating information related to the operation of the station. For convenience of description, the element indicating the information related to the operation of the station is referred to as an operation element. Further, in the operation element, a field of information indicating whether sync PPDU reception is supported is referred to as a Supporting Sync PPDU Rx Disable sub field. FIG. 31(*b*) illustrates an example of the operation element. When a value of the Supporting Sync PPDU Rx Disabled sub field is 1, it may indicate that sync PPDU reception is not supported. Specifically, when the value of the Supporting Sync PPDU Rx Disabled sub field is 1, the Supporting Sync PPDU Rx Disabled sub field may indicate that the station transmitting the Supporting Sync PPDU Rx Disabled sub field does not want to wait for receiving the sync PPDU. In the multi-link device configuring the value of the Supporting Sync PPDU Rx Disabled sub field as 1, the second station of the multi-link device may not perform PD and CCA while the first station of the multi-link device performs reception. The AP multi-link device associated with the multi-link device transmitting the Supporting Sync PPDU Rx Disabled sub field does not simultaneously transmit PPDUs to a plurality of stations of the multi-link device transmitting the Supporting Sync PPDU Rx Disabled sub field. The PPDU may be an SU PPDU, a full BW MU PPDU, or an OFDMA MU PPDU transmitted through one of a non-HT PPDU format, an HT PPDU format, a VHT PPDU format, an HE PPDU format, and an EHT PPDU format. At this time, the AP multi-link device should not transmit a frame making a request for a response, for example, an immediate response. The frame making a request for a response may include at least one of RTS, multi-user (MU)-RTS, a trigger frame, and a block ack request (BAR).

Further, the operation element may include information related to the minimum length of the sync PPDU which can be received by the station or the multi-link device transmitting the operation element. At this time, a sub field indicating the information related to the minimum length of the sync PPDU is referred to as a Remaining TXOP Threshold sub field. The Remaining TXOP Threshold sub field may indicate a time. Further, the Remaining TXOP Threshold sub field may be expressed in units of us, ms, or symbols. The multi-link device associated with the multi-link device transmitting the Remaining TXOP Threshold sub field may not be allowed to transmit a sync PPDU shorter than the length indicated by the Remaining TXOP Threshold sub field to the multi-link device or the station transmitting the Remaining TXOP Threshold sub field.

Further, when the Remaining TXOP Threshold sub field is configured as a predetermined value, it may indicate that the multi-link device or the station transmitting the Remaining TXOP Threshold sub field does not support sync PPDU reception. The predetermined value may be a value indicating a time longer than the maximum time that can be expressed by the Remaining TXOP Threshold sub field. In another detailed embodiment, the predetermined value may be 0. When the embodiments are applied, the Sync PPDU Rx Disable sub field may be omitted in the operation field.

Further, in the above embodiments, it has been described that the Sync PPDU Rx Disable sub field and the Remaining TXOP Threshold sub field can be signaled through the operation element. The Sync PPDU Rx Disable sub field and the Remaining TXOP Threshold sub field may be signaled through an element other than the operation element or signaling information. An embodiment of implementing the inter-link TXOP power saving mode according to the signaling described with reference to FIG. 31 is described with reference to FIGS. 32 to 34.

Figure 32:
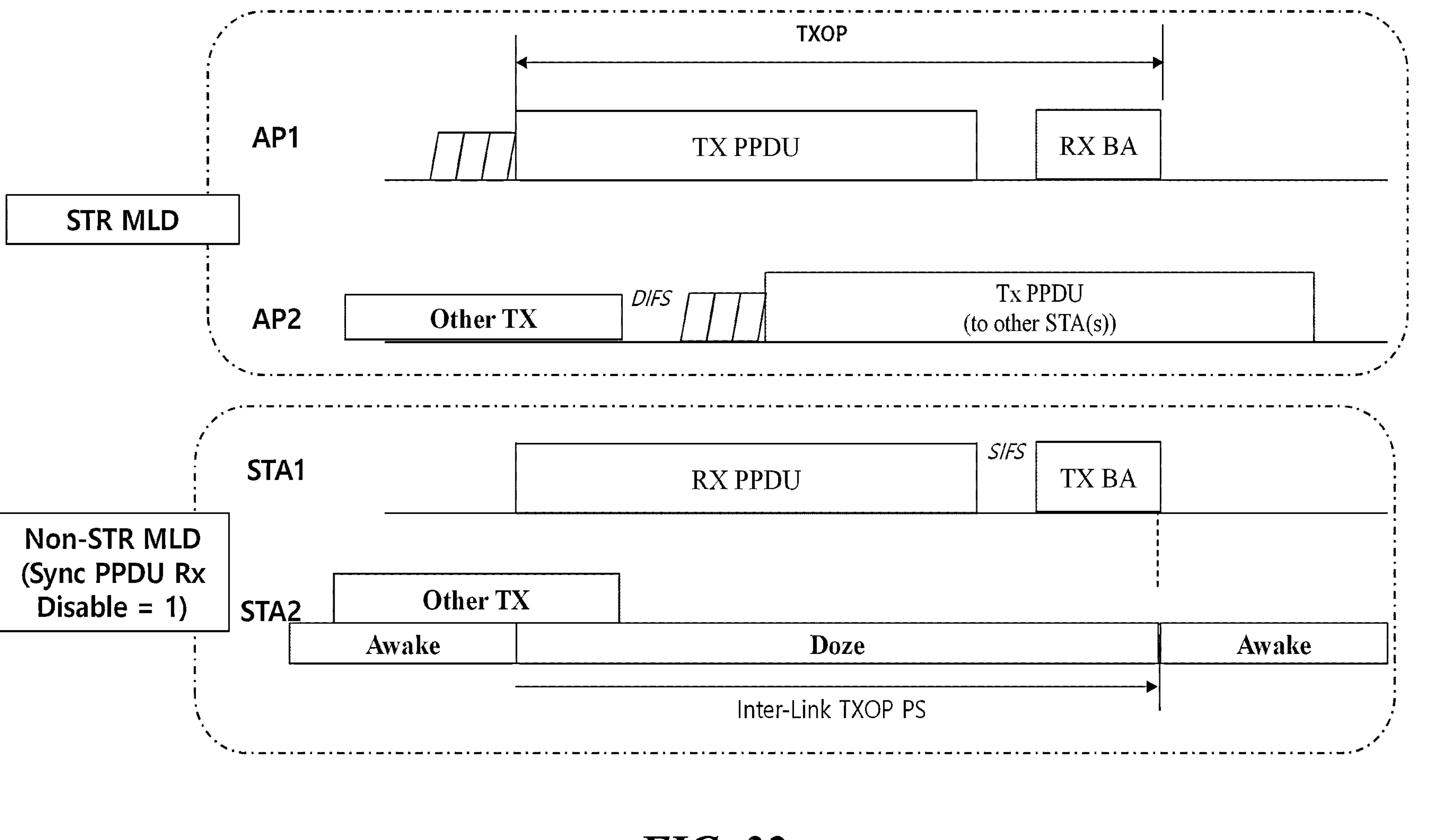
FIG. 32 illustrates the performance of an inter-link TXOP power saving mode operation by the non-STR multi-link device according to an embodiment of the disclosure.

FIG. 32 illustrates the performance of an inter-link TXOP power saving mode operation by the non-STR multi-link device according to an embodiment of the disclosure.

When information indicating that the non-STR multi-link device does not support sync PPDU reception is signaled, the second station of the non-STR multi-link device may enter the doze state while the first station of the non-STR multi-link device performs reception. At this time, the second station may maintain the doze state until the end time point of the TXOP indicated by the PPDU received by the first station. As described above, the time point at which the second station expects reception of the frame periodically transmitted from the AP may be before the time point at which the TXOP indicated by the PPDU received by the first station ends. At this time, the second station may wake up from the doze state before the time point at which the TXOP indicated by the PPDU received by the first station ends. As described above, the frame periodically transmitted from the AP may include at least one of the beacon frame, the TIM frame, and the DTIM frame.

The second station may maintain the doze state even after the time point at which the TXOP indicated by the PPDU received by the first station ends. Specifically, the second station may maintain the doze state even after the time point at which the TXOP indicated by the PPDU received by the first station ends based on information received from the AP associated with the second station. At this time, the information received from the AP associated with the second station may be NAV-related information. Further, the information received from the AP associated with the second station may be operation information of the AP associated with the first station. When NAV configured by the second AP of the AP multi-link device performing transmission to the second station of the non-AP multi-link device does not expire, the first AP of the AP multi-link device may transmit information on an expected time point at which transmission or reception of the first AP and an expected time point at which NAV expires to the first station of the non-AP multi-link device signaling information indicating that the first AP of the AP multi-link device does not want to receive the sync PPDU. When NAV configured by the second AP of the AP multi-link device performing transmission to the second station of the non-AP multi-link device does not expire, it may include transmission or reception of PPDU by the second AP from one station. When NAV configured by the second AP of the AP multi-link device performing transmission to the second station of the non-AP multi-link device does not expire, it may include a configuration of NAV in the second AP by the PPDU which is not transmitted by the second station.

In the embodiment of FIG. 32, the STR AP multi-link device includes the first AP (AP1) operating in the first link (link1) and the second AP (AP2) operating in the second link (link2). The non-STR multi-link device includes the first station (STAT) operating in the first link (link1) and the second station (STA2) operating in the second link (link2). The non-STR non-AP multi-link device signals information indicating that reception of the sync PPDU is not desired. The first AP (AP1) performs transmission to the first station (STAT). At this time, the second station (STA2) maintains the doze station until the time point at which the TXOP indicated by the PPDU which the first AP (AP1) transmits to the first station (STAT) ends.

Figure 33:
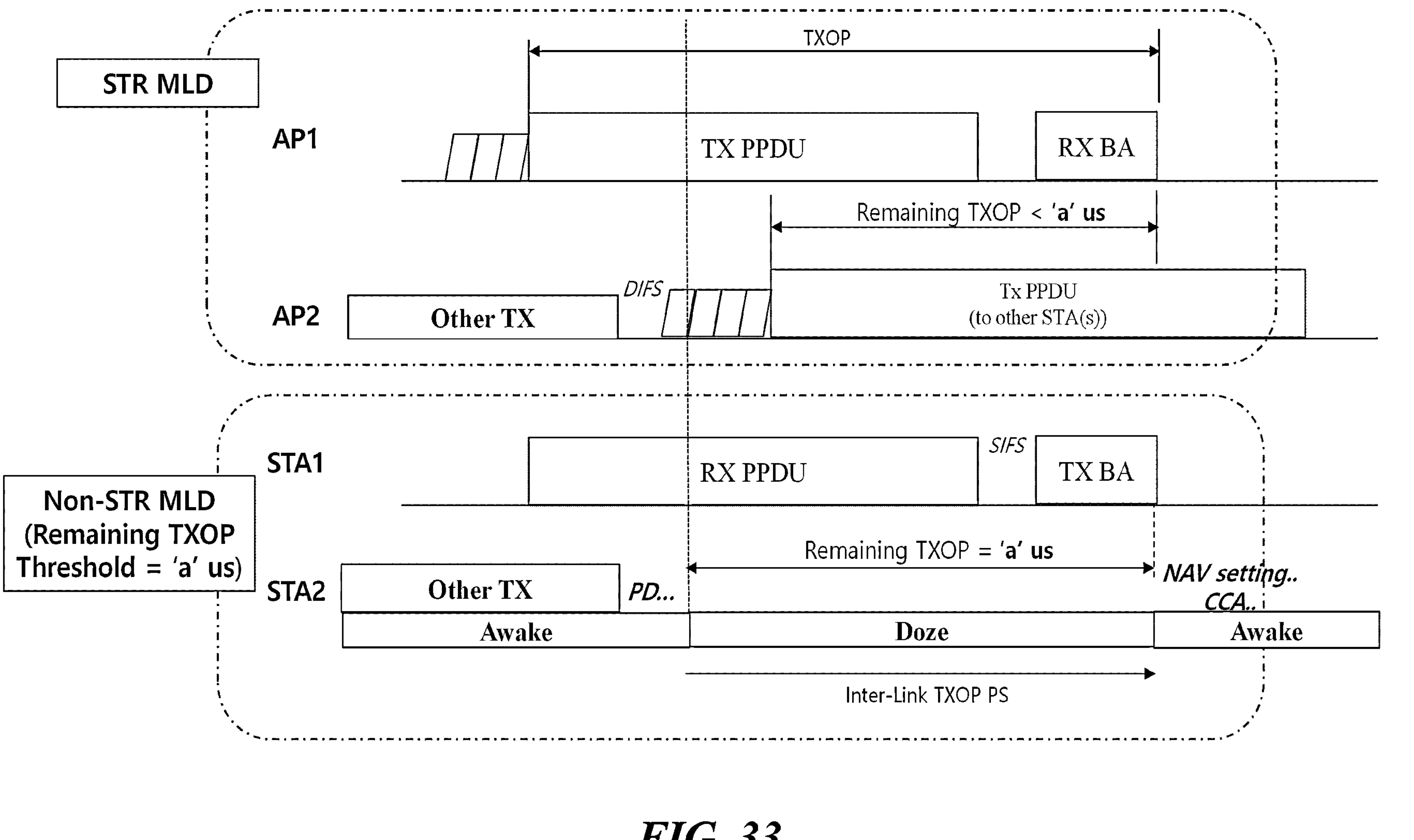
FIG. 33 illustrates entry of the station of the non-STR multi-link device into a doze state from sync PPDU reception standby according to an embodiment of the disclosure.

FIG. 33 illustrates entry of the station of the non-STR multi-link device into the doze state from sync PPDU reception standby according to an embodiment of the disclosure.

When the remaining duration of the TXOP indicated by the PPDU being received by the first station of the non-STR multi-link device is shorter than or equal to the length indicated by the Remaining TXOP Threshold sub field transmitted by the non-STR multi-link device, the first station of the non-STR multi-link device may enter the doze state of the inter-link TXOP. At this time, when the remaining duration of the TXOP indicated by the PPDU being received by the first station is longer than the length indicated by the Remaining TXOP Threshold sub field transmitted by the non-STR multi-link device, the second station may receive the sync PPDU transmitted to the second station before entering the doze state. At this time, the second station may receive the sync PPDU. To this end, the second station may perform PD and determine whether an intended receiver of the received PPDU is the second station. Specifically, the second station may determine whether an AID indicated by the signaling field of the PPDU or an RA of the MAC frame included in the PPDU indicates the second station.

In the embodiment of FIG. 33, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). The non-STR non-AP multi-link device signals information indicating that reception of the sync PPDU is desired. At this time, the non-AP multi-link device also signals 'a' that is the minimum length of the TXOP required for sync PPDU reception. The first AP (AP1) performs transmission to the first station (STA1) and the second station (STA2) waits for receiving the sync PPDU. When the TXOP of the PPDU which the first AP (AP1) transmits to the first station (STAT) is equal to or shorter than 'a', the second station (STA2) enters the inter-link TXOP power saving state.

Figure 34:
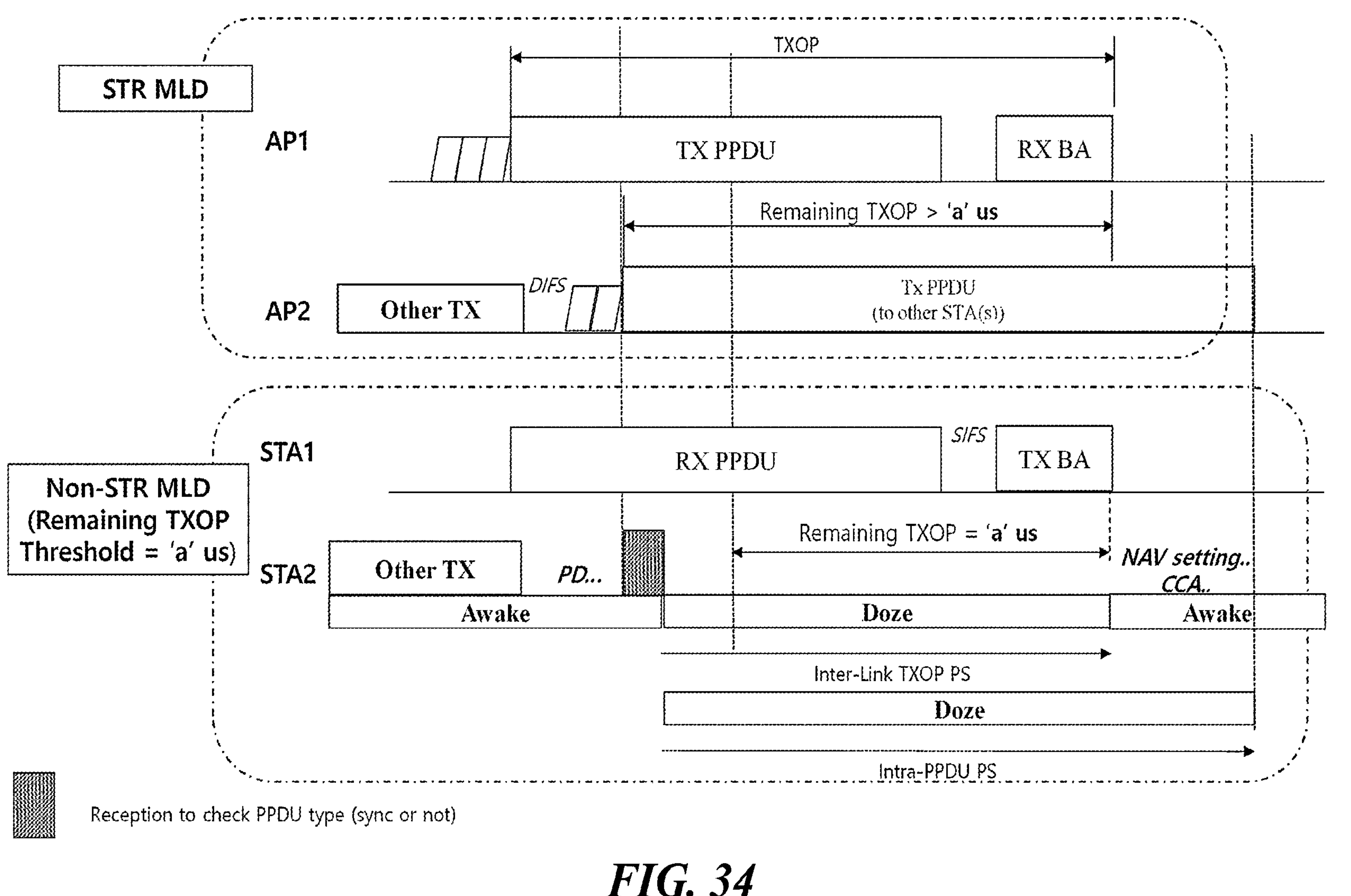
FIG. 34 illustrates entry of the station of the non-STR multi-link device into doze state from sync PPDU reception standby according to another embodiment of the disclosure.

FIG. 34 illustrates entry of the station of the non-STR multi-link device into the doze state from sync PPDU reception standby according to another embodiment of the disclosure.

When transmission of the PPDU which is not the sync PPDU is detected in the BSS operated by the AP associated with the station of the non-STR multi-link device while the station of the non-STR multi-link device waits for receiving the sync PPDU, the station of the non-STR multi-link device may enter the inter-link TXOP power saving state. At this time, the station may determine that the PPDU with the intended receiver, which is not the station, is not the sync PPDU. Further, when transmission of the PPDU, which is the not the sync PPDU, is detected in the BSS operated by the AP associated with the station of the non-STR multi-link device in the doze state even though the minimum TXOP signaled by the station is left, the station of the non-STR multi-link device may enter the inter-link TXOP power saving state.

In the embodiment of FIG. 34, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). The non-STR non-AP multi-link device signals information indicating that reception of the sync PPDU is desired. At this time, the non-AP multi-link device also signals 'a' that is the minimum length of the TXOP required for sync PPDU reception. The first AP (AP1) performs transmission to the first station (STA1) and the second station (STA2) waits for receiving the sync PPDU. The second station (STA2) detects transmission of the PPDU, which is not the sync PPDU, in the BSS to which the second station belongs. The TXOP of the PPDU which the first AP (AP1) transmits to the first station (STA1) is larger than 'a', but the second station (STA2) enters the inter-link TXOP power saving state.

<Multi-Link Single Radio Multi-Link Device Service Procedure>

As described above, a multi-link device may adaptively operate in consideration that a first station of a non-STR multi-link device performs transmission and the state of a second station becomes a blind state. Specifically, when the multi-link device determines that a station of the non-STR multi-link device is in a blind state, the multi-link device may stop performing transmission for the station of the non-STR multi-link device. In addition, the station of the non-STR multi-link device may enter a doze state based on an operation, for example, transmission and reception, of another station of the non-STR multi-link device. Through this, a problem which may occur when, due to an operation of one station of the non-STR multi-link device, an operation of another station is restricted can be solved.

As described above, with respect to the non-STR multi-link device, different stations included in the non-STR multi-link device cannot simultaneously perform reception and transmission due to interference in the device. In addition, due to the limitations on hardware configuration of the non-STR multi-link device, different stations included in the non-STR multi-link device cannot simultaneously perform reception and transmission. Specifically, when a first station of the non-STR multi-link device performs transmission or reception, a second station of the non-STR multi-link device may be restricted to use a transceiver. For example, the non-STR multi-link device may support processing of only one PPDU. In this case, when the first station of the non-STR multi-link device performs transmission or reception, the second station may the non-STR multi-link device cannot perform transmission or reception. As such, a multi-link device which includes multiple stations operating on multiple links, respectively, but does not support simultaneous transmission or reception by the multiple stations is referred to as a single radio multi-link device. Accordingly, when one station of a single radio multi-link device performs transmission or reception, another station of the single radio multi-link device cannot perform transmission or reception. The multi-link device may operate as a single radio multi-link device according to the hardware limitations or operation mode definition as described above. Accordingly, in the present specification, a single radio multi-device may refer to not only a multi-link device in which an operation of a station is restricted due to the hardware limitations, but also a multi-link device in which an operation of a station is restricted according to the operation mode definition. Therefore, the single radio multi-link device in the present specification may include a multi-link device which supports simultaneous transmission or reception by multiple stations of the multi-link device, but does not support simultaneous transmission or reception by multiple stations of the multi-link device in a specific condition. In this case, the specific condition may include a specific time point.

The above-described embodiments relating to an operation of a non-STR multi-link device may be also applied to an operation of a single radio multi-link device. In addition, the above-described embodiments relating to an operation of a station performing transmission or reception with a station of a non-STR multi-link device may be also applied to an operation of a station perform transmission or reception with a station of a single radio multi-link device. For example, when a station determines that transmission of a single radio multi-link device has failed on a first link due to transmission or reception of the single radio multi-link device on a second link, the station may not increase a CW of channel access performed on the first link. Specifically, the embodiment described through FIG. 14 is applicable. In this case, a method for determining, by the station, that transmission of the single radio multi-link device has failed on a first link due to transmission or reception of the single radio multi-link device on the second link may be similar to the method for determining, by the station, whether transmission of the station of the non-STR multi-link device has failed due to restriction on the operation of the non-STR multi-link device.

Figure 35:
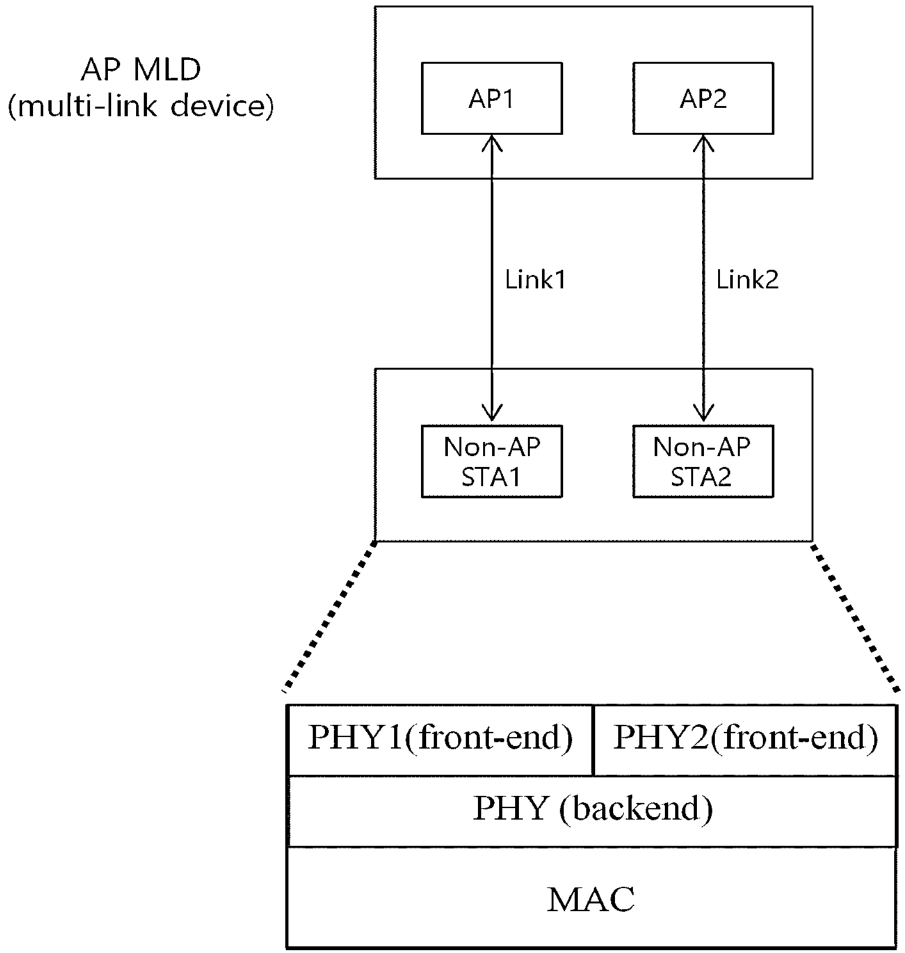
FIG. 35 illustrates connection between a single radio multi-link device and an AP multi-link device according to an embodiment of the present invention.

FIG. 35 illustrates connection between a single radio multi-link device and an AP multi-link device according to an embodiment of the present invention.

In the present specification, a PHY back end refers to a physical layer digital processor including a processor for encoding and decoding a PPDU. In addition, a PHY front end refers to an analog baseband circuit including an RF chain.

Multiple stations of a single radio multi-link device operate on multiple links. The multiple stations may share the PHY back end. In this case, when one station transmits a PPDU, the PHY back end is used for encoding of the PPDU. Accordingly, in this case, the remaining stations of the multiple stations cannot use the PHY back end. Accordingly, the single radio multi-link device may include multiple stations operating on different links, but perform transmission or reception on only one link at a time.

However, the single radio multi-link device may perform channel access on multiple links. Specifically, the single radio multi-link device may perform monitoring on multiple links. Accordingly, the single radio multi-link device may perform channel access on multiple links. In this case, the monitoring may include channel sensing. In addition, the channel sensing may include at least one of clear channel assessment (CCA) and preamble detection (PD). Through this, the single radio multi-link device can reduce a channel access delay. Specifically, even though a first station of the single radio multi-link device fails to perform channel access due to channel occupancy by another wireless communion device, performed on a first link, a second station of the single radio multi-link device may perform a backoff procedure on a second link.

To support such embodiments, the PHY front end of the single radio multi-link device may support channel monitoring independently from the PHY back end for PD. In addition, the PHY front end of the single radio multi-link device may support decoding of a preamble of a PPDU, independently from the PHY back end. In addition, the PHY front end of the single radio multi-link device may support reception of a frame transmitted through a low MCS, independently from the PHY back end. In this case, the frame transmitted through the low MCS may include at least one an RTS frame and an MU-RTS frame. Accordingly, the PHY front end may include a MAC processor. In addition, through such an embodiment, processing power of the PHY back end can be utilized focusing on encoding and decoding of a data frame.

In the embodiment of FIG. 35, an AP multi-link device includes a first AP (AP1) and a second AP (AP2). A single radio multi-link device includes a first non-AP station (non-AP STA1) and a second non-AP station (non-AP STA2). The first AP (AP1) is connected to the first non-AP station (non-AP STA1) on a first link (link1), and the second AP (AP2) is connected to the second non-AP station (non-AP STA2) on a second link (link2). As described in the embodiments above, each of the first non-AP station (non-AP STA1) and the second non-AP station (non-AP STA2) independently performs channel access by using a PHY front end.

The single radio multi-link device may use an RF chain of a station not participating in transmission or reception for MIMO transmission. Specifically, when a first station of the single radio multi-link device acquires a channel access opportunity, the first station may perform MIMO transmission by using not only an RF chain used by the first station but also an RF chain used by a second station. A description thereof is made through FIG. 36.

Figure 36:
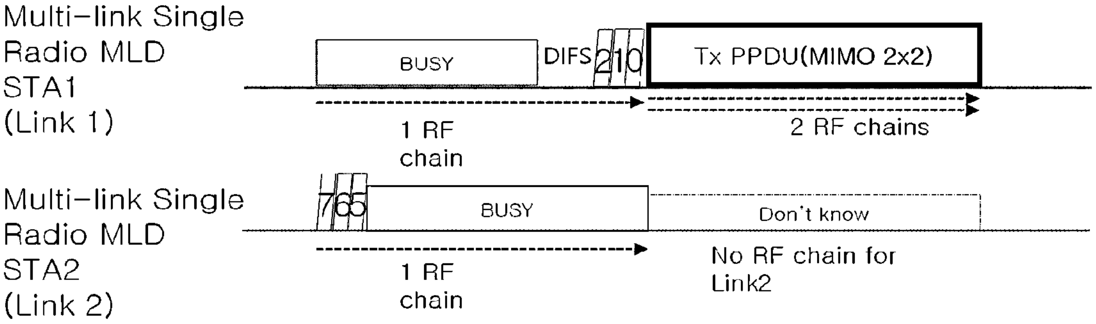
FIG. 36 illustrates MIMO transmission performed by a single radio multi-link device according to an embodiment of the present invention.

FIG. 36 illustrates MIMO transmission performed by a single radio multi-link device according to an embodiment of the present invention.

In an embodiment of FIG. 36, a first station (STA1) of a single radio multi-link device operates on a first link (Link 1), and a second station (STA2) of a single radio multi-link device operates on a second link (Link 2). The first station (STA1) performs channel access on the first link (Link 1), and the second station (STA2) performs channel access on the second link (Link 2). When the first station (STA1) successfully performs channel access on the first link (Link 1), the first station (STA1) performs 2×2 MIMO transmission on the first link (Link 1) by using not only an RF chain used in channel access on the first link but also an RF chain used by the second station (STA2) in channel access on the second link.

As such, when the RF chain operating on the first link is switched to operate on the second link, the single radio multi-link device cannot perform monitoring and channel access on the first link. In addition, when the corresponding RF chain operates on the second link again, the single radio multi-link device may perform channel access on the second link after waiting a predetermined time interval. In this case, for a predetermined time interval from completion of RF switching, channel access by the single radio multi-link device may be restricted on the second link. Specifically, the single radio multi-link device may perform channel access on the second link after waiting a predetermined time interval from completion of RF switching. In this case, the channel access may include a backoff procedure. In addition, the predetermined time interval may correspond to a predetermined time interval applied when restriction on channel access is required due to a time interval for which channel monitoring is impossible. Specifically, the predetermined time interval may be NAVSyncdelay. Specifically, the single radio multi-link device may perform a backoff procedure after waiting NAVSyncdelay. This is because there is high probability that transmission of another wireless communication terminal, performed on the second link, fails to be detected due to a time period for which the single radio multi-link device has failed to perform channel monitoring. In addition, when a link on which an RF chain operates is switched, a delay for starting an operation of an RF chain may be required. Accordingly, in consideration of a RF chain switching delay, the single radio multi-link device may perform channel access. A description thereof is made through FIG. 37. In addition, for convenience of description, switching of an RF chain operating on one link to operate on another link is referred to as RF chain switching. In addition, switching of a link may indicate switching of an RF chain supported on the link. Specifically, a case where use of multiple chains is supported and then use of one RF chain is supported on a first link, or a case where use of even one RF chain is not supported and then use of one RF chain is supported on the second link, may be referred to as RF chain switching.

A station communicating with a single radio multi-link device by using MIMO may be a station of a multi-link device. Specifically, a station communication with a single radio multi-link device by using MIMO may be an AP included in a multi-link device. Unless there is no specific description, a station communicating with a single radio multi-link device by using MIMO in the present specification may correspond to a station included in a multi-link device. In this case, the station included in the multi-link device may be an AP. In addition, in the present specification, a description made as an operation of a station of a multi-link device may correspond to a representation of an operation of a multi-link device.

Figure 37:
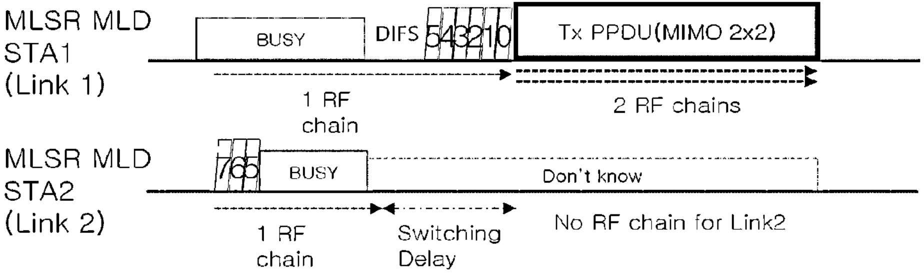
FIG. 37 illustrates an operation of performing channel access by a single radio multi-link device in consideration of a radio frequency (RF) chain switching delay according to an embodiment of the present invention.
Figure 37:
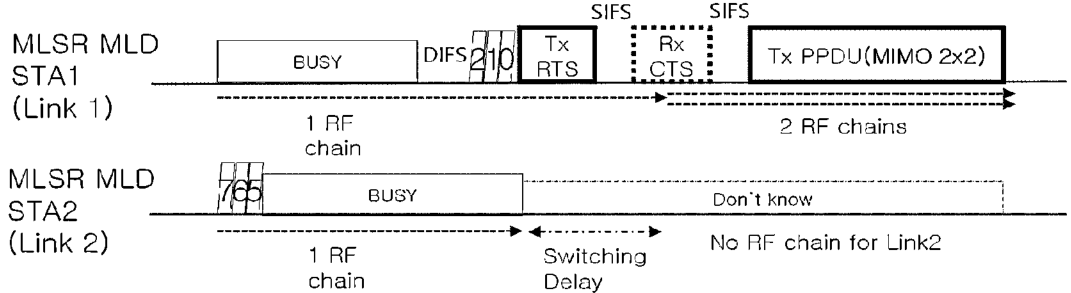

FIG. 37 illustrates an operation of performing channel access by a single radio multi-link device in consideration of an RF chain switching delay according to an embodiment of the present invention.

A single radio multi-link device may perform RF chain switching before a time point at which successful channel access is expected to be successfully performed. Specifically, the single radio multi-link device may perform RF chain switching before a time interval configured based on RF chain switching delay from the time point at which channel access is expected to be successfully performed. For example, the single radio multi-link device may perform RF chain switching at a time point earlier by the RF change switching delay from the time point at which channel access is expected to be successfully performed.

In an embodiment of FIG. 37, a first station (STA1) of a single radio multi-link device operates on first link (Link 1), and a second station (STA2) of a single radio multi-link device operates on a second link (Link 2). The first station (STA1) performs channel access on the first link (Link 1), and the second station (STA2) performs channel access on the second link (Link 2). When the first station (STA1) has successfully performed channel access on the first link (Link 1), the first station (STA1) performs 2×2 MIMO transmission by using not only an RF chain used for channel access on the first link (Link 1) but also an RF chain used for channel access by the second station (STA2) on the second link (Link 2). In an embodiment of part (a) of FIG. 37, a single radio multi-link device performs RF chain switching at a time point earlier by an RF chain switching delay from a time (expected Tx time) at which channel access is expected to be successfully performed. In another specific embodiment, a single radio multi-link device may start an RTS frame/CTS frame exchange at the start of transmission after RF chain switching. In another specific embodiment, a single radio multi-link device may transmit a CTS-to-self frame at the start of transmission after RF chain switching. In addition, the single radio multi-link device may transmit a frame having a relatively shorter length, instead of the CTS-to-self frame. Through such embodiments, the single radio multi-link device may acquire a time required until completion of the RF chain switching. In addition, unlike the above-described embodiments, in these embodiments, a problem may not occur even when channel access fails to be successfully performed at an expected time point.

In an embodiment of part (b) of FIG. 37, a single radio multi-link device starts transmission through an RTS frame/CTS frame exchange on a first link (Link 1).

Figure 38:
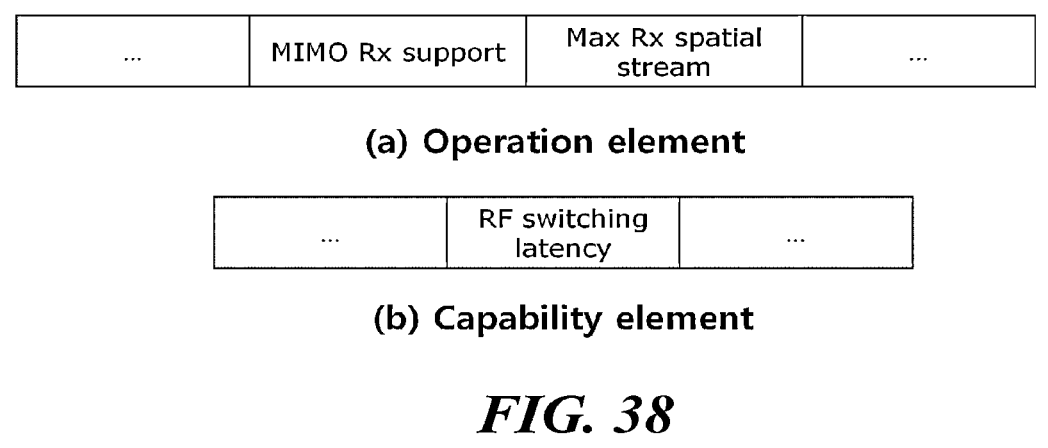

FIG. 38 illustrates a capability element and an operation element used by a single radio multi-link device according to an embodiment of the present invention.

The single radio multi-link device may perform transmission or reception by perform RF chain switching as described through FIGS. 36 and 37. In addition, the single radio multi-link device may perform transmission or reception without performing RF chain switching. The single radio multi-link device may select whether to perform RF chain switching.

When performing MIMO communication in a corresponding link in a MIMO Rx support subfield of an operation element, the single radio multi-device may indicate whether to use an RF chain of another link. For example, when the single radio multi-link device configures a value of the MIMO Rx support subfield of the operation element as 1, the MIMO Rx support subfield may indicate that MIMP reception can be performed by using many spatial streams as the number equal to or greater than the value of a Max Rx spatial stream subfield of the operation element. In this case, a station performing MIMO transmission to the single radio multi-link device needs to perform the MIMO transmission by using many spatial streams as the number equal to or smaller than a value the Max Rx spatial stream subfield of the operation element. In a specific embodiment, a format of the operation element may be as shown in part (a) of FIG. 38.

In addition, the single radio multi-link device may signal a time required for RF chain switching in a capability element. In this case, a switching latency subfield of the capability element may indicate the time required for RF chain switching. A station performing MIMO transmission to the single radio multi-link device needs to perform the MIMO transmission in consideration of the time required for RF chain switching. Specifically, the station performing the MIMO transmission to the single radio multi-link device may start the MIMO transmission after a time required for RF chain switching elapses from initial transmission for the single radio multi-link device. In a specific embodiment, a format of the capability element may be as shown in part (a) of FIG. 38.

When the single radio multi-link device performs transmission or reception on a first link, a station which is to perform transmission to the single radio multi-link device may not be allowed to perform the transmission on a link other than the first link. This is because the single radio multi-link device cannot perform reception on a link other than the first link while transmission or reception is performed on the first link. Specifically, a station which is to perform transmission to the single radio multi-link device may not be allowed to perform the transmission on a link other than the link not only while a frame exchange is performed on the first link but also until a predetermined time elapses from a time point at which the single radio multi-link device completes a frame exchange sequence. Specifically, the completion of the frame exchange sequence may be determined based on reception or transmission of a last frame of the frame exchange sequence. In this case, the frame exchange sequence may be performed on a link on which multiple RF chains are available. Specifically, the frame exchange sequence may be performed using MIMO. The predetermined time may be determined based on a time required for RF chain switching. Specifically, the predetermined time may be a time required for RF chain switching.

In addition, a station which is to perform transmission to the single radio multi-link device in the frame exchange sequence immediately after RF chain switching may determine a format of a PPDU initially transmitted in the frame exchange sequence, based on the time required for RF chain switching by the single radio multi-link device. In addition, a station which is to perform transmission to the single radio multi-link device in a first frame exchange sequence after RF chain switching may determine the length of padding used for transmission of a PPDU initially transmitted in the frame exchange sequence, based on the time required for RF chain switching by the single radio multi-link device. In this case, the padding may be one of physical layer padding and MAC layer padding. Specifically, the station may configure a shorter length of padding of a packet transmitted to a single radio multi-link device requiring a relatively shorter time for RF chain switching than padding of a packet transmitted to a single radio multi-link device requiring a relatively longer time for RF chain switching.

Figure 39:
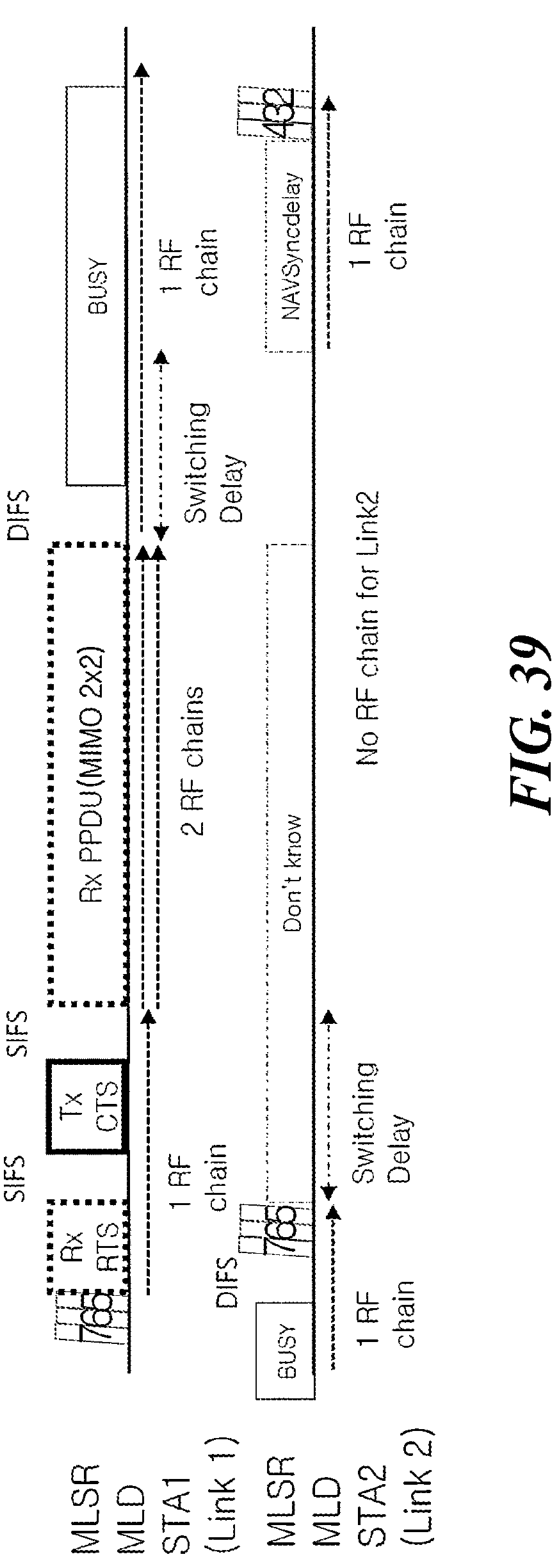
FIG. 39 illustrates transmission of a PPDU by using MIMO by a single radio multi-link device according to an embodiment of the present invention.

FIG. 39 illustrates transmission of a PPDU by using MIMO by a single radio multi-link device according to an embodiment of the present invention.

A station which is to perform MIMO transmission to a single radio multi-link device may start a RTS frame/CTS frame exchange at a start of the transmission after RF chain switching. In this case, an RTS frame may secure a time for RF chain switching, and protect a frame exchange thereafter. When it is determined that RF chain switching has failed to be completed even after the RTS frame/CTS frame exchange, a station which is to perform MIMO transmission to the single radio multi-link device may not perform the MIMO transmission. In this case, the station which is to perform the MIMO transmission to the single radio multi-link device may perform the transmission by using a single spatial stream.

When the single radio multi-link device is to perform transmission or reception on a certain link, the single radio multi-link device cannot perform transmission or reception on a link other than the corresponding certain link. Accordingly, when the single radio multi-link device performs transmission or reception on a certain link, it may be considered that a station operating on a link other than the corresponding certain link is in a blind state. Accordingly, when the single radio multi-link is to perform transmission or reception on a certain link, an AP which is to perform transmission to the single radio multi-link device may not perform transmission to a station operating on a link other than the corresponding certain link. In this case, the AP which is to perform transmission to the single radio multi-link device may stop performing transmission that is being performed for the station operating on a link other than the corresponding certain link.

When the single radio multi-link device performs transmission or reception on a certain link, the AP having performed or having stopped performing the transmission to the station of the single radio multi-link device may not increase a CW of a backoff procedure, used for channel access for transmission. Thereafter, when the single radio multi-link device attempts to perform transmission again to the corresponding station, the single radio multi-link device may acquire a backoff counter within the previously used CW. Accordingly, when a predetermined condition is satisfied, the station having performed or having stopped performing transmission to the station of the single radio multi-link device may not increase the CW of the backoff procedure, used for channel access. According the above-described embodiment, the predetermined condition corresponds to a case where a station determines that one of stations of a single multi-link device performs transmission or reception. Specifically, it is determined that a station having transmitted a PPDU received by another station of a multi-link device including a station is included in a single radio multi-link device, the station may determine that one of stations of the single radio multi-link device performs transmission. In this case, the station may determine a station transmitting the PPDU, based on an identifier of a station transmitting the PPDU, indicated by a signaling field of the PPDU. In this case, the station may determine whether an STA-ID of a user field of a HE PPDU indicates one of stations of the single radio multi-link device. In addition, the station may determine whether an STA-ID of a user field of an EHT PPDU indicates one of stations of a single radio multi-link device. In addition, the station may determine whether a TA field of a MAC frame included in a PPDU indicates one of stations of the single radio multi-link device. The MAC frame may be one of an MSDU, an MPDU, and an A-MPDU. This may be similar to the embodiments applied to transmission for the non-STR multi-link device described through FIG. 19 above. In addition, in a case of a channel access procedure to which EDCA is applied, the above-described CW may indicate a CW of an AC, used for channel access.

In addition, when due to transmission or reception by one of stations of the single radio multi-link device, transmission for another station of the single radio multi-link device fails, a station having performed transmission to another station of the single radio multi-link device may not increase a retry counter. In this case, the retry counter may include at least one of a long retry counter and a short retry counter.

In addition, when a station transmits an MU PPDU to multiple stations including a station of the single radio multi-link device, the above-described embodiment relating to maintaining the size of the CW may not be applied. Specifically, when a station fails to receive a response from any one of multiple stations after transmitting an MU PPDU to the multiple stations including the station of the single radio multi-link device, the station having transmitted the MU PPDU may increase the size of the CW. In this case, the station having transmitted the MU PPDU may increase a value of the CW to the next largest value among values of the CW. When the value of the CW is a maximum value, the station having transmitted the MU PPDU may maintain the value of the CW as the same value.

In the embodiment of FIG. 39, a single radio multi-link device includes a first station (STA1) operating on a first link (Link 1), and a second station (STA2) operating on a second link (Link 2). A station which is to perform transmission to the first station (STA1) by using MIMO successfully performs channel access on the first link (Link 1) and then transmits an RTS frame to the first station (STA1). The first station (STA1) transmits a CTS frame as a response to the RTS frame. A PPDU is received by using 2×2 MIMO after completion of RF chain switching by the single radio multi-link device. After the first station (STA1) received the PPDU, the single radio multi-link device performs RF chain switching, and the second station (STA2) starts channel access on the second link (Link 2) after waiting NAVSyncdelay from the RF chain switching.

<Null Data Packet (NDP) Transmission Procedure for Single Radio Multi-Link Device>

As described above, a single radio multi-link device may perform MIMO by switching a link on which an RF chain operates. When a link on which the RF chain operates is switched, learning RF characteristics of a switched link is required before MIMO communication.

Since learning of channel characteristics of the RF chain is not performed, closed-loop multiple-antenna technology (beamforming) cannot be utilized. Accordingly, channel estimation may be required. Specifically, a single radio multi-link device may perform channel estimation by using an NDP sounding protocol. A beamformer in an explicit NDP sounding sequence transmits an NDP announcement (NDPA) and then transmits an NDP. In this case, an interval between the NDPA and the NDP is an SIFS. A station having received the NDPA receives the NDP and then transmits, to the beam former, channel state information (CSI) feedback measured at the time of the reception of the NDP when an STA user info list field of the NDPA indicates the station.

In this case, before the NDP sounding protocol is performed, an RTS frame/CTS frame exchange may be performed. Specifically, a station which is to start the NDP sounding protocol with a single radio multi-link device may transmit an RTS frame before transmitting an NDPA frame. For convenience of description, the station which is to start the NDP sounding protocol with the single radio multi-link device is referred to as an NDP sounding protocol initiation station. Through the above-described embodiment, the NDP sounding protocol initiation station may protect an NDP sounding sequence. In addition, through this, a time required for RF chain switching can be secured. In addition, the NDP sounding protocol initiation station may perform an MU-RTS frame/CTS frame exchange procedure rather than the RTS frame/CTS frame exchange procedure. In addition, the NDP sounding protocol initiation station may perform an exchange of a trigger frame having a different type from that the MU-RTS frame and an exchange of a response to the trigger frame instead of performing the MU-RTS frame/CTS frame exchange procedure. In addition, in such an embodiment, the NDP sounding protocol initiation station may transmit an MU-RTS frame, a trigger frame having a different type from that of the MU-RTS frame, and an NDPA frame in a predetermined PPDU format. Specifically, the predetermined PPDU format may be at least one of a non-HT format and an HT format. In addition, the NDP sounding protocol initiation station may transmit the MU-RTS frame, the trigger frame having a different type from that of the MU-RTS frame, and the NDPA frame at a data rate equal to or lower than a predetermined data rate.

The NDP sounding protocol initiation station may adjust the length of an NDP sounding sequence based on a time required for RF chain switching. The NDP sounding protocol initiation station may use a longer NDP sounding sequence in a case of exchanging an NDP sounding sequence with a single radio multi-link device requiring a relatively longer time for RF chain switching, compared to a case of exchanging an NDP sound sequence with a single radio multi-link device requiring a relatively shorter time for RF chain switching. In this case, the NDP sounding protocol initiation station may adjust the length of the NDP sounding sequence by omitting a part of the NDP sounding sequence. In addition, the NDP sounding protocol initiation station may adjust padding of a frame exchanged in the NDP sounding sequence to adjust the length of the NDP sounding sequence. In addition, the NDP sounding protocol initiation station may adjust the length of the NDP sounding sequence by transmitting an additional frame in the NDP sounding sequence. In this case, the padding may be physical layer padding. In addition, the padding may be MAC layer padding. Accordingly, in embodiments to be described below, the padding may be physical layer padding or MAC layer padding.

In addition, when the NDP sounding protocol initiation station performs an NDP sounding protocol with multiple single radio multi-link devices, the NDP sounding protocol initiation station may adjust the length of the NDP sounding sequence based on the longest one of times required for RF chain switching of the multiple single radio multi-link devices. A method for adjusting the length of the NDP sounding sequence is described with reference to FIGS. 40 to 42.

Figure 40:
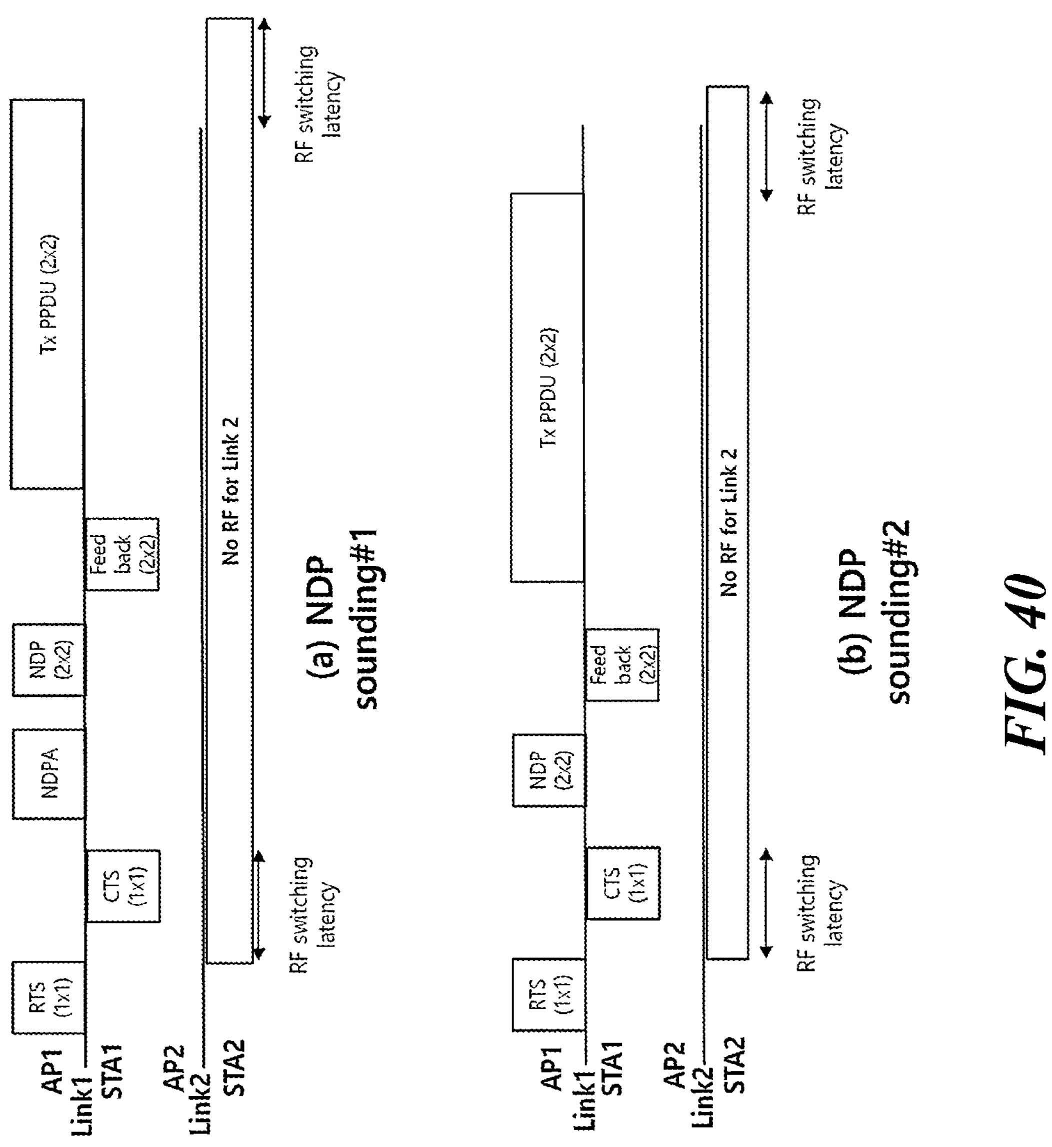
FIG. 40 illustrates an NDP sounding process performed by a station and a single radio multi-link device according to an embodiment of the present invention.

FIG. 40 illustrates an NDP sounding process performed by a station and a single radio multi-link device according to an embodiment of the present invention.

As described above, an NDP sounding protocol initiation station may adjust padding of a frame exchanged in an NDP sounding sequence to adjust the length of the NDP sounding sequence. When the NDP sounding sequence includes an RTS frame/CT frame exchange, the NDP sounding protocol initiation station may insert padding into an RTS frame to adjust the length of the NDP sounding sequence. Specifically, when the NDP sounding protocol initiation station determines that RF chain switching may fail to be completed even after the RTS frame/CTS frame exchange, the NDP sounding protocol initiation station may insert padding into the RTS frame.

In another specific embodiment, when the NDP sounding protocol initiation station determines that RF chain switching may fail to be completed even after the RTS frame/CTS frame exchange, the NDP sounding protocol initiation station may transmit an MU-RTS frame instead of the RTS frame. In this case, the NDP sounding protocol initiation station may insert padding into the MU-RTS frame.

In the above-described embodiments, the NDP sounding protocol initiation station may determine whether RF chain switching fails to be completed even after the RTS frame/CTS frame exchange, based on whether RF chain switching fails to be completed even after a time obtained by adding the length of a CTS frame and (2×SIFS) elapses from a RTS frame reception completion time point of the single radio multi-link device. In addition, the RTS reception completion time point may be one of a transmission start time point of a PPDU including the RTS frame, a time point at which a physical layer header of a PPDU completes transmission of the RTS frame, a transmission completion time point of a PPDU including the RTS frame, and a transmission completion time point of the RTS frame or an A-MPDU including the RTS frame. In addition, in the above-described embodiments using the MU-RTS frame instead of the RTS frame, the MU-RTS frame may be applied instead of the RTS frame. Part (a) of FIG. 40 illustrates an exchange of an NDPA frame, an NDP frame, and a feedback frame after the RTS frame/CTS frame exchange according to the above-described embodiment. In this case, the NDP sounding protocol initiation station performs MIMO transmission based on the received feedback frame.

In addition, the NDP sounding protocol initiation station may omit transmission of an NDPA frame in the NDP sounding sequence. In this case, the NDP sounding protocol initiation station and the single radio multi-link device may agree on performing the NDP sounding protocol without transmission of the NDPA frame. Accordingly, a station of the single radio multi-link device may wait for NDP reception without receiving the NDPA frame. Specifically, the station of the single radio multi-link device may signal that an NDP is receivable without NDPA reception, by using a capability element. In a specific embodiment, the station of the single radio multi-link device may configure an NDPA compression support subfield of the capability element as 1, so as to signal that the NDP frame is receivable without reception of the NDPA frame. In addition, the station of the single radio multi-link device may configure the NDPA compression support subfield of the capability element as 0, so as to signal that the NDP frame is not receivable without reception of the NDPA frame. The NDP sounding protocol initiation station may determine whether to omit transmission of the NDPA frame. In this case, the NDP sounding protocol initiation station may omit transmission of the NDPA frame in the NDP sounding sequence performed for the single radio multi-link device having received that the NDP frame is received without reception of the NDPA frame. In addition, the embodiment in which transmission of the NPDA frame is omitted in the NDP sounding sequence may be applied only to a case where the NDP sounding protocol initiation station transmits an NDP to one station. In this case, when the NDP sounding protocol initiation station transmits the NDP to multiple stations, transmission of the NDPA frame cannot be omitted. Part (b) of FIG. 40 illustrates an exchange of an NDP frame and a feedback frame without an NDPA frame after an RTS frame/CTS frame exchange according to the above-described embodiment. In this case, the NDP sounding protocol initiation station performs MIMO transmission based on the received feedback frame.

In the above-described embodiments, before performing the exchange of the NDPA frame, the NDP frame, and the feedback frame, a control frame exchange is included in the NDP sounding sequence, and thus excessive overhead may occur. In addition, when NDPA transmission is omitted, excessive overhead may also occur. To reduce the excessive overhead, an implicit feedback beamforming sounding sequence may be performed. A description thereof is made through FIG. 41.

Figure 41:
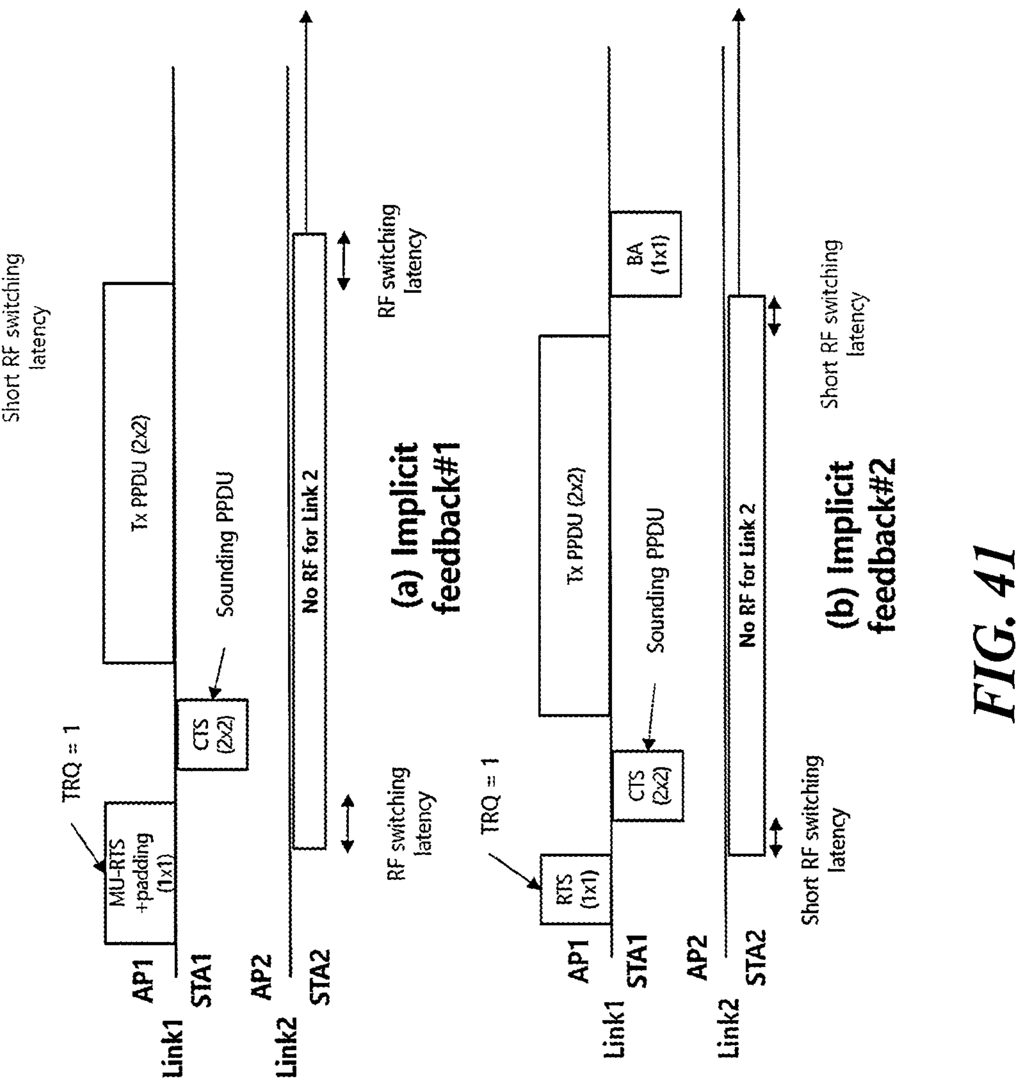
FIG. 41 illustrates a feedback beamforming sounding sequence performed by a station and a single radio multi-link device according to an embodiment of the present invention.

FIG. 41 illustrates a feedback beamforming sounding sequence performed by a station and a single radio multi-link device according to an embodiment of the present invention.

A frame exchange initiation station initiating a frame exchange may omit not only transmission of an NDPA frame but also transmission of a feedback frame. In this case, the frame exchange initiation station may receive a PPDU including a response to a control frame, for example, an RTS frame, an MU-RTS frame, a trigger frame having a different type from that of the MU-RTS frame, and measure a channel state. The frame exchange initiation station may acquire a steering matrix to be used for MIMO transmission based on the measured channel state. Specifically, the frame exchange initiation station may acquire a steering matrix based on the measured channel state. The frame exchange initiation station may perform MIMO transmission by using the acquired steering matrix.

In such embodiments, the frame exchange initiation station may insert padding into the control frame based on a time required for RF chain switching as described above. Specifically, the frame exchange initiation station may insert padding into the control frame based on a value obtained by subtracting an SIFS from the time required for RF chain switching.

In addition, the frame exchange initiation station may transmit a QoS data frame instead of the control frame. In this case, the single radio multi-link device may transmit an Ack frame or a Block Ack frame in response to the QoS data frame.

In addition, in the above-described embodiments, the frame exchange initiation station may configure a training request (TRQ) bit of the QoS data frame and the control frame as 1.

In addition, in the above-described embodiments, even in a case of a control frame, for example, a control frame which can configure multiple stations as receivers, such as an MU-RTS frame, a receiver of the control frame may be configured as one station.

In an embodiment of part (a) of FIG. 41, a frame exchange initiation station configures a TRQ field as 1 and transmits an MU-RTS frame. The frame exchange initiation station transmits a PPDU including the MU-RTS frame, and the frame exchange initiation station receives a PPDU including a CTS frame corresponding to a response to the MU-RTS frame, and measures a channel state. The frame exchange initiation station acquires a steering matrix based on the acquired channel state, and performs MIMO transmission by using the acquired steering matrix. In embodiment of part (b) of FIG. 41, the frame exchange initiation station transmits an RTS frame instead of the MU-RTS frame. This may be a case where the time required for RF chain switching is longer than the SIFS. Thereafter, the frame exchange initiation station and a station of the single radio multi-link device operate in the same manner as in the embodiment of part (a) of FIG. 41. However, in the embodiment of part (b) of FIG. 41, the station of the single radio multi-link device transmits a BA frame through single input single output (SISO).

A last frame exchange in a frame exchange sequence performed immediately after RF chain switching may be performed through single input single output (SISO) (1×1). Specifically, the station of the single radio multi-link device may transmit the last frame of the frame exchange sequence performed immediately after RF chain switching, through SISO (1×1). In addition, if there is no frame left to perform MIMO transmission or reception in the frame exchange sequence performed immediately after RF chain switching, the station of the single radio multi-link device may perform RF chain switching. Specifically, the station of the single radio multi-link device may start performing RF chain switching before transmission of the last frame of the frame exchange sequence performed immediately after RF chain switching.

Figure 42:
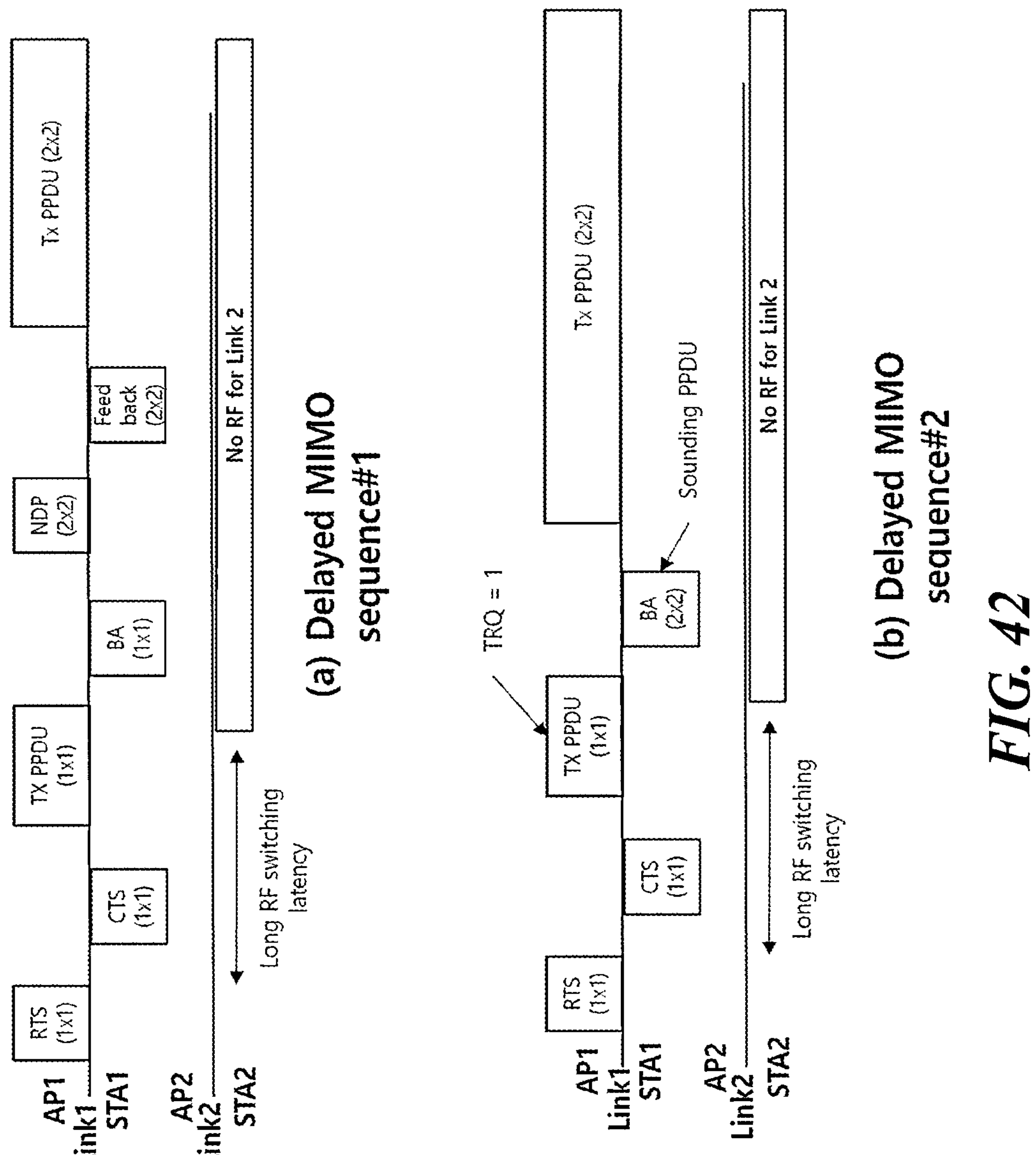
FIG. 42 illustrates an NDP sounding process performed by a station and a single radio multi-link device according to an embodiment of the present invention.

FIG. 42 illustrates an NDP sounding process performed by a station and a single radio multi-link device according to an embodiment of the present invention.

An NDP sounding protocol initiation station may determine a MIMO transmission start time point based on a time required for RF chain switching of a single radio multi-link device. Specifically, the NDP sounding protocol initiation station may delay the MIMO transmission start time point to a time point at which RF chain switching by the single radio multi-link device is completed. For example, when RF chain switching is not completed until an exchange of a control frame/a response frame to the control frame, for example, an RTS frame/CTS frame or an MU-RTS frame/CTS frame is performed, the NDP sounding protocol initiation station may delay the MIMO transmission start time point. Specifically, the NDP sounding protocol initiation station may transmit a first PPDU transmitted after the control frame/a response to the control frame, by using SISO.

As such, when RF chain switching is not completed, MIMO transmission of the NDP sounding protocol initiation station may not be allowed. In addition, the explicit and implicit NDP sounding protocols described above may not be allowed until the RF chain switching is completed.

In addition, the NDP sounding protocol initiation station may determine whether RF chain switching is to be completed during an exchange of the control frame/a response frame of the control frame, based on a time required for RF chain switching, indicated by a capability element transmitted by the single radio multi-link device.

When the single radio multi-link device performs transmission by using SISO, a station having performed a frame exchange sequence on a link in which use of multiple RF chains is supported may transmit a frame remaining in the corresponding frame exchange sequence by using SISO. For convenience of description, in the description related to the present embodiment, a station having performed the frame exchange sequence on the link in which use of multiple RF chains is supported is referred to as a frame exchange sequence performing station. That is, when the single radio multi-link device performs transmission by using SISO, the frame exchange sequence performing station may not be allowed to transmit the frame remaining in the corresponding frame exchange sequence by using MIMO. Specifically, when the single radio multi-link device transmits an ACK for the transmission of the frame exchange sequence performing station by using SISO, the frame exchange sequence performing station may transmit a frame remaining in the corresponding frame exchange sequence by using SISO. In this case, the ACK may include an ACK frame and a BA frame. Accordingly, when the single radio multi-link device transmits the ACK for the transmission of the frame exchange sequence performing station by using SISO, the frame exchange sequence performing station cannot transmit the frame remaining in the corresponding frame exchange sequence by using MIMO.

In embodiments of parts (a) and (b) of FIG. 42, RF chain switching of the single radio multi-link device has not been completed even during an exchange of an RTS frame and a CTS frame. Accordingly, in an embodiment of part (a) of FIG. 42, SISO is used until transmission of a PPDU and a BA frame is performed after the exchange of the RTS frame and the CTS frame. The NDP sounding protocol initiation station determines that RF chain switching has be completed when receiving the ACK frame. In this case, the NDP sounding protocol initiation station initiates a sounding protocol by using MIMO (2×2).

In addition, in an embodiment of part (b) of FIG. 42, SISO is used until PPDU transmission is performed after the exchange of the RTS frame and the CTS frame. After reception of the PPDU, RF chain switching is completed, and thus a first station (STA1) of the single radio multi-link device transmits the BA frame by using MIMO (2×2). The first station (STA1) of the single radio multi-link device transmits the BA frame by using MIMO (2×2), and thus the NDP sounding protocol initiation station determines that MIMO (2×2) transmission is allowed. Accordingly, after the NDP sounding protocol initiation station receives the BA frame transmitted using MIMO (2×2), the NDP sounding protocol initiation station transmits a PPDU by using MIMO (2×2).

As described above, the present invention is described by using wireless LAN communication as an example, but the present invention is not limited thereto, and is equally applicable to other communication systems such as cellular communication. In addition, the method, the apparatus, and the system of the present invention are described in association with the specific embodiments, but some or all of the elements and operations of the present invention may be implemented by using a computer system having a universal hardware architecture.

The features, structures, effects, and the like described in the above embodiments are included in at least one embodiment of the present invention, and are not necessarily limited to one embodiment. Furthermore, features, structures, effects, and the like shown in each embodiment may be combined or modified in other embodiments by those skilled in the art to which each embodiment belongs. Therefore, it should be interpreted that contents relating to such combination and modification are included in the scope of the present invention.

While the present invention is described mainly focusing on the embodiments above, but the present invention is not limited thereto, and it will be understood by those skilled in the art to which the present invention belongs that various modifications and applications can be made without departing from the spirit and scope of the present embodiments. For example, each element specifically shown in the embodiments may be modified and implemented. It should be interpreted that differences relating to such modifications and application are included in the scope of the present invention defined in the appended claims.

The invention claimed is:

1. A single radio non-access point (AP) multi-link device comprising a first non-AP station and a second non-AP station and configured to communicate with an AP multi-link device comprising a first AP and a second AP, wherein the first non-AP station and the first AP are configured to operate on a first link and the second non-AP station and the second AP are configured to operate on a second link, wherein when the single radio non-AP multi-link device is configured to operate in predetermined operation mode, the single radio non-AP multi-link device is configured to not support transmission or reception of one of the first non-AP station or the second non-AP station while the other of the first non-AP station or the second non-AP station is configured to perform frame exchange, the single radio non-AP multi-link device comprising:

a transceiver; and a processor, wherein the processor is configured to delay, when a link on which a radio frequency (RF) chain of the single radio non-AP multi-link device operates is switched from the first link to the second link and the link on which the RF chain operates is switched again from the second link to the first link, channel access for a predetermined time interval before a transmission on the first link is performed, and receive a control frame from the AP multi-link device, wherein the predetermined time interval is applied based on an RF chain switching time interval of the single radio non-AP multi-link device, and wherein the RF chain switching time interval includes a delay required for starting a monitoring operation of the RF chain after switching of the RF chain.

2. The single radio non-AP multi-link device of claim 1, wherein the predetermined time interval corresponds to a time interval during which restriction on channel access is required because channel monitoring is not possible.

3. The single radio non-AP multi-link device of claim 1, wherein, the processor transmits a last frame by using single input single output (SISO) (1×1) in a frame exchange sequence performed on the first link after switching of the RF chain.

4. The single radio non-AP multi-link device of claim 1, wherein the control frame is transmitted in a predetermined physical layer protocol data unit (PPDU) format.

5. The single radio non-AP multi-link device of claim 4, wherein the predetermined PPDU format is a non-high throughput (HT) format.

6. The single radio non-AP multi-link device of claim 1, wherein the control frame is transmitted at a data rate equal to or lower than a predetermined data rate.

7. The single radio non-AP multi-link device of claim 1, wherein the control frame initiates a null data packet (NDP) sounding sequence.

8. A method of operating a single radio non-access point (AP) multi-link device comprising a first non-AP station and a second non-AP station and configured to communicate with an AP multi-link device comprising a first AP and a second AP, wherein the first non-AP station and the first AP are configured to operate on a first link and the second non-AP station and the second AP are configured to operate on a second link, wherein when the single radio non-AP multi-link device is configured to operate in a predetermined operation mode, the single radio non-AP multi-link device is configured to not support transmission or reception of one of the first non-AP station or the second non-AP station while the other of the first non-AP station or the second non-AP station is configured to perform frame exchange, the method comprising:

delaying, when a link on which a radio frequency (RF) chain of the single radio non-AP multi-link device operates is switched from the first link to the second link and the link on which the RF chain operates is switched again from the second link to the first link, channel access for a predetermined time interval before a transmission on the first link is performed, and receiving a control frame from the AP multi-link device, wherein the predetermined time interval is applied based on an RF chain switching time interval of the single radio non-AP multi-link device, and wherein the RF chain switching time interval includes a delay required for starting a monitoring operation of the RF chain after switching of the RF chain.

* * * * *